US008498228B2

(12) United States Patent
Lee et al.

(10) Patent No.: US 8,498,228 B2
(45) Date of Patent: Jul. 30, 2013

(54) METHOD FOR SIGNAL TRANSMISSION/RECEPTION BASED ON HARQ SCHEME IN WIRELESS MOBILE COMMUNICATION SYSTEM

(75) Inventors: Mi-Hyun Lee, Seoul (KR); Ho-Kyu Choi, Seongnam-si (KR); Jae-Weon Cho, Suwon-si (KR); Ki-Chun Cho, Suwon-si (KR); Tae-Young Kim, Seongnam-si (KR); Chi-Woo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 830 days.

(21) Appl. No.: 12/354,563

(22) Filed: Jan. 15, 2009

(65) Prior Publication Data
US 2009/0181689 A1 Jul. 16, 2009

(30) Foreign Application Priority Data

Jan. 15, 2008 (KR) .................. 10-2008-0004649
Mar. 27, 2008 (KR) .................. 10-2008-0028622
Sep. 26, 2008 (KR) .................. 10-2008-0094678
Oct. 13, 2008 (KR) .................. 10-2008-0100394
Oct. 20, 2008 (KR) .................. 10-2008-0102800
Nov. 10, 2008 (KR) .................. 10-2008-0111332
Dec. 16, 2008 (KR) .................. 10-2008-0128209

(51) Int. Cl.
*H04B 7/00* (2006.01)
(52) U.S. Cl.
USPC ........................................... 370/310
(58) Field of Classification Search
None
See application file for complete search history.

(56) References Cited

U.S. PATENT DOCUMENTS

| 2003/0048765 | A1 | 3/2003 | Jang | |
|---|---|---|---|---|
| 2007/0280098 | A1* | 12/2007 | Bhatt et al. | 370/208 |
| 2008/0144612 | A1* | 6/2008 | Honkasalo et al. | 370/370 |
| 2009/0086712 | A1* | 4/2009 | Liu et al. | 370/350 |
| 2009/0180435 | A1* | 7/2009 | Sarkar | 370/330 |
| 2010/0260164 | A1* | 10/2010 | Moon et al. | 370/345 |
| 2010/0278123 | A1* | 11/2010 | Fong et al. | 370/329 |

FOREIGN PATENT DOCUMENTS

| KR | 10-2000-0037696 A | 7/2000 |
|---|---|---|
| KR | 10-2006-0083935 A | 7/2006 |
| KR | 10-0668666 B1 | 1/2007 |

* cited by examiner

*Primary Examiner* — Jung-Jen Liu
(74) *Attorney, Agent, or Firm* — Jefferson IP Law, LLP

(57) ABSTRACT

A method of signal transmission/reception by a transmitter in a wireless mobile communication system is provided. The method includes determining a signal transmission/reception corresponding relation between a downlink and an uplink of the wireless mobile communication system using a super-frame, the super-frame including at least one frame, said at least one frame including at least one downlink sub-frame and at least one uplink sub-frame, the signal transmission/reception corresponding relation enabling each sub-frame within a link including fewer sub-frames to correspond to at least one sub-frame within a link including more sub-frames when the downlink and the uplink of the wireless mobile communication system include different numbers of sub-frames, wherein the signal transmission/reception corresponding relation is also determined when the downlink and the uplink of the wireless mobile communication system include a same number of sub-frames, and transmitting and receiving signals to and from a receiver through at least one downlink sub-frame and at least one uplink sub-frame according to the determined signal transmission/reception corresponding relation.

33 Claims, 26 Drawing Sheets

COEXISTENCE RATIO = 3:2, DL:UL = 2:3

COEXISTENCE RATIO = 2:3, DL:UL = 3:3

COEXISTENCE RATIO = 1:4, DL:UL = 4:3

TDD 5:3, SINGLE IEEE 802.16M

TDD 5:3, COEXISTENCE RATIO=2:3

| M:N=3:5 | DL | | | | | UL | | |
|---|---|---|---|---|---|---|---|---|
| | 0 | 1 | 2 | 3 | 4 | 0 | 1 | 2 |
| DL HARQ | F | F | F | | | F | F | F |
| UL HARQ | F | F | F | F | F | F | F | F |

FIG.21A

| M:N=4:4 | DL | | | | UL | | | |
|---|---|---|---|---|---|---|---|---|
| | 0 | 1 | 2 | 3 | 0 | 1 | 2 | 3 |
| DL HARQ | F | F | F | F | F | F | F | F |
| UL HARQ | F | F | F | F | F | F | F | F |

FIG.21B

| M:N=5:3 | DL | | | | | UL | | |
|---|---|---|---|---|---|---|---|---|
| | 0 | 1 | 2 | 3 | 4 | 0 | 1 | 2 |
| DL HARQ | F | F | F | F | F | F | F | F |
| UL HARQ | F | F | F | F | F | F | F | F |

FIG.21C

| M:N=6:2 | DL | | | | | | UL | |
|---|---|---|---|---|---|---|---|---|
| | 0 | 1 | 2 | 3 | 4 | 5 | 0 | 1 |
| DL HARQ | F | F | F | F | F | S | F | F/F/S |
| UL HARQ | | F | F | F | F | | F | F |

FIG.21D

| M:N=3:5 | DL | | | | UL | | | |
|---|---|---|---|---|---|---|---|---|
| | 0 | 1 | 2 | 3 | 4 | 0 | 1 | 2 |
| DL HARQ | F | F | F | | F | F | F | |
| UL HARQ | S/F | F | F/S | S | | F | F | S |

FIG.22A

| M:N=4:4 | DL | | | | UL | | | |
|---|---|---|---|---|---|---|---|---|
| | 0 | 1 | 2 | 3 | 0 | 1 | 2 | 3 |
| DL HARQ | F | F | F | F | F | F | F | F |
| UL HARQ | F | F | F | F | F | F | F | F |

FIG.22B

| M:N=5:3 | DL | | | | | UL | | |
|---|---|---|---|---|---|---|---|---|
| | 0 | 1 | 2 | 3 | 4 | 0 | 1 | 2 |
| DL HARQ | F | F | F | F | S | F | F | F/S |
| UL HARQ | | F | F | F | | F | F | F |

FIG.22C

| M:N=6:2 | DL | | | | | | UL | |
|---|---|---|---|---|---|---|---|---|
| | 0 | 1 | 2 | 3 | 4 | 5 | 0 | 1 |
| DL HARQ | F | F | F | F | S | S | F | F/F/S |
| UL HARQ | | | F | F | | | F | F |

FIG.22D

METHOD FOR SIGNAL TRANSMISSION/RECEPTION BASED ON HARQ SCHEME IN WIRELESS MOBILE COMMUNICATION SYSTEM

PRIORITY

This application claims the benefit under 35 U.S.C. §119(a) of Korean patent applications filed in the Korean Industrial Property Office on Jan. 15, 2008, Mar. 27, 2008, Sep. 26, 2008, Oct. 13, 2008, Oct. 20, 2008, Nov. 10, 2008, and Dec. 16, 2008, and respectively assigned Serial Nos. 10-2008-0004649, 10-2008-0028622, 10-2008-0094678, 10-2008-0100394, 10-2008-0102800, 10-2008-0111332, and 10-2008-0128209, the entire disclosures of each of which are hereby incorporated by reference.

BACKGROUND OF THE INVENTION

1. Field of the Invention

The present invention relates to a wireless mobile communication system. More particularly, the present invention relates to a method for signal transmission/reception based on a Hybrid Automatic Repeat reQuest (HARQ) scheme in a wireless mobile communication system.

2. Description of the Related Art

Currently, development of mobile communication systems is oriented toward provision of various services, including broadcast, multimedia images, and multimedia messages, to users. More particularly, next generation mobile communication systems are being developed in order to provide a data service of at least 100 Mbps for high speed mobile users and to provide a data service of at least 1 Gbps for low speed mobile users.

Reliable high speed data transmission/reception between a base station and a mobile station in a wireless mobile communication system requires a small control overhead and a short latency. As a method for reducing the control overhead and supporting the short latency, a synchronous HARQ can be taken into consideration. The synchronous HARQ refers to an HARQ operation having a predefined corresponding relation between an initial signal transmission and a signal retransmission thereafter based on the HARQ scheme. Such a corresponding relation is called an HARQ transmission timing structure or an HARQ interlace structure. The HARQ interlace structure includes a relation between a time slot, in which a MAP indicating transmission is provided, and a time slot, in which a signal corresponding to the MAP is transmitted, a relation between a time slot, in which the signal is transmitted, and a time slot, in which a corresponding feedback is transmitted, and a relation between a time slot, in which the feedback is transmitted, and a time slot, in which a signal corresponding to the feedback is transmitted (i.e. retransmission).

In a wireless mobile communication system using the HARQ scheme, when a transmitter transmits a signal, a receiver transmits an ACKnowledgement (ACK) or a Non-ACKnowledgement (NACK), which indicates if the receiver has successfully received the signal, to the transmitter. Based on the ACK or NACK, the transmitter transmits a new signal or retransmits a previously-transmitted signal according to the HARQ scheme. As used herein, the HARQ scheme implies a Chase Combining (CC) scheme or an Incremental Redundancy (IR) scheme.

As described above, the HARQ scheme causes a time delay between initial transmission of a signal by a transmitter and transmission of a new signal or retransmission of the original signal by the transmitter according to reception of the ACK or NACK.

FIG. 1 illustrates a retransmission delay according to a conventional HARQ.

Referring to FIG. 1, the transmitter Tx transmits a data burst in the time slot of number 4, the receiver Rx transmits an ACK or a NACK to the transmitter at the time slot of number 8 according to existence or absence of a detected error in the received data burst. The example illustrated in FIG. 1 is based on an assumption that the receiver transmits a NACK. Upon receiving the NACK, the transmitter retransmits the data burst, which has been transmitted at the time slot of number 4 and at the time slot of number 12. In FIG. 1, the HARQ ReTransmission Delay (RTD) refers to the time between previous transmission and current transmission and includes eight time slots from the time slot of number 5 to the time slot of number 12. In the meantime, the Reception delay (Rx delay) refers to a time interval between reception of the data burst by the receiver and transmission of the NACK by the receiver after decoding of the data burst. The Rx delay includes three time slots from the time slot of number 5 to the time slot of number 7 in FIG. 1. The transmission delay (Tx delay) refers to a time interval between reception of the NACK from the receiver by the transmitter and transmission or retransmission of a data burst to the receiver by the transmitter. The Tx delay includes three time slots from the time slot of number 9 to the time slot of number 11 in FIG. 1. As described above, the HARQ retransmission time includes a reception delay, an HARQ feedback, a transmission delay, and a Transmission Time Interval (TTI) for transmission of a data burst.

In a communication system using the HARQ scheme, if transmission or retransmission delay time of a signal is maintained constant, the base station can use a persistent allocation scheme. According to the persistent allocation scheme, resources once allocated to a mobile station are continuously used during a predefined interval, it is thus unnecessary to transmit a control message indicating resource allocation whenever a signal is transmitted or retransmitted. However, the transmission or retransmission delay time of a signal may change according to the ratio between the number of DownLink (DL) time slots and the number of UpLink (UL) time slots. The time slot refers to a two-dimensional resource allocation unit determined by the time interval and the frequency band.

Table 1 and 2 below show HARQ signal transmission/reception according to the Mobile Broadband Frequency Division Duplex (MBFDD) scheme and the Mobile Broadband Time Division Duplex (MBTDD) scheme defined in the Institute of Electrical and Electronics Engineers (IEEE) 802.20 standard. Table 2 has a temporal configuration ratio of M:N between the downlink interval and the uplink interval.

TABLE 1

|    | MAP | Data burst | ACK   | Retransmission |
|----|-----|------------|-------|----------------|
| DL | d   | d          | d + 3 | d + 6          |
| UL | u   | u + 2      | u + 6 | u + 8          |

TABLE 2

|    |       | MAP | Data burst | ACK   | Retransmission |
|----|-------|-----|------------|-------|----------------|
| DL | N > 1 | d   | d          | d + 1 | d + 2          |
|    | N = 1 | d   | d          | d + 1 | d + 3          |

TABLE 2-continued

|  |  | MAP | Data burst | ACK | Retransmission |
|---|---|---|---|---|---|
| UL | M > 1 | u | u | u + 2 | u + 2 |
|  | M = 1 | u − 1 | u | u + 2 | u + 3 |

In Tables 1 and 2, d corresponds to a downlink interval index, and u corresponds to an uplink interval index. Further, in the TDD communication system, M denotes the number of time slots occupied by the downlink data burst and N denotes the number of time slots occupied by the uplink data burst. Also, each interval occupies one time slot in the FDD communication system, while a downlink interval includes M time slots and an uplink interval includes N time slots in the TDD communication system.

As noted from Table 2, since the number of time slots in each interval changes according to the ratio of DL:UL (=M: N), the HARQ transmission or retransmission delay time is not constant. For example, for a 2:1 downlink data burst transmission, the transmitter indicates transmission of a data burst in the MAP within an interval of number 0, and transmits the data burst in the same time slot. Further, the transmitter receives a feedback signal through an uplink number 1 sub-frame, and retransmits the data burst through a downlink number 3 interval. Then, the downlink number 0 interval, the uplink number 1 interval, and the downlink number 3 interval configure one HARQ interlace structure.

FIGS. 2A and 2B illustrate a downlink HARQ interlace structure according to a conventional MBTDD scheme.

Specifically, FIG. 2A illustrates a structure when the ratio between the downlink and the uplink is 2:1, and FIG. 2B illustrates a structure when the ratio between the downlink and the uplink is 1:1. In FIGS. 2A and 2B, a downlink interval may include M time slots (TTIs) while an uplink interval may include N time slots. For example, in FIG. 2A, the number 0 time slot and the number 1 time slot correspond to the number 0 downlink interval, the number 2 time slot correspond to the number 0 uplink interval, and the number 0 downlink interval and the number 0 uplink interval correspond to the number 0 frame. Similarly, in FIG. 2B, the number 0 time slot correspond to the number 0 downlink interval, the number 1 time slot correspond to the number 0 uplink interval, and the number 0 downlink interval and the number 0 uplink interval correspond to the number 0 frame.

In the case of FIG. 2A, a Base Station (BS) transmits a data burst to a Mobile Station (MS) within the number 0 downlink interval. The number 0 downlink interval includes the number 0 time slot and the number 1 time slot. The MS receives the data burst from the BS, and demodulates and decodes the data burst. Due to a delay according to the demodulation and decoding, the MS may not feedback information on existence or absence of a detected error back in the number 0 uplink sub-frame, and instead transmits the feedback information on existence or absence of a detected error to the BS in the number 1 uplink sub-frame (specifically, the number 5 time slot).

Due to a delay for processing of the received feedback information on existence or absence of a detected error from the MS, that is, due to a delay for detection of an ACK or NACK, the BS may not transmit (or retransmit) a data burst in the number 2 downlink interval, and instead transmits (or retransmits) a data burst in the number 3 downlink interval.

It is noted from FIG. 2A that there are nine time slots before the data burst transmitted in the number 0 downlink interval is retransmitted in the number 3 downlink interval.

However, it is noted from FIG. 2B that there are six time slots before the data burst transmitted in the number 1 downlink interval is retransmitted in the number 3 downlink interval. This implies that the retransmission period may change according to the ratio between time slots of the downlink and the uplink.

SUMMARY OF THE INVENTION

An aspect of the present invention is to address the above-mentioned problems and/or disadvantages and to provide at least the advantages described below. Accordingly, an aspect of the present invention is to provide an HARQ interlace structure and a configuration method for smoothly determining HARQ operation timing according to a system capability and a data burst transmission interval in a frame-based wireless mobile communication system.

Another aspect of the present invention is to provide an HARQ interlace structure and a configuration method capable of smoothly maximizing a symmetry of a corresponding relation between an uplink and a downlink according to a system capability and a data burst transmission interval in a wireless mobile communication system having a symmetric ratio or an asymmetric ratio between the uplink and the downlink.

In accordance with an aspect of the present invention, a method of signal transmission/reception by a transmitter in a wireless mobile communication system using a super-frame is provided. The method includes determining a signal transmission/reception corresponding relation between a downlink and an uplink of the wireless mobile communication system using a super-frame, the super-frame including at least one frame, said at least one frame including at least one downlink sub-frame and at least one uplink sub-frame, the signal transmission/reception corresponding relation enabling each sub-frame within a link including fewer sub-frames to correspond to at least one sub-frame within a link including more sub-frames when the downlink and the uplink of the wireless mobile communication system include different numbers of sub-frames, wherein the signal transmission/reception corresponding relation is also determined when the downlink and the uplink of the wireless mobile communication system include a same number of sub-frames, and transmitting and receiving signals to and from a receiver through at least one downlink sub-frame and at least one uplink sub-frame according to the determined signal transmission/reception corresponding relation.

In accordance with another aspect of the present invention, a method of signal transmission/reception by a transmitter in a wireless mobile communication system using a super-frame is provided. The method includes determining a signal transmission/reception corresponding relation between a downlink and an uplink of the wireless mobile communication system using a super-frame, the super-frame including at least one frame, said at least one frame including at least one downlink sub-frame and at least one uplink sub-frame, the signal transmission/reception corresponding relation enabling each sub-frame within a link including fewer sub-frames to correspond to at least one sub-frame within a link including more sub-frames when the downlink and the uplink of the wireless mobile communication system include different numbers of sub-frames, transmitting control information indicating data burst allocation in each downlink sub-frame at a predefined period from among downlink sub-frames included in a first frame, transmitting a data burst through a sub-frame indicated by the control information, receiving a feedback, in response to the transmitted data burst, through at least one uplink sub-frame of the first frame corresponding to the sub-frames through which the control information and the data burst have been transmitted according to the signal transmission/reception corresponding relation, and when the feedback is a Non-ACKnowledgement (NACK) response, retransmitting the data burst transmitted in the first frame, through at least one downlink sub-frame of a second frame corresponding to said at least one uplink sub-frame of the first frame according to the signal transmission/reception corresponding relation.

In accordance with yet another aspect of the present invention, a method of signal transmission/reception by a receiver in a wireless mobile communication system using a super-frame is provided. The method includes determining a signal transmission/reception corresponding relation between a downlink and an uplink of the wireless mobile communication system using a super-frame, the super-frame including at least one frame, said at least one frame including at least one downlink sub-frame and at least one uplink sub-frame, the signal transmission/reception corresponding relation enabling each sub-frame within a link including fewer sub-frames to correspond to at least one sub-frame within a link including more sub-frames when the downlink and the uplink of the wireless mobile communication system include different numbers of sub-frames, receiving control information indicating data burst allocation in each downlink sub-frame at a predefined period from among downlink sub-frames included in a first frame, transmitting a data burst through an uplink sub-frame of the first frame indicated by the control information, receiving a feedback, in response to the transmitted data burst, through at least one uplink sub-frame of a second frame corresponding to the uplink sub-frame through which the data burst has been transmitted according to the signal transmission/reception corresponding relation, and when the feedback is a NACK response, retransmitting the data burst transmitted in the first frame, through at least one uplink sub-frame of the second frame corresponding to said at least one downlink sub-frame of the second frame according to the signal transmission/reception corresponding relation.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 21A to 21D illustrate fast or slow HARQ interlace structures according to sub-frame indexes according to various TDD ratios when a transmission or reception processing interval includes two sub-frames, according to exemplary embodiments of the present invention; and FIGS. 22A to 22D illustrate fast or slow HARQ interlace structures according to sub-frame indexes according to various TDD ratios when a transmission or reception processing interval includes three sub-frames, according to exemplary embodiments of the present invention.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention propose a method having constant HARQ retransmission delay time in a wireless mobile communication system employing a Frequency Division Duplex (FDD) scheme, a Time Division Duplex (TDD) scheme, or a Half duplex-FDD (H-FDD) scheme, or employing both the FDD scheme and the TDD scheme. The frame structure used in the system employing the TDD scheme or H-FDD scheme may have various resource occupancy ratios between a downlink interval and an uplink interval. That is, a corresponding relation between the uplink and the downlink may be symmetric or asymmetric.

In the following description of exemplary embodiments of the present invention, a BS and an MS transmit and receive a signal according to the HARQ scheme based on a super-frame structure. The super-frame includes at least one frame, which includes at least one sub-frame (mini-frame). In the following description, the sub-frame has the same meaning as that of the time slot or the mini-frame. The sub-frame, time slot, or the mini-frame includes at least one Orthogonal Frequency Division Multiple Access (OFDMA) symbol.

Figure 3A:
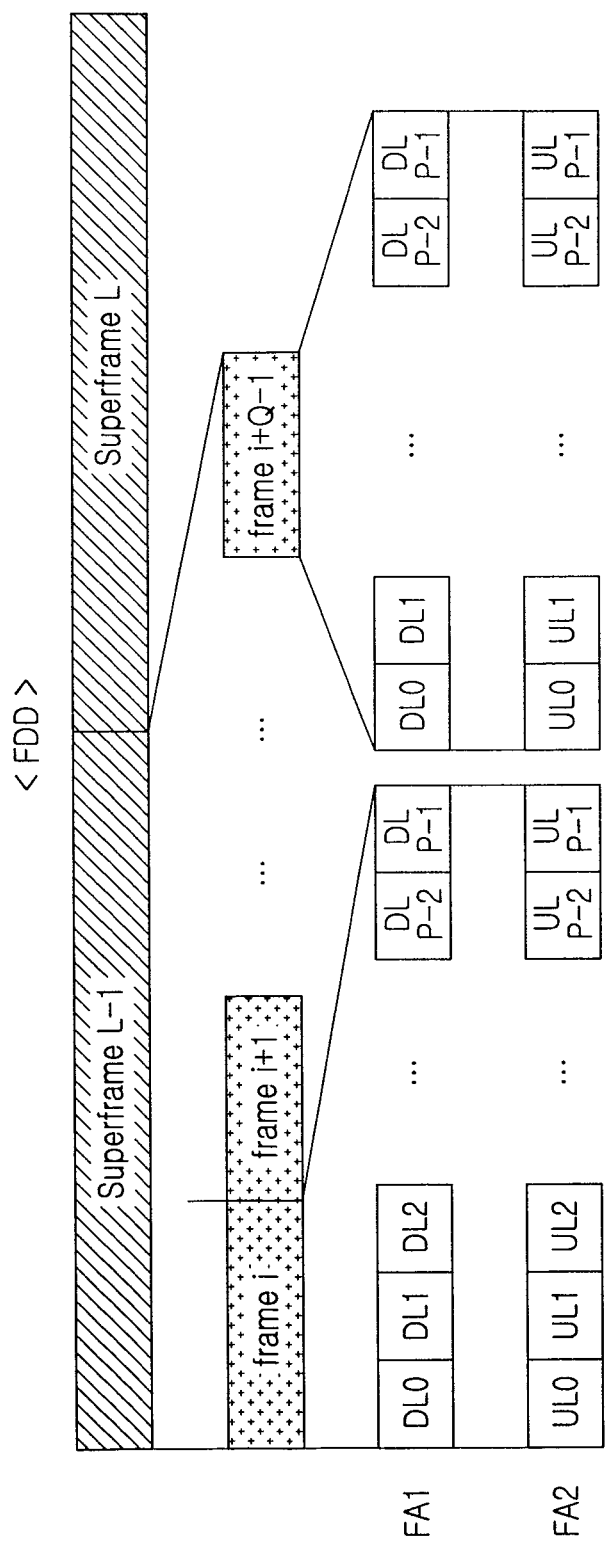
FIGS. 3A and 3B illustrate structures of super-frames for Frequency Division Duplex (FDD) and Time Division Duplex (TDD) according to exemplary embodiments of the present invention, respectively.
Figure 3B:
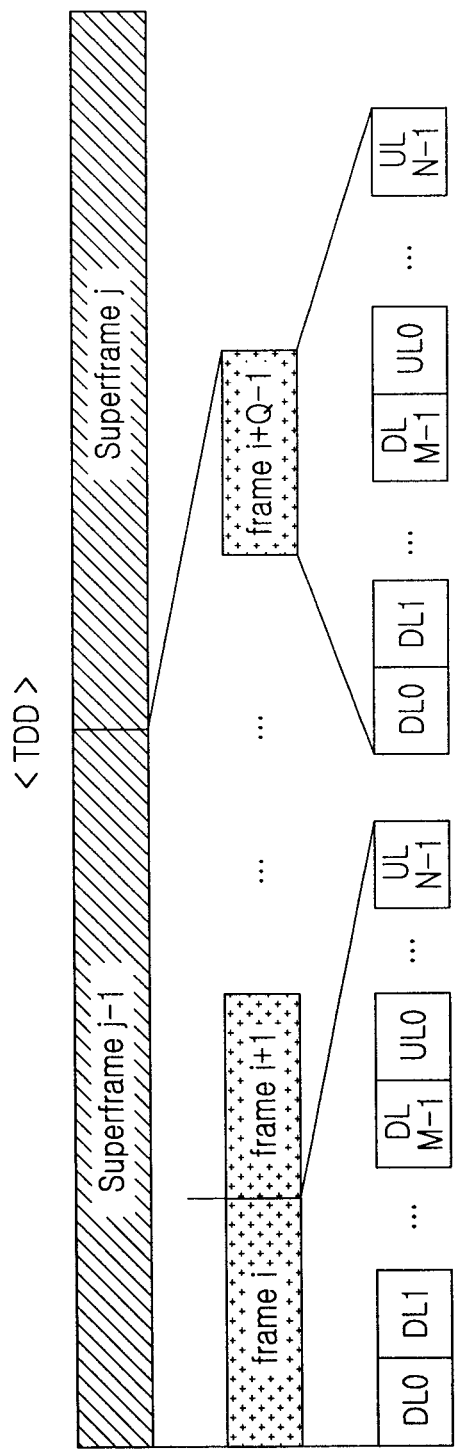

FIGS. 3A and 3B illustrate structures of super-frames for FDD and TDD according to exemplary embodiments of the present invention, respectively.

Referring to FIG. 3A, one super-frame includes Q frames, each of which includes P sub-frames. For example, a super-frame having 32 time slots includes four (Q=4) frames, each of which includes eight (P=8) sub-frames. In the case of FDD shown in FIG. 3A, Frequency Assignment (FA) 1 is used as a downlink frequency band and FA 2 is used as an uplink frequency band.

Referring to FIG. 3B, one frame includes a downlink interval and an uplink interval, wherein the ratio between downlink time slots and uplink time slots is M:N.

As noted from FIGS. 3A and 3B, according to exemplary embodiments of the present invention, time slots within a super-frame are grouped into at least one frame, which includes a plurality of sub-frames. More particularly, exemplary embodiments of the present invention propose an HARQ interlace structure having constant HARQ retransmission delay time based on the super-frame structure shown in FIGS. 3A and 3B. As described above, for smooth data burst transmission/reception, the HARQ interlace structure requires a predefined corresponding relation between at least one time slot within the uplink interval and at least one time slot within the downlink interval.

Exemplary embodiment of the present invention propose a corresponding relation between the uplink and the downlink for HARQ burst transmission in an M:N TDD system. First, a TDD communication system wherein $M \geq N$ will be described below.

In a TDD communication system, one frame includes downlink time slots and uplink time slots. According to exemplary embodiments of the present invention, a link having more time slots is divided into areas in accordance with a link having less time slots, to make time slots of the two links have a constant corresponding relation. Further, the sub-frames within each divided area correspond to one time slot within the link having less time slots. Each divided area includes one or more sub-frames. That is, each sub-frame has a corresponding relation defined by formula (1) below. Formula (1) shows a corresponding relation between time slots within a link having more time slots (i.e. M time slots) and time slots within a link having less time slots (i.e. N time slots).

$$u = \text{floor}\left(\frac{d}{M/N}\right) \quad (1)$$

In formula (1), d indicates a time slot index within the link having more time slots, u indicates a time slot index within the link having fewer time slots, each of M and N indicates the number of time slots of each link, and the floor function has a value obtained by rounding down decimals of the value obtained from the calculation within the parenthesis. That is, a time slot d corresponds to a time slot u. For example, in a TDD communication system wherein DL:UL=5:3, the downlink interval (M=5) is divided into three areas based on the uplink interval (N=3) having less value, and each divided area has a corresponding relation to a sub-frame within the uplink. That is to say, number 0 sub-frame and number 1 sub-frame of the downlink interval correspond to number 0 sub-frame of the uplink interval, number 2 sub-frame and number 3 sub-frame of the downlink interval correspond to number 1 sub-frame of the uplink interval, and number 4 sub-frame of the downlink interval corresponds to number 2 sub-frame of the uplink interval.

Table 3 below illustrates HARQ signal transmission/reception timing according to a first exemplary embodiment of the present invention when M is larger than or equal to N in a TDD communication system having a ratio of M:N.

TABLE 3

| | DL | | UL | |
|---|---|---|---|---|
| $M \geq N$ | Subframe index | Frame index | Subframe index | Frame index |
| MAP | m | i | m | i |
| Burst | m | i | n = Floor(m/K) | i |
| ACK/NACK | n = Floor(m/K) | i | m | i + 1 |
| ReTx.burst | m | i + 1 | n = Floor(m/K) | i + 1 |

In Table 3, m (m=0, ..., M−1) indicates a sub-frame index in a downlink interval, and n (n=0, ..., N−1) indicates a sub-frame index in an uplink interval. Further, according to an exemplary embodiment of the present invention, in Table 3, K is defined as M/N or ceiling(M/N).

Hereinafter, an HARQ transmission timing structure for downlink data burst transmission will be described with reference to Table 3. A base station transmits control information (i.e. MAP information) included in the number m sub-frame of the number i frame, which indicates transmission of a data burst starting at the number m sub-frame of the number i frame. Then, the data burst starts to be transmitted at the number m sub-frame of the number i frame. Herein, indicating transmission of the data burst refers to indicating the location, at which the data burst is allocated, and the number of time slots required for transmission of the data burst. Then, an ACKnowledgement (ACK) or Non-ACKnowledgement (NACK) with respect to the transmission of the data burst is transmitted at the number n sub-frame of the number i frame by the receiver. Thereafter, in response to the ACK or NACK, the transmitter transmits or retransmits a data burst at the number m sub-frame, which has the same index, of the number (i+1) frame or a later frame.

The index n of the sub-frame, at which a feedback signal (ACK or NACK) of the transmitted data burst is transmitted, is determined by the floor function, i.e. Floor(m/K), using the defined K and the sub-frame index m of the location for transmission of the data burst. Here, Floor(m/K) is obtained by rounding down decimals of a value obtained through the calculation of m/K.

Hereinafter, an HARQ transmission timing structure for uplink data burst transmission will be described. The base station indicates transmission of a data burst starting at the number n uplink mini-frame of the number i frame by means of MAP information included in the number m downlink sub-frame of the number i frame. Upon receiving the MAP information, the transmitter starts to transmit the data burst at the number n uplink sub-frame of the number i frame or a later frame.

An ACK or NACK with respect to the transmitted data burst is transmitted or retransmitted at the number m downlink sub-frame of the number (i+1) frame or a later frame by the receiver. Thereafter, in response to the ACK or NACK, the transmitter starts to transmit or retransmit the data burst at the number n uplink sub-frame of the number (i+1) frame or a later frame.

The location n, at which the uplink data burst is transmitted, is determined by the floor function, i.e. Floor(m/K), using the defined K and the index m of the sub-frame including the MAP. Meanwhile, by designing the HARQ interlace structure in such a way that a location of a downlink sub-frame including MAP information for the uplink data burst transmission is identical to a location of a downlink sub-frame transmitting the ACK or NACK, the transmitter can receive the downlink control information (i.e. MAP information) and a downlink ACK or NACK in sub-frames having the same index, which makes it possible to minimize the number of downlink sub-frames that the transmitter must monitor, thereby reducing the power consumption. That is, when a NACK for a transmitted uplink data burst is transmitted, if necessary, a data burst allocation indication for retransmission of the data burst may be transmitted in the same sub-frame in a later frame. Further, downlink control information in response to an uplink data burst transmitted at a sub-frame with a predefined index is provided through a sub-frame having the same index as the sub-frame in which the uplink data burst has been transmitted.

In the case described above, since the number of sub-frames of the downlink interval is larger than the number of sub-frames of the uplink interval, each sub-frame of the uplink interval corresponds to at least one sub-frame of the downlink interval. Table 4 below illustrates HARQ signal transmission/reception timing according to the first exemplary embodiment of the present invention when M is smaller than N in a TDD communication system having a ratio of M:N.

TABLE 4

| | DL | | UL | |
|---|---|---|---|---|
| M < N | Mini frame index | Frame index | Mini frame index | Frame index |
| MAP | m | i | m | i |
| Burst | m | i | n where Floor(n/K) = m, $n \in \{\lceil \frac{m}{K} \rceil, \lceil \frac{m}{K} \rceil + 1, \ldots, \lceil \frac{m+1}{K} \rceil - 1\}$ | i |
| ACK/NACK | n where Floor(n/K) = m, $n \in \{\lceil \frac{m}{K} \rceil, \lceil \frac{m}{K} \rceil + 1, \ldots, \lceil \frac{m+1}{K} \rceil - 1\}$ | i | m | i + 1 |
| ReTx.burst | m | i + 1 | n | i + 1 |

In Table 4, m (m=0, . . . , M−1) indicates a sub-frame index in a downlink interval, and n (n=0, . . . , N−1) indicates a sub-frame index in an uplink interval. In Table 4, K is defined as M/N or ceiling(M/N). The two mathematical expressions are used to produce a countable number for obtaining an index. Therefore, the two definitions have the same result.

Hereinafter, an HARQ interlace structure for downlink data burst transmission will be described with reference to Table 4. A base station transmits MAP information included in the number m sub-frame of the number i frame, which indicates transmission of a data burst starting at the number m sub-frame of the number i frame. Then, the data burst starts to be transmitted at the number m sub-frame of the number i frame. Then, an ACK or NACK with respect to the transmission of the data burst is transmitted at the number n sub-frame of the number i frame or a later frame by the receiver. Thereafter, in response to the ACK or NACK, the transmitter transmits or retransmits a data burst at the number m sub-frame of the number (i+1) frame or a later frame.

The location n, at which an ACK or NACK of the transmitted data burst is transmitted is determined by means of K and m, and an ACK or NACK with respect to the data burst transmitted from the number m sub-frame is provided in the number n sub-frame, the floor function of which has a value of m (Floor(n/K)=m), from among the uplink mini-frames. That is, n has a value of $$\lceil \tfrac{m}{K} \rceil, \lceil \tfrac{m}{K} \rceil + 1, \ldots, \text{or} \lceil \tfrac{m+1}{K} \rceil - 1.$$

Further, when there exists at least one sub-frame corresponding to the number m sub-frame, a explicit signaling such as a MAP or broadcast message may be used to indicate the number n sub-frame for the actual transmission.

Hereinafter, an HARQ interlace structure for uplink data burst transmission will be described. The base station indicates transmission of a data burst starting at the number n uplink sub-frame of the number i frame or a later frame by transmitting MAP information included in the number m downlink sub-frame of the number i frame. The receiver starts to transmit the data burst at the number n sub-frame of the number i frame or a later frame. Specifically, the number m sub-frame of the downlink interval indicates transmission of the data burst at the number n uplink sub-frame, the floor function of which has a value of m (floor(n/K)=m), and the location n for the start of the data burst transmission is determined by K and m that is obtained by floor(n/K). That is, n has a value of $$\left\lceil \frac{m}{K} \right\rceil, \left\lceil \frac{m}{K} \right\rceil + 1, \ldots, \text{or} \left\lceil \frac{m+1}{K} \right\rceil - 1.$$

Further, when there exists at least one value for n, a MAP is used to indicate the number n sub-frame for the actual transmission. An ACK or NACK with respect to the transmission of the data burst is transmitted at the number m downlink sub-frame of the number (i+1) frame or a later frame.

Thereafter, in response to the ACK or NACK, the transmitter starts to transmit or retransmit a data burst at the number n sub-frame, which has the same index, of the number (i+1) frame or a later frame.

The above description is based on an assumption that the MAP is indicated by the base station. However, not only the base station but also another system having a control capability for resource allocation and indication can be taken into consideration. For example, a system including a relay station can be taken into consideration.

In an exemplary embodiment of the present embodiment, since the number of downlink sub-frames is smaller than the number of uplink sub-frames, one downlink sub-frame may indicate data burst transmission in more than one sub-frame through a predefined signaling using a explicit signaling.

Table 5 below illustrates HARQ signal transmission/reception of an FDD wireless mobile communication system according to an exemplary embodiment of the present invention in which one frame includes F time slots.

TABLE 5

| FDD | DL subframe index | | Frame index | UL subframe index | | Frame index |
|---|---|---|---|---|---|---|
| MAP | m | | i | m | | i |
| Burst | m | | i | m ≤ F/2  m + F/2 | | i |
| | | | | m > F/2  m − F/2 | | i + 1 |
| ACK/ | m ≤ F/2 | m + F/2 | i | m | | i + 1 |
| NACK | m > F/2 | m − F/2 | i + 1 | | | |
| ReTx. | m | | i + 1 | m ≤ F/2  m + F/2 | | i + 1 |
| burst | | | | m > F/2  m − F/2 | | i + 2 |

In Table 5, m (m=0, ..., F−1) indicates a sub-frame index in a downlink interval, and n (n=0, ..., F−1) indicates a sub-frame index in an uplink interval, wherein F indicates the number of sub-frames within each of the downlink interval and the uplink interval. Further, when F is an odd number, ceiling(F/2) instead of F/2 is used in order to express an index. In Table 5, the HARQ interlace structure for downlink data burst transmission of an FDD mode is constructed as follows. The MAP information included in the number m downlink sub-frame of the number i frame indicates a data burst transmission starting at the number m sub-frame of the number i frame, and the indicated data burst transmission starts at the number m sub-frame of the number i frame. Further, an ACK or NACK in response to the data burst transmission is transmitted at the number n sub-frame of the number j frame or a later frame by a receiver. Thereafter, in response to the ACK or NACK, the base station starts to transmit or retransmit a data burst at the number m sub-frame of the number (i+1) frame or a later frame. The sub-frame location n and the frame location j for transmission of the ACK or NACK in response to the data burst transmission are determined by n=mod(m+F/2, F) and j=i+floor(m/F+1/2), respectively, based on each data burst transmission location and the number of sub-frames. That is to say, one frame is divided into two areas, wherein the first area of the divided two areas has a corresponding relation in the same or a later frame interval while the second area of the divided two areas has a corresponding relation in a later frame interval. In other words, the case where the index of the sub-frame for providing the downlink indication control channel has a value smaller than or equal to F/2 has an interlace structure different from that of the case where the index of the sub-frame has a value larger than F/2.

Further, the HARQ interlace structure for uplink data burst transmission of the FDD mode is as follows. The MAP information included in the number m downlink sub-frame of the number i frame indicates starting of data burst transmission at the number n sub-frame of the number j frame, and the indicated data burst transmission starts at the number n sub-frame of the number j frame. Further, an ACK or NACK in response to the data burst transmission is transmitted at the number m sub-frame of the number (i+1) frame by a receiver. Thereafter, in response to the ACK or NACK, the transmitter starts to transmit or retransmit a data burst at the number n sub-frame of the number (j+1) frame or a later frame. The sub-frame location n and the frame location j for uplink data burst transmission, which are indicated by the MAP of the number m sub-frame of the number i frame, are determined by n=mod(m+F/2, F) and j=i+floor(m/F+1/2), respectively, based the number of sub-frames F, the sub-frame index m, and the frame index i including each MAP. Here, a delay as long as F/2 exists between every operation. If such a delay is smaller than the transmission and reception processing delay time, the delay lengthens in the following operations frame interval by frame interval.

Meanwhile, in the FDD communication system or in the TDD communication system wherein downlink time slots and uplink time slots are symmetric, downlink sub-frames and uplink sub-frames are 1:1 mapped to each other. However, in an asymmetric TDD communication system, more than one link may be mapped to one reverse directional link. Exemplary embodiments of the present invention propose an HARQ interlace structure in which time slots within a super-frame are grouped into F frames having a corresponding relation between them so that the retransmission delay becomes as long as the length of the frame. Here, in order to make the FDD communication system and the TDD communication system have the same retransmission period, it is necessary to consider the equation, F=M+N. In the TDD communication system, M and N refer to the number of time slots occupied by the downlink interval and the uplink interval, respectively. In contrast, in the FDD communication system, each of the downlink interval and the uplink interval has the same number of time slots, i.e., F time slots.

FIGS. 4A to 4D illustrate frame structures based on the HARQ interlacing according to a first exemplary embodiment of the present invention.

Figure 4A:
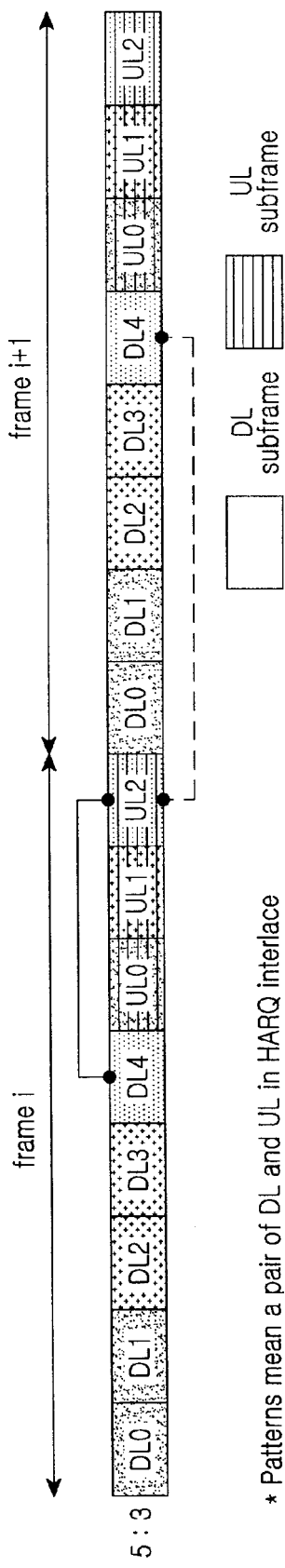
FIGS. 4A to 4D illustrate frame structures based on HARQ interlacing according to a first exemplary embodiment of the present invention.

The frame shown in FIG. 4A may be used in a TDD communication system in which the ratio between the downlink time slots and the uplink time slots is 5:3. In the frame shown in FIG. 4A, each downlink time slot can be mapped to one uplink time slot based on its position. Further, each uplink time slot can be mapped to at least one downlink time slot. This is because the number of downlink time slots is larger than the number of uplink time slots. For example, number 2 and number 3 downlink time slots DL2 and DL3 of the number i frame correspond to number 1 uplink time slot UL1 of the number i frame. Further, number 4 downlink time slots DL4 of the number i frame corresponds to number 2 uplink time slot UL2 of the number i frame.

Table 6 below illustrates signal transmission/reception based on the downlink HARQ interlace structure shown in FIG. 4A as described above. Table 7 below illustrates signal transmission/reception based on the uplink HARQ interlace structure shown in FIG. 4A as described above.

TABLE 6

| Burst (DL) | | ACK (UL) | | ReTx (DL) | |
|---|---|---|---|---|---|
| subframe index | Frame index | subframe index | Frame index | subframe index | Frame index |
| 0 | i | 0 | i | 0 | i + 1 |
| 1 | i |   | i | 1 | i + 1 |
| 2 | i | 1 | i | 2 | i + 1 |
| 3 | i |   | i | 3 | i + 1 |
| 4 | i | 2 | i | 4 | i + 1 |

TABLE 7

| MAP (DL) | | Burst (UL) | | ACK (DL) | | ReTx (UL) | |
|---|---|---|---|---|---|---|---|
| subframe index | Frame index | subframe index | Frame index | subframe index | Frame index | subframe index | Frame index |
| 0 | i | 0 | i | 0 | i + 1 | 0 | i + 1 |
| 1 | i |   | i | 1 | i + 1 |   | i + 1 |
| 2 | i | 1 | i | 2 | i + 1 | 1 | i + 1 |
| 3 | i |   | i | 3 | i + 1 |   | i + 1 |
| 4 | i | 2 | i | 4 | i + 1 | 2 | i + 1 |

In Tables 6 and 7, the sub-frame index corresponds to the order of uplink and downlink time slots in FIG. 4A. For example, in frame i of FIG. 4A, the number 1 downlink sub-frame corresponds to DL1 and the number 1 uplink sub-frame corresponds to UL1. Further, MAP refers to a control channel for providing indication information in the downlink.

Figure 4B:
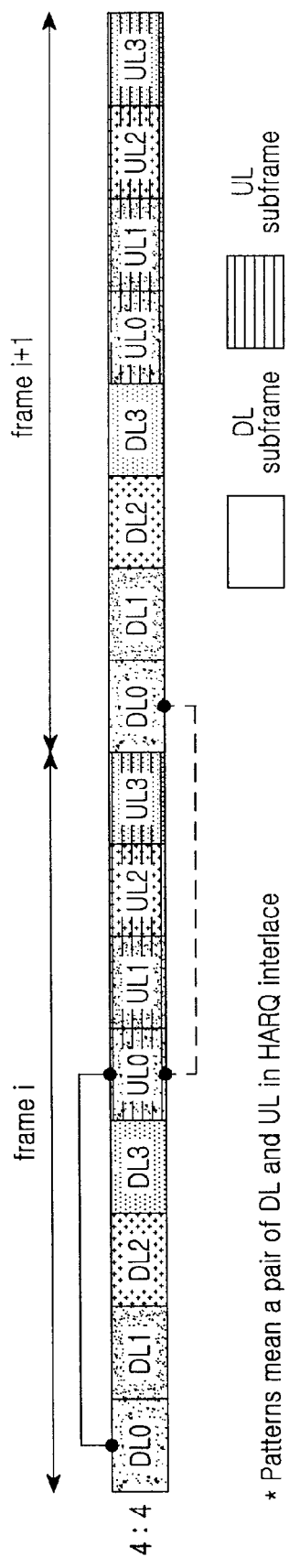

The frame of FIG. 4B can be used in a TDD communication system in which the ratio between downlink time slots and uplink time slots is 4:4.

Tables 8 and 9 below illustrate signal transmission/reception based on the HARQ interlace structure in the downlink and uplink time slots shown in FIG. 4B.

TABLE 8

| DL data burst | | | | | |
|---|---|---|---|---|---|
| MAP & data burst (DL) | | ACK (UL) | | ReTx (DL) | |
| subframe | Frame | subframe | Frame index | Subframe | Frame index |
| 0 | i | 0 | i | 0 | i + 1 |
| 1 | i | 1 | i | 1 | i + 1 |
| 2 | i | 2 | i | 2 | i + 1 |
| 3 | i | 3 | i | 3 | i + 1 |

TABLE 9

| UL burst | | | | | | | |
|---|---|---|---|---|---|---|---|
| MAP (DL) | | Burst (UL) | | ACK (DL) | | ReTx (UL) | |
| subframe index | Frame index | subframe index | Frame index | subframe index | Frame index | subframe index | Frame index |
| 0 | i | 0 | i | 0 | i + 1 | 0 | i + 1 |
| 1 | i | 1 | i | 1 | i + 1 | 1 | i + 1 |
| 2 | i | 2 | i | 2 | i + 1 | 2 | i + 1 |
| 3 | i | 3 | i | 3 | i + 1 | 3 | i + 1 |

Figure 4C:
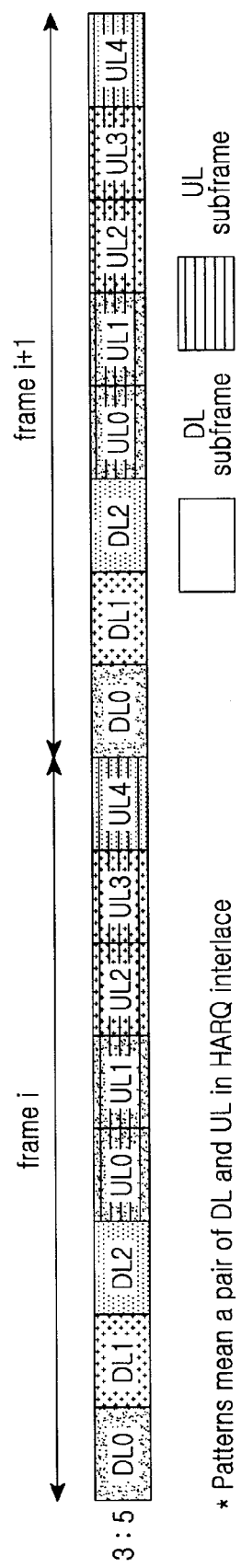

The frame of FIG. 4C can be used in a TDD communication system in which the ratio between downlink time slots and uplink time slots is 3:5.

Tables 10 and 11 below illustrate signal transmission/reception based on the downlink and uplink HARQ interlace structure shown in FIG. 4C.

TABLE 10

| DL data burst | | | | | |
|---|---|---|---|---|---|
| MAP & Data burst (DL) | | ACK (UL) | | ReTx (DL) | |
| subframe index | Frame index | subframe index | Frame index | Subframe index | Frame index |
| 0 | i | 0 | i | 0 | i + 1 |
|   | i | 1 | i |   | i + 1 |
| 1 | i | 2 | i | 1 | i + 1 |
|   | i | 3 | i |   | i + 1 |
| 2 | i | 4 | i | 2 | i + 1 |

TABLE 11

| UL Data burst | | | | | | | |
|---|---|---|---|---|---|---|---|
| MAP (DL) | | Data burst (UL) | | ACK (DL) | | ReTx (UL) | |
| subframe index | Frame index | subframe index | Frame index | Sub frame index | Frame index | subframe index | Frame index |
| 0 | i | 0 | i | 0 | i + 1 | 0 | i + 1 |
|   | i | 1 | i |   | i + 1 | 1 | i + 1 |
| 1 | i | 2 | i | 1 | i + 1 | 2 | i + 1 |
|   | i | 3 | i |   | i + 1 | 3 | i + 1 |
| 2 | i | 4 | i | 2 | i + 1 | 4 | i + 1 |

Figure 4D:
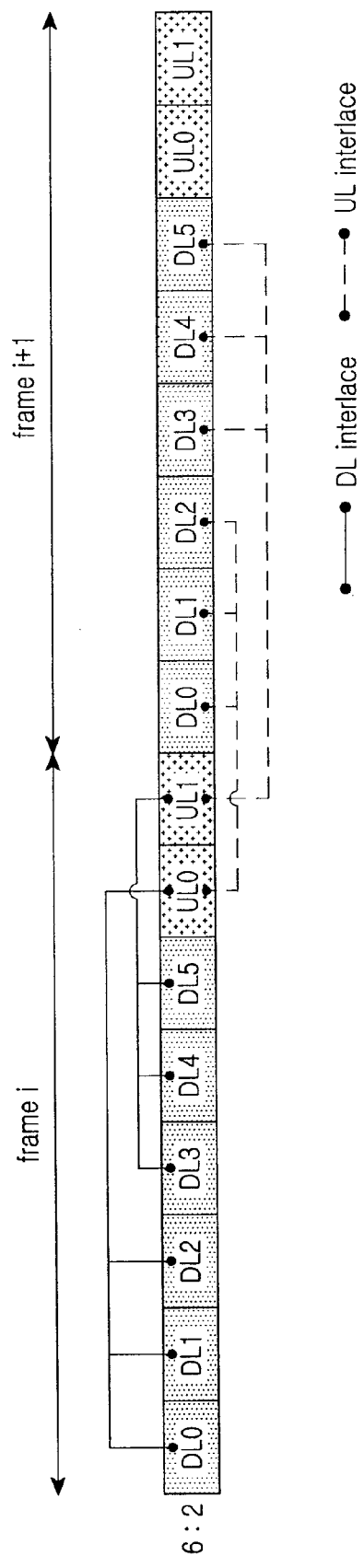

The frame of FIG. 4D can be used in a TDD communication system in which the ratio between downlink time slots and uplink time slots is 6:2.

Tables 12 and 13 below illustrate signal transmission/reception based on the downlink and uplink HARQ interlace structure shown in FIG. 4D.

TABLE 12

| MAP & Data burst (DL) | | ACK (UL) | | ReTx (DL) | |
| --- | --- | --- | --- | --- | --- |
| subframe index | Frame index | subframe index | Frame index | Subframe index | Frame index |
| 0 | i | 0 | i | 0 | i + 1 |
| 1 | i |   |   | 1 | i + 1 |
| 2 | i |   |   | 2 | i + 1 |
| 3 | i | 1 | i | 3 | i + 1 |
| 4 | i |   |   | 4 | i + 1 |
| 5 | i |   |   | 5 | i + 1 |

TABLE 13

| MAP (DL) | | Data burst (UL) | | ACK (DL) | | ReTx (UL) | |
| --- | --- | --- | --- | --- | --- | --- | --- |
| subframe index | Frame index | subframe index | Frame index | Subframe index | Frame index | subframe index | Frame index |
| 0 | i | 0 | i | 0 | i + 1 | 0 | i + 1 |
| 1 | i |   |   | 1 | i + 1 |   | i + 1 |
| 2 | i |   |   | 2 | i + 1 |   | i + 1 |
| 3 | i | 1 | i | 3 | i + 1 | 1 | i + 1 |
| 4 | i |   |   | 4 | i + 1 |   | i + 1 |
| 5 | i |   |   | 5 | i + 1 |   | i + 1 |

Tables 6 to 13 show examples of HARQ interlace structures in each sub-frame produced according to an HARQ interlace structure rule in a TDD communication system defined by Tables 3 and 4.

Figure 5:
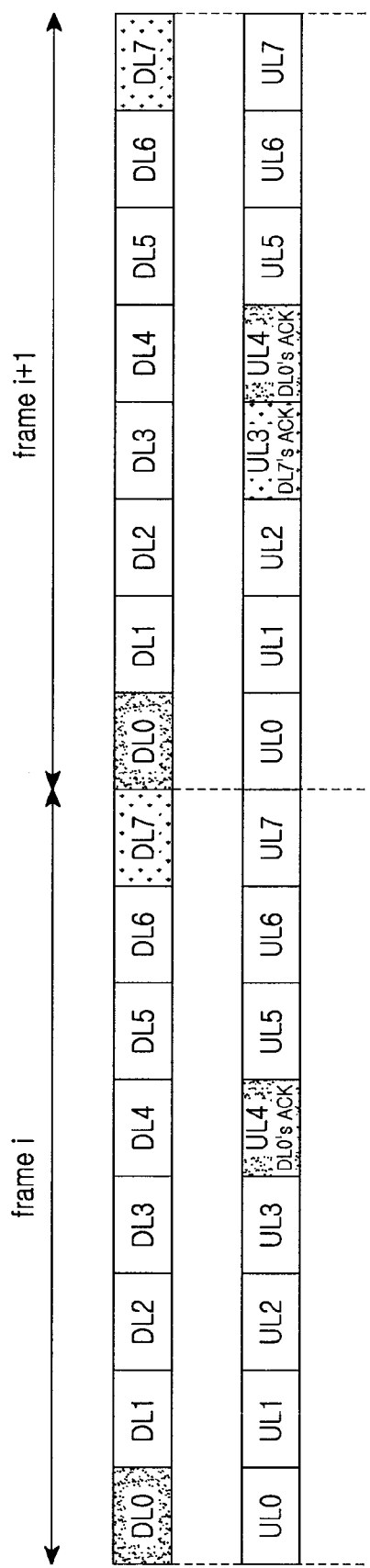
FIG. 5 illustrates HARQ signal transmission/reception of a downlink data burst in an FDD wireless mobile communication system according to the first exemplary embodiment of the present invention.

FIG. 5 illustrates HARQ signal transmission/reception of a downlink data burst in an FDD wireless mobile communication system according to the first exemplary embodiment of the present invention.

Referring to FIG. 5, one FA may include eight time slots. As used herein, F indicates the number of sub-frames configuring one frame in an FDD communication system. In the case of a downlink, feedback in response to data bursts transmitted in time slots, turns of which are prior to $$\frac{F}{2}$$

(i.e. ordinal numbers of which are smaller than $$\frac{F}{2}),$$

in one frame are transmitted within the same frame. However, feedback in response to data bursts transmitted in time slots, turns of which are posterior to $$\frac{F}{2}$$

(i.e. ordinal numbers of which are larger than $$\frac{F}{2}),$$

in one frame are transmitted within the next frame.

For example, in the case where F=8, when a MAP of a transmitter in the DL0 time slot of the number i frame indicates transmission of a data burst starting from the DL0 time slot of the number i frame, an ACK or NACK with respect to the data burst having started to be transmitted from the DL0 time slot of the number i frame is transmitted through the UL4 time slot of the number i frame. However, when a MAP of the transmitter indicates transmission of a data burst starting from the DL7 time slot of the number i frame, an ACK or NACK with respect to the data burst having started to be transmitted from the DL7 time slot of the number i frame is transmitted through the UL3 time slot of the number (i+1) frame. Although FIG. 5 illustrates an example in which data bursts are transmitted in the DL0 and DL7 time slots, Table 14 below shows an HARQ signal transmission/reception relation for data burst transmission provided by each sub-frame in an FDD communication system wherein F=8.

Table 14 below shows HARQ signal transmission/reception for downlink data burst transmission in an FDD communication system as shown in FIG. 5.

TABLE 14

| MAP | | Data burst | | ACK | | ReTx. | |
| --- | --- | --- | --- | --- | --- | --- | --- |
| subframe index | Frame index | Subframe index | Frame index | subframe index | Frame index | Subframe index | Frame index |
| 0 | i | 0 | i | 4 | i | 0 | i + 1 |
| 1 | i | 1 | i | 5 | i | 1 | i + 1 |
| 2 | i | 2 | i | 6 | i | 2 | i + 1 |
| 3 | i | 3 | i | 7 | i | 3 | i + 1 |
| 4 | i | 4 | i | 0 | i + 1 | 4 | i + 1 |
| 5 | i | 5 | i | 1 | i + 1 | 5 | i + 1 |
| 6 | i | 6 | i | 2 | i + 1 | 6 | i + 1 |
| 7 | i | 7 | i | 3 | i + 1 | 7 | i + 1 |

Figure 6:
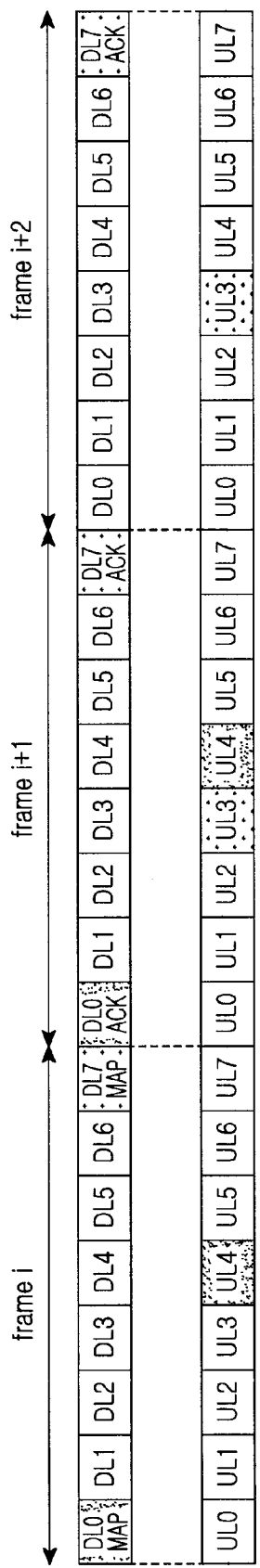
FIG. 6 illustrates HARQ signal transmission/reception of uplink data bursts in an FDD wireless mobile communication system according to the first exemplary embodiment of the present invention.

FIG. 6 illustrates HARQ signal transmission/reception of uplink data bursts in an FDD wireless mobile communication system according to the first exemplary embodiment of the present invention.

Referring to FIG. 6, a transmitter receives a MAP through a DL0 time slot in the number i frame, and starts to transmit an uplink data burst through a UL4 time slot of the number i frame.

Table 15 below shows HARQ signal transmission/reception for uplink data burst transmission in an FDD communication system as shown in FIG. 6.

TABLE 15

| MAP | | Data burst | | ACK | | ReTx. | |
|---|---|---|---|---|---|---|---|
| Subframe index | Frame index | Subframe index | Frame index | Subframe index | Frame index | subframe index | Frame index |
| 0 | i | 4 | i | 0 | i | 4 | i + 1 |
| 1 | i | 5 | i | 1 | i | 5 | i + 1 |
| 2 | i | 6 | i | 2 | i | 6 | i + 1 |
| 3 | i | 7 | i | 3 | i | 7 | i + 1 |
| 4 | i | 0 | i + 1 | 4 | i + 1 | 0 | i + 2 |
| 5 | i | 1 | i + 1 | 5 | i + 1 | 1 | i + 2 |
| 6 | i | 2 | i + 1 | 6 | i + 1 | 2 | i + 2 |
| 7 | i | 3 | i + 1 | 7 | i + 1 | 3 | i + 2 |

In the meantime, according to development of communication technology, a conventional communication system and an evolved communication system may coexist in a single communication system. In this case, the conventional communication system and the evolved communication system can be discriminated from each other by using a Time Division Multiplexing (TDM) or Frequency Division Multiplexing (FDM).

The following description on an exemplary embodiment of the present invention discusses an example in which the conventional communication system and the evolved communication system are discriminated from each other by using TDM in a downlink interval while they are discriminated from each other by using FDM in an uplink interval. As used herein, one example of the conventional communication system may be an IEEE 802.16e communication system and one example of the evolved communication system may be an IEEE 802.16m communication system. Hereinafter, the conventional communication system will be referred to as an IEEE 802.16e communication system, and the evolved communication system will be referred to as an IEEE 802.16m communication system.

In a time-divided downlink interval, the number and locations of time slots occupied by the systems are different according to a coexistence ratio. The coexistence ratio refers to a ratio between the quantities of resources allocated to the IEEE 802.16e communication system and the IEEE 802.16m communication system. The quantity of resources may be calculated in the unit of a time slot and a frequency band, for example, a sub-channel. When two systems are multiplexed through frequency division of an uplink interval as described above, an ACK/NACK corresponding relation for data bursts starting to be transmitted in a sub-frame within a downlink interval is equal to the corresponding relation within the above-described M:N TDD communication system. However, when the coexistence is achieved through multiplexing of the downlink, the number of time slots usable by an HARQ interlace structure in the downlink interval is different between the two systems. Therefore, in the exemplary embodiment of the present invention, an HARQ interlace structure in a resource area used for the IEEE 802.16m communication system should take a time interval ratio within an IEEE 802.16m area into consideration. When the corresponding relation are configured in the way described above or below, if a system occupies a small area and fails to secure a processing delay time up to a corresponding sub-frame, the delay is extended up to the same sub-frame of the next frame. In the coexistence mode as described above, the HARQ timing corresponding structure is determined according to the ratio between the uplink and the downlink in an IEEE 802.16m area. The following description is based on an example using an HARQ timing structure defined in Tables 3 and 4.

Figure 7A:
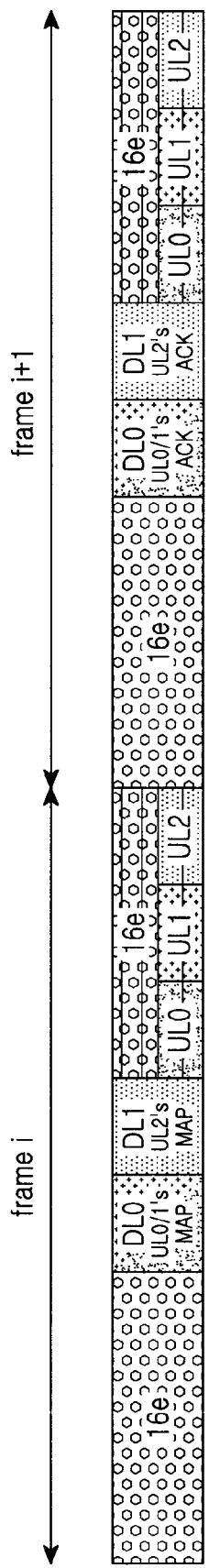
FIGS. 7A to 7C illustrate frame structures with various coexistences according to the first exemplary embodiment of the present invention.
Figure 7B:
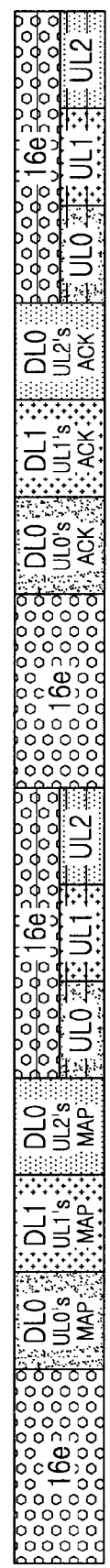
Figure 7C:
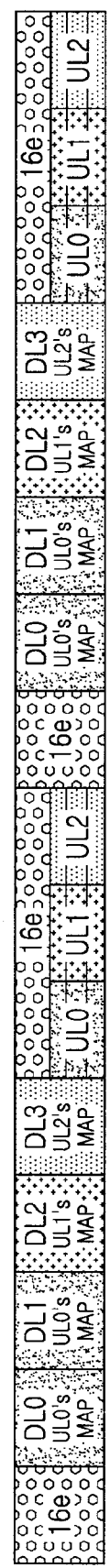

FIGS. 7A to 7C illustrate frame structures with various coexistences according to the first exemplary embodiment of the present invention.

In the case of the downlink interval shown in FIG. 7A, the IEEE 802.16e communication system occupies three time slots, and the IEEE 802.16m communication system occupies two time slots. Further, in the case of the uplink, the ratio between the frequency bands occupied by the IEEE 802.16e communication system and the frequency bands occupied by the IEEE 802.16m communication system is 3:2. Therefore, the frame structure shown in FIG. 7A has a coexistence ratio of 3:2. Meanwhile, in the case of taking only the frame area of the IEEE 802.16m communication system into consideration, the ratio between the downlink time slots and the uplink time slots is 2:3. Therefore, the HARQ interlace structure is determined based on the ratio of 2:3.

In the case of the downlink interval shown in FIG. 7B, the IEEE 802.16e communication system occupies two time slots, and the IEEE 802.16m communication system occupies three time slots. Further, in the case of the uplink, the ratio between the frequency bands occupied by the IEEE 802.16e communication system and the frequency bands occupied by the IEEE 802.16m communication system is 2:3. Therefore, the frame structure shown in FIG. 7B has a coexistence ratio of 2:3. Meanwhile, in the case of taking only the frame area of the IEEE 802.16m communication system into consideration, the ratio between the downlink time slots and the uplink time slots is 3:3.

In the case of the downlink interval shown in FIG. 7C, the IEEE 802.16e communication system occupies one time slot, and the IEEE 802.16m communication system occupies four time slots. Further, in the case of the uplink, the ratio between the frequency bands occupied by the IEEE 802.16e communication system and the frequency bands occupied by the IEEE 802.16m communication system is 1:4. Therefore, the frame structure shown in FIG. 7C has a coexistence ratio of 1:4. Meanwhile, in the case of taking only the frame area of the IEEE 802.16m communication system into consideration, the ratio between the downlink time slots and the uplink time slots is 3:3. Meanwhile, in the IEEE 802.16m communication system, the ratio between downlink time slots and uplink time slots is 4:3.

When the IEEE 802.16e communication system and the IEEE 802.16m communication system coexist, a UL HARQ interlace structure for the 16m communication system may be configured based on the TDD ratios described above. However, in a TDD communication system, when a downlink sub-frame interval corresponding to the coexistence ratio is not an IEEE 802.16m area, it is difficult to configure the UL HARQ interlace structure.

Also, the exemplary embodiment of the present invention proposes a method of configuring a transmission timing structure or a UL HARQ interlace structure in the case where an IEEE 802.16e communication system and an IEEE 802.16m communication system coexist. According to the method proposed by the exemplary embodiment of the present invention, when a corresponding downlink sub-frame is not an IEEE 802.16m area, the UL HARQ interlace structure is configured by making the sub-frame correspond to the nearest sub-frame of the IEEE 802.16m communication system area.

Figure 8A:
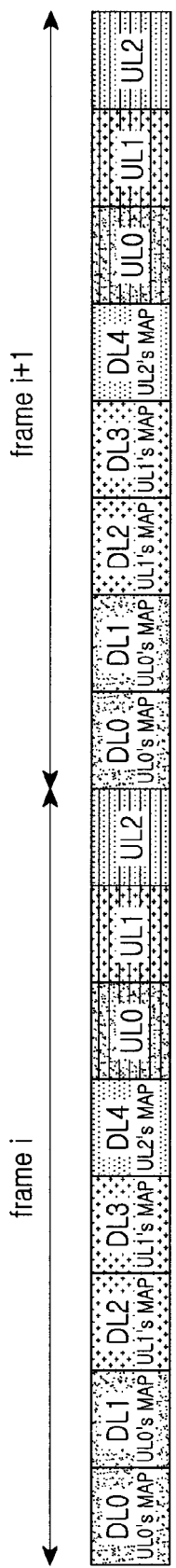
FIGS. 8A and 8B illustrate frame structures in a TDD 5:3 system according to an exemplary embodiment of the present invention.
Figure 8B:

FIGS. 8A and 8B illustrate frame structures in a TDD 5:3 system according to an exemplary embodiment of the present invention.

FIG. 8A illustrates a UL HARQ interlace structure in a TDD communication system having a downlink-uplink ratio of 5:3, and FIG. 8B illustrates an example of a UL HARQ interlace structure when a coexistence ratio 2:3 between a conventional (IEEE 802.16e) communication system and a new (IEEE 802.16m) communication system in a TDD communication system having a downlink-uplink ratio of 5:3. In the illustrated example, the two systems are time division multiplexed in the uplink and are frequency division multiplexed in the downlink.

In the frame structure shown in FIG. 8A, an uplink sub-frame UL0 corresponds to a downlink sub-frame DL0 or DL1, an uplink sub-frame UL1 corresponds to a downlink sub-frame DL2 or DL3, and an uplink sub-frame UL2 corresponds to a downlink sub-frame DL4. However, since the coexistence ratio is 2:3, the IEEE 802.16m communication system uses the areas from DL2 to DL4. Therefore, it is necessary to configure another transmission timing structure for the uplink sub-frame UL0. In the frame structure shown in FIG. 8B, the HARQ interlace structure for the UL0 is configured by making the UL0 correspond to the DL2 adjacent to the DL0 and the DL1, which correspond to the UL0 in FIG. 8A. That is, when the coexistence ratio is 2:3 in a TDD communication system having a downlink-uplink ratio of 5:3, a UL HARQ interlace structure may have a configuration in which a DL2 sub-frame in an IEEE 802.16m area corresponds to an uplink sub-frame UL0 or UL1.

When different systems (for example, an IEEE 802.16e system and an IEEE 802.16m system) coexist, the entire frame interval is taken into consideration in HARQ operation of an IEEE 802.16m system. Further, when a time slot corresponding to a particular time slot of an IEEE 802.16e system is not a time slot included in an IEEE 802.16m area, the nearest time slot of the IEEE 802.16m area after the time slot corresponding to the particular time slot is made to correspond to the particular time slot.

Figure 9A:
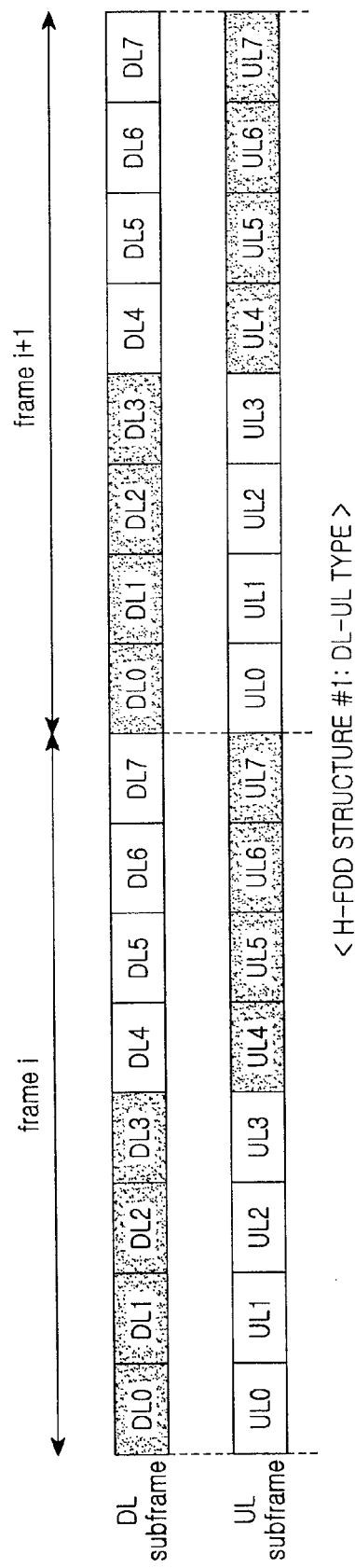
FIGS. 9A and 9B illustrate frame structures of a Half duplex-FDD (H-FDD) mode according to the first exemplary embodiment of the present invention.
Figure 9B:
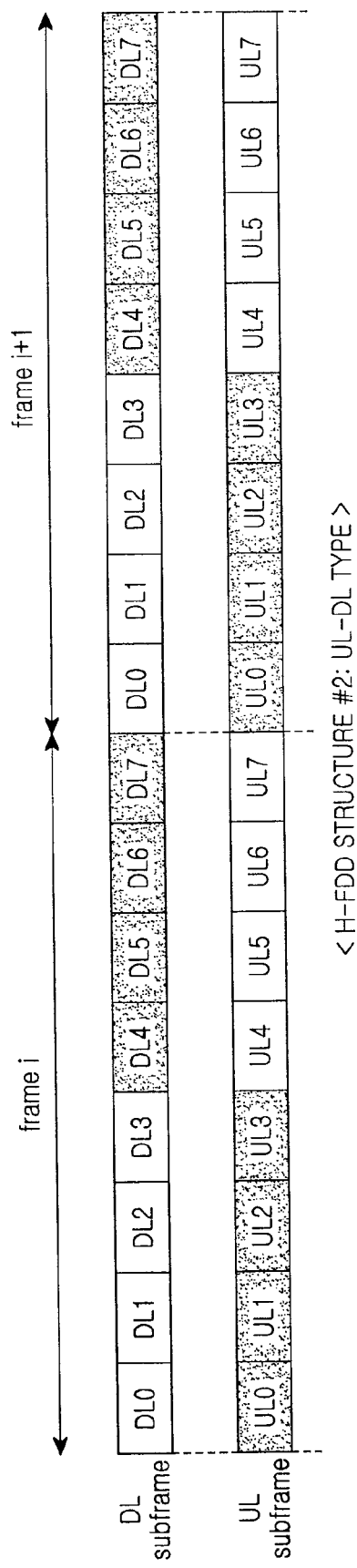

FIGS. 9A and 9B illustrate frame structures of an H-FDD mode according to the first exemplary embodiment of the present invention.

In FIG. 9A showing a DL-UL structure, which is an H-FDD structure, the HARQ interlace structure includes DL0 to DL3 in the downlink interval and UL4 to UL7 in the uplink interval. In FIG. 9B showing a UL-DL structure, which is another H-FDD structure, the HARQ interlace structure includes DL4 to DL7 in the downlink interval and UL0 to UL3 in the uplink interval.

In FIGS. 9A and 9B, the ratio between the downlink and the uplink is 4:4 (DL:UL=4). However, in a frame to which the H-FDD scheme is applied, the ratio of DL:UL may change according to the cell loading situation and communication environments. Therefore, in the H-FDD scheme, the HARQ interlace structure is based on an HARQ structure of the above-described TDD scheme, and the sub-frame index is determined by a shift of the above-described H-FDD structure.

Hereinafter, various HARQ interlace structures will be described with reference to Tables 16 to 19 below. Terms used in Tables 16 to 19 below are defined as follows. M and N refer to the number of sub-frames included in an uplink interval and a downlink interval, respectively. K is defined by M/N, and * indicates an index of the first sub-frame occupied by a data burst (m, . . . , m+L−1). When, for example, one data burst is transmitted or received while occupying at least two time slots, * indicates an index of the first sub-frame (i.e. the first time slot) from among occupied time slots.

Tables 16 and 17 show an uplink interlace structure and a downlink interlace structure with a DL-UL type H-FDD structure in an H-FDD communication system, respectively.

TABLE 16

| M:N | subframe Index M ≥ N | subframe Index M < N | Frame Index |
|---|---|---|---|
| MAP | m | m | i |
| Data Burst | m* | m* | i |
| ACK | n = M + floor(m/K) | $n \in \{\lceil \frac{m}{K} \rceil + M, \lceil \frac{m}{K} \rceil + 1 + M, \ldots, \lceil \frac{m+1}{K} \rceil - 1 + M\}$ | i |
| ReTx | m* | m* | i + 1 |

TABLE 17

| M:N | subframe Index M ≥ N | subframe Index M < N | Frame Index |
|---|---|---|---|
| MAP | m | m | i |
| Data Burst | m* | m* | i |
| ACK | n = M + floor(m/K) | $n \in \{\lceil \frac{m}{K} \rceil + M, \lceil \frac{m}{K} \rceil + 1 + M, \ldots, \lceil \frac{m+1}{K} \rceil - 1 + M\}$ | i |
| ReTx | m* | m* | i + 1 |

Tables 16 and 17 show an uplink HARQ interlace structure and a downlink HARQ interlace structure for an H-FDD DU structure. In Tables 16 and 17, m indicates an index of a sub-frame included in a downlink interval (m=0, . . . , M−1), n indicates an index of a sub-frame included in an uplink interval (n=M, . . . , M+N−1), and i indicates a frame index (i=0, . . . , 3).

Figure 16:
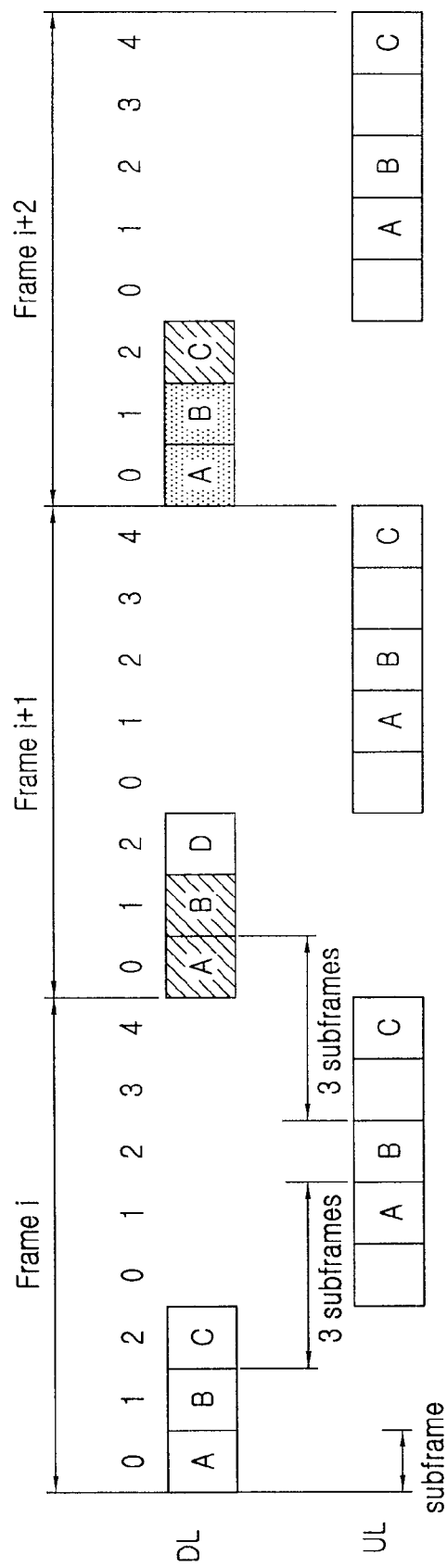
FIG. 16 illustrates an HARQ interlace structure in a 3:5 TDD communication system according to an exemplary embodiment of the present invention.
Figure 17:
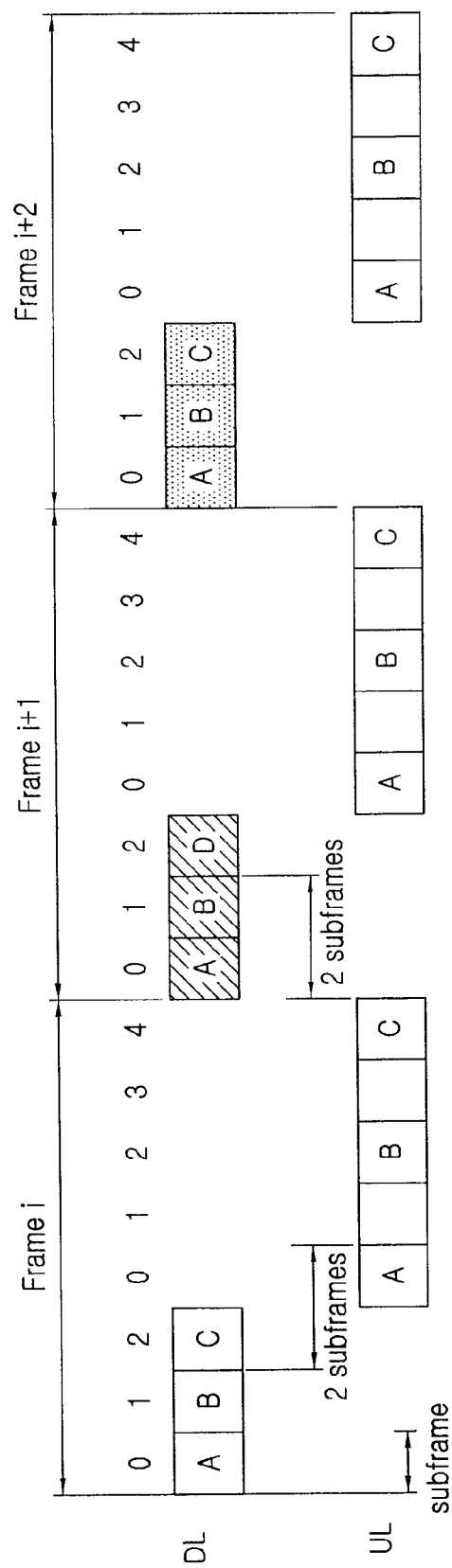
FIG. 17 illustrates an HARQ interlace structure in a 3:5 TDD communication system according to an exemplary embodiment of the present invention.

Referring to FIGS. 16 and 17, in the DL-UL structure (i.e. DU structure), since the uplink (UL) interval is located temporally after the downlink sub-frames, the sub-frame index n of a sub-frame included in the uplink interval is determined after being shifted as much as M corresponding to the number of sub-frames occupying the downlink. As used herein, F time slots are divided by M:N for configuration of the downlink interval and the uplink interval.

Tables 18 and 19 below show a downlink interlace structure and an uplink interlace structure with a UL-DL type H-FDD structure in an H-FDD communication system, respectively.

TABLE 18

| M:N | subframe Index | | Frame Index |
|---|---|---|---|
| | $M \geq N$ | $M < N$ | |
| MAP | $m = N + m'$ | $m = N + m'$ | i |
| Data | $m^*$ | $m^*$ | i |
| ACK | $n = \text{floor}(m'/K)$ | $n \in \left\{ \lceil \frac{m}{K} \rceil, \lceil \frac{m}{K} \rceil + 1, \ldots, \lceil \frac{m+1}{K} \rceil - 1 \right\}$ | i + 1 |
| ReTx | $m^*$ | $m^*$ | i + 1 |

TABLE 19

| M:N | subframe Index | | Frame Index |
|---|---|---|---|
| | $M \geq N$ | $M < N$ | |
| MAP | $m = m' + M$ | $m = m' + M$ | i |
| Data Burst | $n^* = \text{floor}(m/K)$ | $n * \in \left\{ \lceil \frac{m}{K} \rceil, \lceil \frac{m}{K} \rceil + 1, \ldots, \lceil \frac{m+1}{K} \rceil - 1 \right\}$ | i + 1 |
| ACK | m | m | i + 1 |
| ReTx | n | n | i + 2 |

Tables 18 and 19 show a downlink HARQ interlace structure and an uplink HARQ interlace structure for an H-FDD UD structure. In Tables 18 and 19, m indicates an index of a sub-frame included in a downlink interval (m=N, . . . , N+M−1), n indicates an index of a sub-frame included in an uplink interval (n=0, . . . , N−1), and i indicates a frame index (i=0, . . . , 3). Referring to tables 18 and 19, in the UL-DL structure, since the downlink interval is located temporally after the uplink interval, the sub-frame index m of a sub-frame included in the downlink interval is determined after being shifted as much as N corresponding to the number of sub-frames occupying the uplink. In Tables 18 and 19, m' indicates an order of the sub-frames in the downlink interval.

Although FIGS. 9A and 9B show 4:4 HARQ interlace structures, it is possible to employ HARQ interlace structures having various ratios, such as 3:5 and 5:3. For example, in the case of an HARQ interlace structure having a DL-UL ratio of 3:5, DL0, DL1, and DL2 correspond to UL3, UL4, UL5, UL6, and UL7 in FIGS. 9A and 9B.

Further, in allocating a feedback link or a burst link based on an HARQ interlace structure in an FDD communication system as described above, it is possible to support a hybrid FDD system by preventing simultaneous allocation of the number i time slot and the number (i+F/2) time slot.

In an exemplary embodiment of the present invention, a structure having an HARQ retransmission delay of a length corresponding to one frame is referred to as a fast HARQ interlace structure. In a TDD frame structure in which a downlink and an uplink are temporally discriminated from each other, the length of each sub-frame should be longer than the transmission/reception delay (process delay) length, i.e. the transmission/reception delay time, in order to support a fast HARQ interlace structure, in which a data burst is transmitted or retransmitted at the same position in each frame while having a retransmission delay corresponding to the frame length.

Therefore, in order to support a retransmission delay with a predefined length in a TDD frame structure, the exemplary embodiment of the present invention proposes a structure in which each sub-frame has a length longer than a data burst transmission or reception processing delay time. As a result, the exemplary embodiment of the present invention can support a fast HARQ interlace structure in all sub-frames within a frame. If the length of a sub-frame is shorter than the transmission or reception processing delay time, there exists a sub-frame incapable of supporting the fast HARQ interlace structure. Then, a corresponding operation is performed in a sub-frame having the same index in a frame thereafter. This case is called a slow HARQ interlace. This sub-frame is usually located at an area adjacent to another link interval and corresponds to a sub-frame located at either end of the link interval. Also, a slow HARQ interlace may be considered for a burst transmission interval has larger than one subframe (called, long TTI). When the transmission processing delay time and the reception processing delay time are different from each other, and when the uplink interval and the downlink are longer than the longer delay time from among the transmission processing delay time and the reception processing delay time, it is possible to achieve a fast retransmission time. For example, if two sub-frames are required for a transmission or reception processing delay of a data burst transmitted during one sub-frame, each of the downlink interval and the uplink interval should include at least three sub-frames.

When the transmission processing or reception processing time makes it difficult to perform the HARQ operation based on the corresponding relation proposed by the exemplary embodiment of the present invention, the operation is performed at the same sub-frame of a later frame due to the corresponding relation. Further, although the period of each HARQ operation may change, the location of the corresponding sub-frame is the same.

Hereinafter, a second exemplary embodiment of the present invention will be described. According to the second exemplary embodiment of the present invention, a system capability (e.g. transmission and reception processing time), a burst transmission interval, or the location of a sub-frame transmitting a burst determines the time point of HARQ feedback or retransmission, and may achieve free MAP timing of indicating transmission of a data burst. In other words, according to the second exemplary embodiment of the present invention, it is possible to indicate transmission of a data burst at a position before transmission of the data burst. Further, according to the second exemplary embodiment of the present invention, links are divided into data burst transmission links for transmission of a data burst and feedback links for feeding back information on existence or absence of a detected data burst error. That is, when a downlink data burst is transmitted, the downlink serves as a data burst transmitting link and the uplink serves as a feedback link. When an uplink data burst is transmitted, the uplink serves as a data burst transmitting link and the downlink serves as a feedback link.

Before further describing the second exemplary embodiment of the present invention, the types and definitions of delays are described below.

Figure 1:
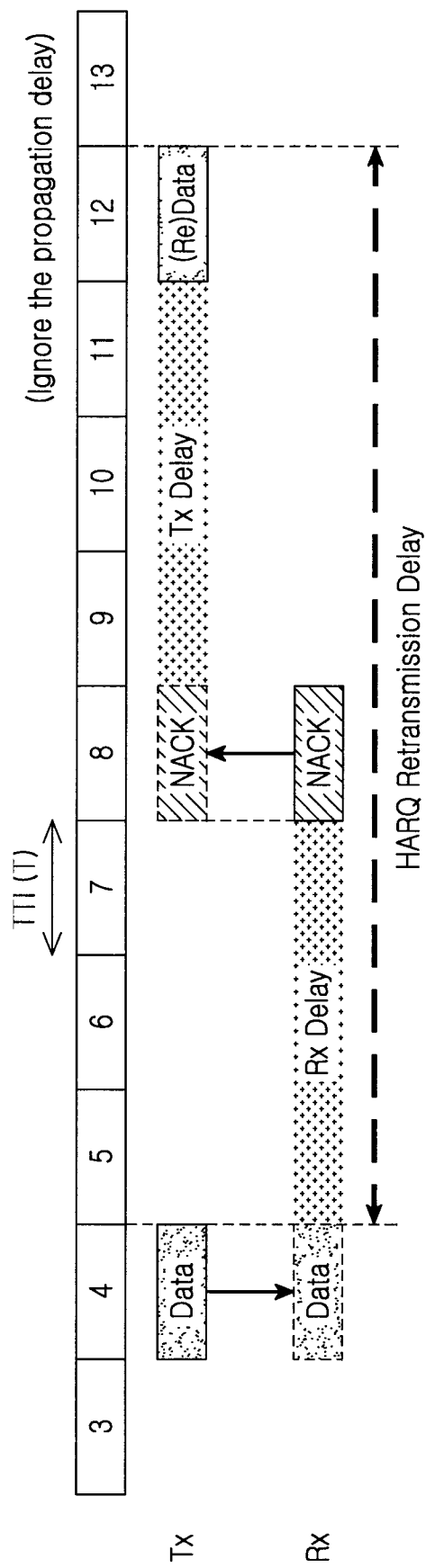
FIG. 1 illustrates a retransmission delay according to a conventional HARQ.
Figure 2A:
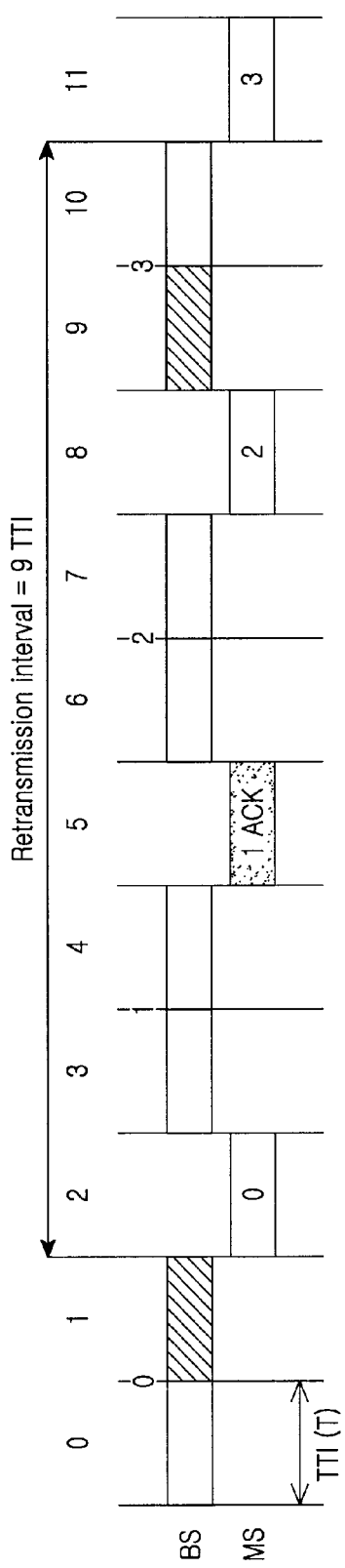
FIGS. 2A and 2B illustrate a downlink Hybrid Automatic Repeat reQuest (HARQ) interlace structure according to a conventional Mobile Broadband Time Division Duplex (MB-TDD) scheme.
Figure 2B:
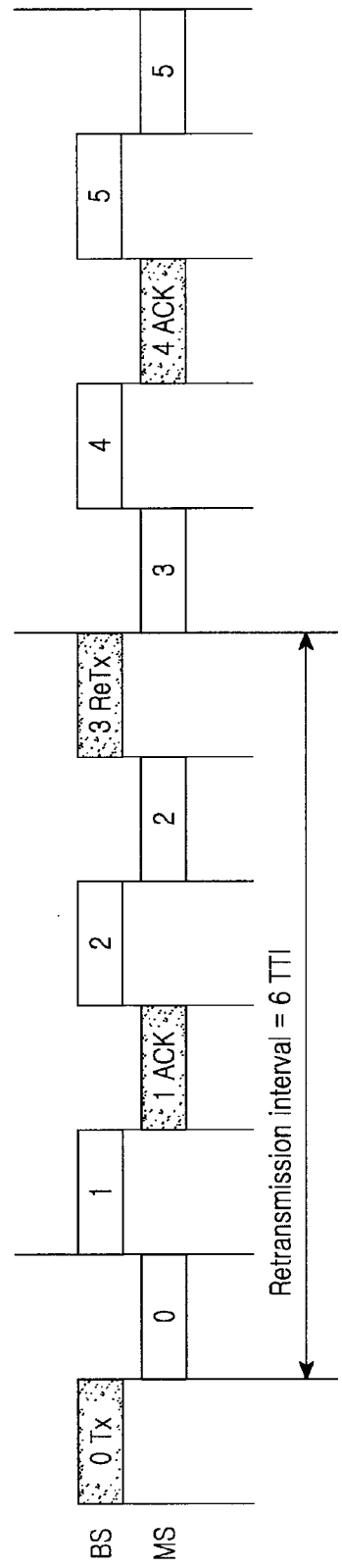

The delays described in the second exemplary embodiment of the present invention are similar to those described above with reference to FIG. 1. That is, an HARQ retransmission delay refers to a time interval between data burst transmission and data burst retransmission.

The transmission delay refers to a time interval from a sub-frame next to the sub-frame in which a NACK is received to a sub-frame before the sub-frame in which a data burst is retransmitted, or a time interval from reception of an indication of data burst transmission up to before transmission of the data burst.

The transmission offset is determined by an HARQ interlace structure in consideration or a transmission processing time of a transmitter, and refers to a time interval up to a sub-frame starting transmission of a data burst in response to a NACK or MAP transmitted at a predefined sub-frame. That is, a burst is transmitted at a sub-frame after a transmission offset with respect to a MAP or NACK transmitted at the number m sub-frame.

The reception delay refers to a time interval from a sub-frame next to the sub-frame in which a data burst is received to a sub-frame before the sub-frame in which an ACK or NACK is transmitted.

The reception offset is determined by an HARQ interlace structure in consideration or a reception processing time of a receiver, and refers to a time interval up to a sub-frame for transmitting an HARQ feedback in response to transmission of a data burst started at a predefined sub-frame. That is, an HARQ feedback is transmitted at a sub-frame after a reception offset with respect to a data burst transmitted at the number m sub-frame.

The retransmission interval refers to a time interval from transmission of a NACK for a received data burst up to re-reception of the data burst. That is, the retransmission interval is expressed as a sum of the transmission offset and the reception offset.

According to the second exemplary embodiment of the present invention, in order to determine transmission timing for a frame-based HARQ operation including F sub-frames, it is assumed as follows: a data burst transmission link interval includes M sub-frames, a feedback link interval includes N sub-frames, and one frame includes F sub-frames, i.e. (M+N) sub-frames.

Table 20 below shows an HARQ operation timing between data burst transmission, ACK (NACK) transmission, and data burst retransmission when a delay does not occur in a TDD communication system.

TABLE 20

| Operation | Sub-frame index in each | Frame index |
|---|---|---|
| Data transmission in Data Burst Tx Link | m | $i$ |
| ACK transmission in Feedback Link | n | i |
| Data Retransmission in Data Burst Tx Link | m | i + 1 |

In Table 20, m denotes a burst link sub-frame index, n denotes a feedback link sub-frame index, and m and n are determined by a corresponding structure for supporting HARQ. The present invention propose the corresponding structure which is formulated by various methods.

A reception delay when data burst transmission, reception and feedback transmission can be performed within one frame in a TDD communication system is determined by formula (2) defined below.

$$M-m+n \quad (2)$$

In formula (2), m and n are determined by an HARQ timing structure in consideration.

However, when a receiver does not have a sufficient time for decoding a data burst and then transmitting feedback after receiving the data burst, it is difficult to apply formula (2).

Figure 10:
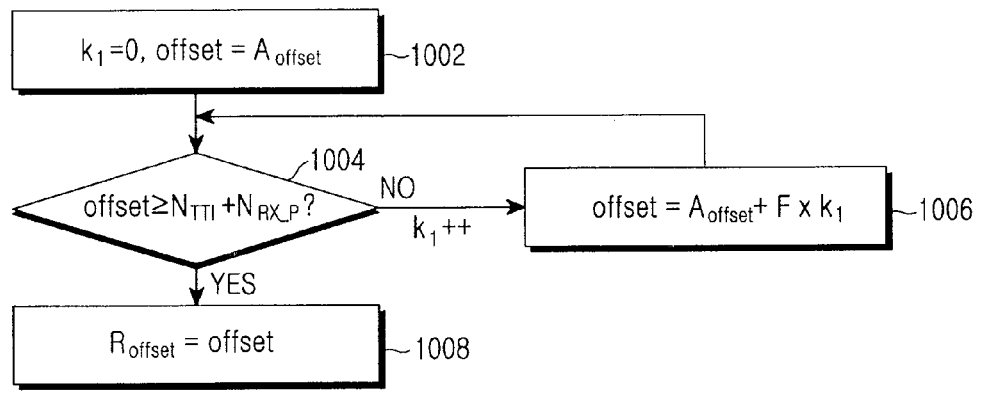
FIG. 10 is a flow diagram illustrating a process of determining $R_{offset}$ by a receiver according to a second exemplary embodiment of the present invention.

FIG. 10 is a flow diagram illustrating a process of determining $R_{offset}$ by a receiver according to the second exemplary embodiment of the present invention.

Referring to FIG. 10, in step 1002, the receiver initializes $k_1$ to 0 and an offset value to $A_{offset}$. Then, in step 1004, the receiver determines if the offset value is larger than or equal to $(N_{TTI}+N_{RX\_P})$. When the offset value is smaller than $(N_{TTI}+N_{RX\_P})$, the receiver adds 1 to $k_1$ and adopts $(A_{offset}+F \times k_1)$ as the offset value in step 1006 and then returns to step 1004. When the offset value is larger than or equal to $(N_{TTI}+N_{RX\_P})$, the receiver adopts $R_{offset}$ as the offset value in step 1008. $R_{offset}$ refers to the number of sub-frames from a sub-frame just after the sub-frame in which the receiver receives a data burst up to the sub-frame in which the receiver transmits a feedback signal. That is, $R_{offset}$ refers to a time delay from the start of receiving a data burst to transmission of an HARQ feedback with respect to the received data burst. An HARQ feedback for the data burst transmitted at the number m time slot is transmitted at a time slot after $R_{offset}$. That is, an HARQ feedback for a data burst transmitted at the number m time slot of the number i frame is transmitted at the number $\{mod(m+R_{offset}, M+N)-M\}$ sub-frame of the number $\{i+floor((m+R_{offset})/(M+N))\}$ frame. Further, in a UL HARQ, since the uplink follows the downlink, $\{floor((N+m+R_{offset})/(M+N))\}$ is considered for the downlink interval. Herein, (M+N) corresponds to one frame interval.

Hereinafter, a process of determining $R_{offset}$ in FIG. 10 will be described in more detail.

In the above description, $N_{TTI}$ refers to the number of time slots required for transmission of a data burst, and $N_{RX\_P}$ refers to the number of time slots required for processing of a received data burst. Therefore, $(N_{TTI}+N_{RX\_P})$ corresponds to a minimum necessary time interval before a receiver transmits feedback after receiving a data burst. A case where the offset value is smaller than $(N_{TTI}+N_{RX\_P})$ as a result of the determination in step 1004 corresponds to a case where a corresponding link is short so that a time slot corresponding to $(N_{TTI}+N_{RX\_P})$ may not be employed. Therefore, for one-frame delay of the HARQ feedback in order to achieve employment of the time slot, the receiver adds 1 to $k_1$ in step 1006, wherein $k_1$ denotes a parameter for adjusting the feedback timing. For example, when $k_1$ is 0, it implies that a feedback signal is transmitted at the frame in which the receiver has transmitted a data burst. Further, when $k_1$ is 1, it implies that a feedback signal is transmitted at a frame next to the frame in which the receiver has transmitted a data burst. In other words, when $k_1$ is 0, it implies that a sufficient time for processing a data burst has been secured before transmitting an HARQ feedback signal and it is possible to transmit the feedback signal after a reception delay. Further, when $k_1$ is 1, it implies that a sufficient time for processing a data burst has not been secured before transmitting an HARQ feedback signal and the feedback signal should be transmitted after delay of one more frame from the reception delay. As used herein, $k_1$ has a value in the range of 0, 1, 2, ..., $k_{1,max}$. When $k_1$ is 0, a fast feedback is provided. When $k_1>0$, a slow feedback is provided with a delay to the next frame. As noted from formula (2), the feedback for a burst provided at each sub-frame is determined by the location of a sub-frame at which the data burst is transmitted, a location of a sub-frame at which feedback corresponding to the data burst is transmitted, and a ratio between the uplink and the downlink.

In view of the transmission interval, a transmission interval as long as a data burst transmission length is taken into consideration when the number m sub-frame is the starting point of the data burst transmission. In contrast, when the sub-frame is the end point of the data burst transmission, one sub-frame transmitting the data burst at the corresponding time point is taken into consideration. That is, at the end point of the data burst transmission, one sub-frame is taken into consideration for NTTI, due to the reception delay.

Specifically, it is possible to use the HARQ interlace structure defined by Table 3. It is assumed that two sub-frames (i.e. TTIs) are required for data burst reception and one sub-frame is required for data burst transmission in a TDD communication system in which the ratio of a data burst link interval (M):a feedback link interval (N) is 6:2. Then, $N_{RX\_P}$=2, $N_{TTI}$=1, F=8, and K=3. Each of those parameters has a value in the unit of a sub-frame. In the case of a 6:2 DL HARQ, when a data burst is transmitted at the sixth sub-frame (i.e. m=5) of the number i frame of the downlink, since the sixth sub-frame corresponds to the second sub-frame (i.e. n=1) of the uplink, $A_{offset}$ is calculated to be 2 through (M−m+n). $A_{offset}$ having been calculated to be 2 is adopted as the offset value. Then, since 2, the offset value, is smaller than ($N_{TTI}$+$N_{RX\_P}$) as a result of the determination in step 1004, $k_1$ is increased by 1, and the offset value becomes 10 in step 1006. Finally, in step 1008, $R_{offset}$ is determined to be 10. Based on the determined $R_{offset}$, the receiver transmits a feedback signal at the tenth sub-frame after the sub-frame of (m=5), that is, at the number 1 sub-frame of number (i+1) frame, because floor(15/8)=1 and {mod(15, 8)−6}=1.

In the case of a 2:6 UL HARQ, when a data burst is transmitted at the sixth sub-frame (i.e. m=5) of the number i frame of the uplink, since the sub-frame corresponds to the second sub-frame (i.e. n=1) of the downlink, $A_{offset}$ is determined to be 2 in step 1002. $A_{offset}$ having been calculated to be 2 is adopted as the offset value. Then, since 2, the offset value, is smaller than (NTTI+NRX_P) as a result of the determination in step 1004, k1 is increased by 1, and the offset value becomes 10 in step 1006. Finally, in step 1008, $R_{offset}$ is determined to be 10. Based on the determined $R_{offset}$, the receiver transmits a feedback signal at the tenth sub-frame after the sub-frame of (m=5), that is, at the number 1 sub-frame of number (i+2) frame of the downlink, because floor (21/8)=2 and {mod(15, 8)−6}=1.

When a reception delay longer than at least one frame as described above occurs, it is possible to apply formula (3) below instead of formula (2).

$$R_{offset}=M-m+n+k_1\times(M+N), k_1=0,1,\ldots,k_{1,max} \quad (3)$$

In formula (3), M indicates the number of sub-frames of a data burst link, N indicates the number of sub-frames of a feedback link, m denotes a sub-frame index of the data burst link, n denotes a sub-frame index of the feedback link, and k1 indicates a reception delay factor determined by a data burst transmission sub-frame index, a data burst transmission interval, or a reception processing capability of a receiver.

The above description discusses $R_{offset}$. Now, $T_{offset}$ will be described. When a data burst is transmitted through multiple sub-frames, m may be an index of any sub-frame at which the data burst is transmitted. More particularly, m may indicate a starting point or an ending point of the data burst transmission.

A transmission delay when data burst retransmission after reception of a feedback signal by a receiver can be performed within one frame in an M:N TDD communication system is determined by formula (4) defined below.

$$N-n+m \quad (4)$$

However, when a transmitter does not have a sufficient time before transmitting the next HARQ burst after receiving an HARQ feedback, it is difficult to apply formula (4).

Figure 11:
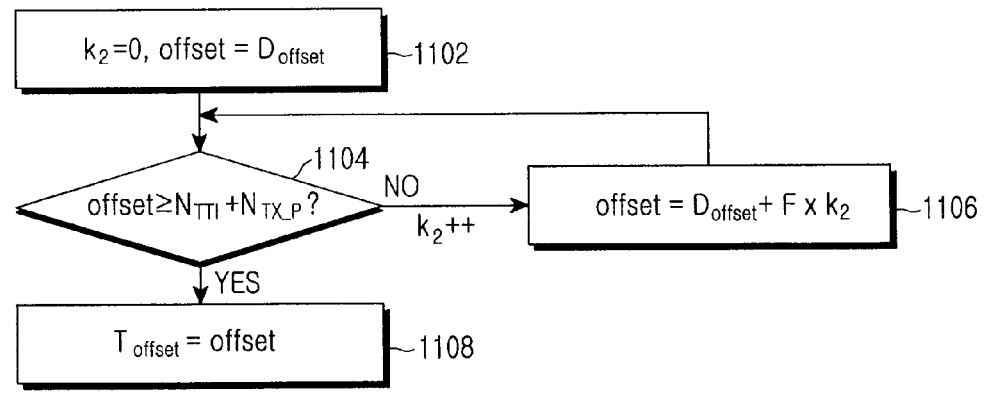
FIG. 11 is a flow diagram illustrating a process of determining $T_{offset}$ by a transmitter according to the second exemplary embodiment of the present invention.

FIG. 11 is a flow diagram illustrating a process of determining $T_{offset}$ by a transmitter according to the second exemplary embodiment of the present invention.

Referring to FIG. 11, in step 1102, the transmitter initializes $k_2$ to 0 and an offset value to $D_{offset}$. Then, in step 1104, the transmitter determines if the offset value is larger than or equal to ($N_{TTI}$+$N_{TX\_P}$). When the offset value is smaller than ($N_{TTI}$+$N_{TX\_P}$), the transmitter adds 1 to $k_2$ and adopts ($D_{offset}$+F×$k_2$) as the offset value in step 1106 and then returns to step 1104. When the offset value is larger than or equal to ($N_{TTI}$+$N_{TX\_P}$), the transmitter adopts $T_{offset}$ as the offset value in step 1108. $T_{offset}$ refers to the number of sub-frames from a sub-frame just after the sub-frame in which the transmitter receives a feedback signal up to the sub-frame in which the transmitter retransmits a data burst. That is, $T_{offset}$ refers to a time delay from reception of an HARQ feedback to transmission of an HARQ burst with respect to the feedback. An HARQ retransmission for the HARQ feedback transmitted at the number n time slot is transmitted at a time slot after $T_{offset}$. That is, an HARQ retransmission for the HARQ feedback received at the number n time slot of the number i frame is transmitted at the number {mod(n+$T_{offset}$, M+N)−N} sub-frame of the number {i+floor((n+$T_{offset}$)/(M+N))} frame. Herein, (M+N) corresponds to one frame interval. Further, in a DL HARQ, since the uplink follows the downlink, {floor((N+n+$T_{offset}$)/(M+N))} is considered for the uplink interval, which is a feedback link. Further, in the case of UL HARQ, the transmission delay can be calculated in consideration of a time slot transmitting a MAP instead of the feedback, and an index of a sub-frame at which a corresponding data burst starts to be transmitted.

In the process of calculating the transmission delay offset, when the number m sub-frame is the starting point of the data burst transmission, the transmission starts at the corresponding time point, and a transmission interval corresponding to one sub-frame is taken into consideration. In contrast, when the sub-frame is the end point of the data burst transmission, a transmission interval as long as the data burst transmission interval is taken into consideration. That is, at the end point of the data burst transmission, the data burst transmission interval is taken into consideration for $N_{TTI}$ in calculating the transmission delay offset. However, at the starting point of the data burst transmission, one sub-frame is taken into consideration for $N_{TTI}$ in calculating the transmission delay offset.

Hereinafter, a process of determining $T_{offset}$ in FIG. 11 will be described in more detail.

In the above description, $N_{TTI}$ refers to the number of time slots (i.e. sub-frames) required for transmission of a data burst, and $N_{TX\_P}$ refers to the number of time slots required for processing before retransmission of a data burst after reception of a feedback signal. Therefore, ($N_{TTI}$+$N_{TX\_P}$) corresponds to a minimum necessary time interval before a transmitter retransmits a data burst after receiving a feedback signal. When the determination in step 1104 shows that the offset value is smaller than ($N_{TTI}$+$N_{TX\_P}$), the transmitter adds 1 to $k_2$ in order to secure transmission processing time in step 1106, wherein $k_2$ denotes a parameter for adjusting the data burst retransmission timing. For example, when $k_2$ is 0, it implies that a data burst is retransmitted at the frame in which the transmitter has received a feedback signal. Further, when $k_2$ is 1, it implies that a data burst is retransmitted at a frame next to the frame in which the transmitter has received a feedback signal. As used herein, $k_2$ has a value in the range of 0, 1, 2, . . . , $k_{2,max}$. As noted from the above description, although the delay may become different according to the burst transmission interval and the transmission and reception delay time, each HARQ operation is performed within the same sub-frame.

Specifically, it is assumed that two sub-frames (i.e. TTIs) are required for data burst retransmission and one sub-frame is required for data burst transmission in a TDD communication system in which a ratio of a data burst link interval (M):a feedback link interval (N) is 6:2. Then, $N_{TX\_P}=2$, $N_{TTI}=1$, F=8, and K=3. Each of those parameters has a value in the unit of sub-frame.

Now, a transmission delay according to an HARQ feedback when the HARQ feedback has been transmitted at the number n sub-frame of a feedback link of the number i frame will be discussed. A minimum transmission delay interval for transmission of the next HARQ data burst with respect to the number n sub-frame of the feedback link of the number i frame is (N−n+m). For example, an HARQ feedback with respect to a data burst transmitted at the first sub-frame (i.e. m=0) of the downlink is transmitted at the first sub-frame (i.e. n=0) of the uplink. Therefore, in step 1102, a minimum delay for transmission of the next HARQ burst in response to the HARQ feedback is calculated to be 2 through formula (4). The minimum delay $D_{offset}$ having been calculated to be 2 is adopted as the offset value. Then, since 2, the offset value, is smaller than ($N_{TTI}+N_{TX\_P}$) as a result of the determination in step 1104, $k_2$ is increased by 1, and the offset value becomes 10 in step 1106. Finally, in step 1108, $T_{offset}$ is determined to be 10. Based on the determined $T_{offset}$, the transmitter retransmits a data burst at the tenth sub-frame after the sub-frame of (n=0).

In the case of a DL HARQ in a 6:2 TDD system, data burst retransmission in response to an HARQ feedback transmitted at the first sub-frame of the uplink of the number i frame is performed at the first sub-frame of the number (i+2) frame, which is located 10 sub-frames after the first sub-frame of the number i frame. That is, floor((6+0+10)/8)=2, and mod(0+10, 8)−2=0.

In the case of a UL HARQ in a 2:6 TDD system, data burst transmission or retransmission in response to an HARQ feedback or MAP transmitted at the first sub-frame of the downlink of the number i frame is performed at the first sub-frame of the number (i+1) frame of the uplink, which is located 10 sub-frames after the first sub-frame of the number i frame. That is, floor((0+10)/8)=1, and mod(0+10, 8)−2=0.

When feedback reception and data burst retransmission occur over at least two frames as described above, it is possible to apply formula (5) below instead of formula (3).

$$T_{offset}=N-n+m+k_2\times(M+N), k_2=0,1,\ldots,k_{2,max} \quad (5)$$

Table 21 below shows $R_{offset}$, $T_{offset}$, and HARQ retransmission delay as described.

TABLE 21

| Offset | $k_1 = 0$ or $k_2 = 0$ | $k_1 > 0$ and $k_2 > 0$ |
|---|---|---|
| $R_{Offset}$ | M − m + n | M − m + n + $K_1 \times$ F |
| $T_{Offset}$ | N − n + m | N − n + m + $K_2 \times$ F |
| Retransmission delay (Re-Tx delay) | F(where F = M + N) | F × ($k_1 + k_2 + 1$) |

The location of the feedback determined by the reception delay offset defined in Table 21 can be calculated by formula (6) below.

subframe index for $HARQ$ feedback = $\mod(m + R_{offset}, M + N) - M$ frame index for $HARQ$ feedback = (6)

$$\begin{cases} \text{floor}\left(\dfrac{m + R_{offset}}{M+N}\right) = i + k_1, \text{ for } DL\ HARQ \\ \text{floor}\left(\dfrac{D + m + R_{offset}}{M+N}\right) = i + 1 + k_1, \text{ for } UL\ HARQ \end{cases}$$

Where, i indicates the frame number which data burst is transmitted. For UL HARQ, D indicates the number of sub-frames in DL interval (i.e. N), the number m subframe in UL interval indicates the UL subframe after DL interval, So, m replaces to D+m.

The location of the feedback determined by the transmission delay offset defined in Table 21 can be calculated by formula (7) below.

subframe index for Data $Tx = \mod(n+T_{offset}, M+N)-N$ frame index for Data $Tx =$ (7)

$$\begin{cases} \text{floor}\left(\dfrac{D + n + T_{offset}}{M+N}\right) = j + 1 + k_2, \text{ for } DL\ HARQ \\ \text{floor}\left(\dfrac{n + T_{offset}}{M+N}\right) = j + k_2, \text{ for } UL\ HARQ \end{cases}$$

Where j indicates the frame number which the feedback is transmitted according to above description. For DL HARQ, D indicates the number of subframes in DL interval (i.e. M), the number n subframe in UL interval indicates the UL subframe after DL interval, So, n replaces to D+n.

Further, within the present invention, when one superframe includes four frames, the frame index and the superframe index can be obtained by formula (8) below.

frame index=mod(frame index,4)

superframe index=s+floor(frame index/4) (8)

Above description (i.e. formula (6) to (8)) is applied to various methods which the present invention proposes the corresponding relations of HARQ transmission/reception for TDD or FDD system.

Table 22 below shows an HARQ interlace structure between data burst transmission, ACK/NACK transmission, and data burst retransmission when the following delays do not occur, i.e. when $k_1=0$ or $k_2=0$, in an FDD communication system. When F is an odd number, ceiling(F/2) is used instead of F/2 in order to express an index.

TABLE 22

| Operation (FDD) | Sub-frame index in each link | | Frame index |
|---|---|---|---|
| Data transmission in Data Burst link | m | | i |
| ACK transmission in feedback link | m < F/2 | m + F/2 | i |
| | m ≥ F/2 | m − F/2 | i + 1 |
| Data Retransmission in Data Burst link | m | | i + 1 |

Table 23 below shows an HARQ interlace structure between data burst transmission, ACK/NACK transmission, and data burst retransmission when a delay occurs, i.e. when $k_1 > 0$ and $k_2 > 0$, in an FDD communication system.

TABLE 23

| Offset | $k_1 = 0$ or $k_2 = 0$ | $k_1 > 0$ and $k_2 > 0$ |
|---|---|---|
| $R_{Offset}$ | $F/2$ | $F/2 + k_1 \times F$ ($k_1 = 0, 1, \ldots, k_{1,max}$) |
| $T_{Offset}$ | $F/2$ | $F/2 + k_2 \times F$ ($k_2 = 0, 1, \ldots, k_{2,max}$) |
| Retransmission delay (Re-Tx delay) | $F$ | $F \times (k_1 + k_2 + 1)$ |

In an FDD system, when F is an odd number, ceiling(F/2) is used instead of F/2.

Table 24 below shows transmission delays and reception delays according to various ratios of M:N based on the HARQ interlace structure defined in Tables 3 and 4. In Table 24, it is assumed that one sub-frame is required for transmission and reception of a data burst, that is, $N_{RX\_P}=1$, $N_{TX\_P}=1$, $N_{TTI}=1$, and F=8.

TABLE 24

| Link configuration | | Sub-frame index (m) | | | | | | | |
|---|---|---|---|---|---|---|---|---|---|
| | | 0 | 1 | 2 | 3 | 4 | 5 | 6 | 7 |
| 8:8 (FDD) | $R_{offset}$ | 4 | 4 | 4 | 4 | 4 | 4 | 4 | 4 |
| | $T_{offset}$ | 4 | 4 | 4 | 4 | 4 | 4 | 4 | 4 |
| 7:1 | $R_{offset}$ | 7 | 6 | 5 | 4 | 3 | 2 | 1 | — |
| | $T_{offset}$ | 1 | 2 | 3 | 4 | 5 | 6 | 7 | — |
| 6:2 | $R_{offset}$ | 6 | 5 | 4 | 4 | 3 | 2 | — | — |
| | $T_{offset}$ | 2 | 3 | 4 | 4 | 5 | 6 | — | — |
| 5:3 | $R_{offset}$ | 5 | 4 | 4 | 3 | 3 | | | |
| | $T_{offset}$ | 3 | 4 | 4 | 5 | 5 | | | |
| 4:4 | $R_{offset}$ | 4 | 4 | 4 | 4 | | | | |
| | $T_{offset}$ | 4 | 4 | 4 | 4 | | | | |

| Link configuration | | Sub-frame index (m) | | |
|---|---|---|---|---|
| | | 0 | 1 | 2 |
| 3:5 | $R_{offset}$ | 3 | 4 | 4 5 5 |
| | $T_{offset}$ | 5 | 4 | 4 3 3 |
| 2:6 | $R_{offset}$ | 2 | 3 | 4 4 5 6 |
| | $T_{offset}$ | 6 | 5 | 4 4 3 2 |
| 1:7 | $R_{offset}$ | 1 2 | 3 4 | 5 6 7 |
| | $T_{offset}$ | 7 6 | 5 4 | 3 2 1 |

Table 25 below shows transmission delays and reception delays according to various ratios of M:N. In Table 25, it is assumed that two sub-frames are required for transmission and reception of a data burst, that is, $N_{RX\_P}=2$, $N_{TX\_P}=2$, $N_{TTI}=1$, and F=8.

TABLE 25

| Link configuration | | Sub-frame index (m) | | | | | | | |
|---|---|---|---|---|---|---|---|---|---|
| | | 0 | 1 | 2 | 3 | 4 | 5 | 6 | 7 |
| 8:8 (FDD) | $R_{offset}$ | 4 | 4 | 4 | 4 | 4 | 4 | 4 | 4 |
| | $T_{offset}$ | 4 | 4 | 4 | 4 | 4 | 4 | 4 | 4 |
| 7:1 | $R_{offset}$ | 7 | 6 | 5 | 4 | 3 | 10 | 9 | — |
| | $T_{offset}$ | 9 | 10 | 3 | 4 | 5 | 6 | 7 | — |
| 6:2 | $R_{offset}$ | 6 | 5 | 4 | 4 | 3 | 10 | — | — |
| | $T_{offset}$ | 10 | 3 | 4 | 4 | 5 | 6 | — | — |
| 5:3 | $R_{offset}$ | 5 | 4 | 4 | 3 | 3 | | | |
| | $T_{offset}$ | 3 | 4 | 4 | 5 | 5 | | | |
| 4:4 | $R_{offset}$ | 4 | 4 | 4 | 4 | | | | |
| | $T_{offset}$ | 4 | 4 | 4 | 4 | | | | |

| Link configuration | | Sub-frame index (m) | | |
|---|---|---|---|---|
| | | 0 | 1 | 2 |
| 3:5 | $R_{offset}$ | 3 | 4 | 4 5 5 |
| | $T_{offset}$ | 5 | 4 | 4 3 3 |
| 2:6 | $R_{offset}$ | 10 | 3 | 4 4 5 6 |
| | $T_{offset}$ | 6 | 5 | 4 4 3 10 |
| 1:7 | $R_{offset}$ | 9 10 | 3 4 | 5 6 7 |
| | $T_{offset}$ | 7 6 | 5 4 | 3 10 9 |

Table 26 below shows transmission delays and reception delays according to various ratios of M:N. In Table 26, it is assumed that three sub-frames are required for transmission and reception of a data burst, that is, $N_{RX\_P}=3$, $N_{TX\_P}=3$, $N_{TTI}=1$, and F=8.

TABLE 26

| Link configuration | | Sub-frame index (m) | | | | | | | |
|---|---|---|---|---|---|---|---|---|---|
| | | 0 | 1 | 2 | 3 | 4 | 5 | 6 | 7 |
| 8:8 (FDD) | $R_{offset}$ | 4 | 4 | 4 | 4 | 4 | 4 | 4 | 4 |
| | $T_{offset}$ | 4 | 4 | 4 | 4 | 4 | 4 | 4 | 4 |
| 7:1 | $R_{offset}$ | 7 | 6 | 5 | 4 | 11 | 10 | 9 | — |
| | $T_{offset}$ | 9 | 10 | 11 | 4 | 5 | 6 | 7 | — |
| 6:2 | $R_{offset}$ | 6 | 5 | 4 | 4 | 11 | 10 | — | — |
| | $T_{offset}$ | 10 | 11 | 4 | 4 | 5 | 6 | — | — |
| 5:3 | $R_{offset}$ | 5 | 4 | 4 | 11 | 11 | | | |
| | $T_{offset}$ | 11 | 4 | 4 | 5 | 5 | | | |
| 4:4 | $R_{offset}$ | 4 | 4 | 4 | 4 | | | | |
| | $T_{offset}$ | 4 | 4 | 4 | 4 | | | | |

| Link configuration | | Sub-frame index (m) | | |
|---|---|---|---|---|
| | | 0 | 1 | 2 |
| 3:5 | $R_{offset}$ | 11 | 4 | 4 5 5 |
| | $T_{offset}$ | 5 | 4 | 4 11 11 |
| 2:6 | $R_{offset}$ | 10 | 11 | 4 4 5 6 |
| | $T_{offset}$ | 6 | 5 | 4 4 11 10 |
| 1:7 | $R_{offset}$ | 9 10 | 11 4 | 5 6 7 |
| | $T_{offset}$ | 7 6 | 5 4 | 11 10 9 |

The transmission or reception delay offset shown in Tables 24 to 26 refers to a time interval between HARQ operations. That is, the reception delay offset corresponds to a distance up to the time point of HARQ feedback transmission after HARQ data burst reception, and the transmission delay offset corresponds to a distance up to the time point of transmission of the next HARQ data burst after the HARQ feedback. Therefore, when the transmission interval corresponds to one sub-frame, the HARQ retransmission delay may be expressed as a sum of the transmission delay offset and the reception delay offset. That is, according to an exemplary embodiment of the present invention, in transmission of a data burst at the number m sub-frame, a predefined reception delay offset and a predefined transmission delay offset exist depending on the turn of the number 1 sub-frame within a data burst link interval. If the turn of the number 1 sub-frame within a data burst link interval is m, the number 1 sub-frame follows an HARQ operation of the number m sub-frame. Further, an HARQ feedback in response to a data burst transmitted at the number m sub-frame is transmitted at a time slot after passage of $R_{offset}$, and next HARQ transmission in response to the feedback transmission is performed at a time slot after passage of $T_{offset}$. Therefore, retransmission of the data burst is performed at a time slot after passage of the retransmission delay ($R_{offset} + T_{offset}$). Further, the value ($R_{offset} + T_{offset}$) is adjusted to an integer number of times of a frame.

In Tables 25 and 26, $k_1$ increases from 0 to 1 for delayed transmission of a feedback signal when $R_{offset}$ is larger than 8, and $k_2$ increases from 0 to 1 for delayed retransmission of a data burst when $T_{offset}$ is larger than 8.

Indexes of the sub-frame, frame, and super-frame for an HARQ operation according to an offset defined in Tables 24 to 26 are determined by formulas (6) to (8).

Meanwhile, the exemplary embodiment of the present invention is applicable to both the synchronous HARQ scheme and the asynchronous HARQ scheme.

In the asynchronous HARQ scheme, it is possible to adaptively operate the retransmission timing and it is thus easily secure the transmission/reception time. Therefore, it is efficient to support an HARQ based on an end point of a data burst transmission interval. In contrast, in the synchronous HARQ scheme, it is required that the retransmission timing be fixed, and it is thus efficient to support an HARQ based on a starting point of a data burst transmission interval.

Further, according to the exemplary embodiment of the present invention, it is possible to synchronize a downlink HARQ operation and an uplink HARQ operation with each other under an M:N TDD frame structure in a multiple access system. That is, in the case of downlink HARQ operation, an HARQ feedback in response to an HARQ data burst transmitted at the number m sub-frame is transmitted at the number n sub-frame following a reception delay offset. Then, after a predefined frame interval according to a transmission delay offset, the next HARQ data burst is transmitted at the number m sub-frame. Further, in the case of uplink HARQ operation, an HARQ feedback in response to an HARQ data burst transmitted at the number n sub-frame is transmitted at the number m sub-frame following a reception delay offset. Then, after a predefined frame interval according to a transmission delay offset, the next HARQ data burst is transmitted at the number n sub-frame.

For example, in a 5:3 TDD structure, an HARQ feedback in response to a downlink HARQ data burst transmitted at the number 2 sub-frame within the downlink is transmitted at the number 1 sub-frame within the uplink, and the next HARQ data burst in response to the feedback is transmitted at the number 2 sub-frame within the downlink, which is located after a predefined frame interval. Further, an HARQ feedback in response to an uplink HARQ data burst transmitted at the number 1 sub-frame within the uplink is transmitted at the number 2 sub-frame within the downlink, and the next HARQ data burst in response to the feedback is transmitted at the number 1 sub-frame within the uplink, which is located after a predefined frame interval. The number of delayed sub-frames is determined by the transmission interval or reception and transmission delay. The synchronized downlink and uplink HARQ transmission as described above minimizes the time slot interval in which the system is activated, thereby reducing the power consumption or enhancing the degree of freedom in communication with another wireless communication system.

Tables 27 and 28 show HARQ interlace structures in a TDD communication system having various DL:UL ratios and an FDD communication system in which the uplink and the downlink are discriminated by the frequency. In Tables 27 and 28, m indicates a sub-frame index (m=0, . . . , M−1) within the downlink, and n indicates a sub-frame index (n=0, . . . , N−1) within the uplink.

TABLE 27

| Operation | Sub-frame Index | Delay | Note |
|---|---|---|---|
| Data Tx | m | Fx + F/2 | x is a delay factor and depends on processing time and TTI |
| ACK | (m + F/2) mod F | F/2 | |
| Data (Re)Tx | m | | |

In Table 27, F indicates the number of sub-frames configuring one frame.

Referring to Table 27, in response to an HARQ data burst transmitted at the number m sub-frame within a data burst link of a frame, an HARQ ACK is transmitted at the number {(m+F/2) mod F} sub-frame within a feedback link located after (Fx+F/2) sub-frames. Further, the next HARQ data burst for the data burst is retransmitted at the number m sub-frame, which is located at the same sub-frame position within a data burst link located after F/2 sub-frames. In Table 27, x is a delay factor and adjusts the retransmission period depending on the data burst transmission interval and the processing time of the system. Further, a minimum value of x is 0. For example, in an FDD communication system including eight sub-frames, an HARQ ACK in response to an HARQ data burst transmitted at the number m sub-frame within a data burst link is transmitted at the number (m+4) sub-frame within a feedback link located after an interval of four sub-frames, and the next HARQ data burst is transmitted at the number m sub-frame within a data burst link located after four sub-frames from the sub-frame at which the HARQ ACK has been transmitted.

The structures shown in Tables 28 to 30 use the HARQ corresponding structures defined in Tables 3 and 4.

TABLE 28

| Operation | | Sub-frame Index | Delay | Note |
|---|---|---|---|---|
| Data Tx | | m | (M + N)x + M − n + m | K = M/N |
| HARQ feedback | M ≧ N | $n = \lfloor \frac{m}{K} \rfloor$ | | |
| | M < N | $n \in \{\lceil \frac{m}{K} \rceil, \lceil \frac{m}{K} \rceil + 1, \ldots, \lceil \frac{m+1}{K} \rceil - 1\}$ | (M + N)y + N − n + m | |
| Data (Re)Tx | | m | | |

In Table 28, M indicates the number of sub-frames within a data burst link, N indicates the number of sub-frames within a feedback link, $\lfloor \cdot \rfloor$ implies a rounded-down value, and $\lceil \cdot \rceil$ implies a rounded-up value.

An HARQ ACK in response to an HARQ data burst transmitted at the number m sub-frame within a data burst link of a frame is transmitted at the number n sub-frame within a feedback link located after {(M+N)x+M−m+n} sub-frames. Here, the data burst transmission interval and processing delay may cause an operation delay as long as a multiple of (M+N). Further, the next HARQ data burst for the data burst is retransmitted at the number m sub-frame, which is located at the same sub-frame position within a data burst link located after {(M+N)y+N−n+m} sub-frames. In Table 28, x and y are delay factors, wherein x adjusts the retransmission period depending on a data burst transmission interval and reception processing time of a receiver, and y adjusts the retransmission period depending on a data burst transmission location and transmission processing time of a transmitter. Further, minimum values of x and y are 0. In a TDD communication system, the ratio between the data burst link and the feedback link may determine the delay time of each sub-frame. Further, K is a distribution factor and has a value of M/N, which is obtained by dividing the number of sub-frames in the data burst link by the number of sub-frames in the feedback link. In brief, according to the definition of a corresponding relation between the data burst link and the feedback link for an HARQ operation by the exemplary embodiment of the present invention, the sub-frames within the larger link are regrouped into as many groups as the sub-frames within the smaller link, so as to establish a corresponding relation between sub-frames of the two links within the frame. Further, the retransmission period may change in the unit of frame length according to various system capabilities (e.g. transmission/reception processing time).

Table 29 shows an HARQ operation timing for a DL HARQ.

TABLE 29

| DL HARQ ($K_{DL}$ = D/U) | Subframe index | | Delay |
|---|---|---|---|
| | $D \geq U$ | $D < U$ | |
| Data Tx | m | m | $(M+N)x +$ |
| HARQ feedback (n) | $\lfloor \frac{m}{K_{DL}} \rfloor$ | $\lceil \frac{m}{K_{DL}} \rceil, \lceil \frac{m}{K_{DL}} \rceil + 1,$ | $M - m + n$ |
| | | | $(M+N)y +$ |
| | | | $N - n + m$ |
| | | $\ldots, \lceil \frac{m+1}{K_{DL}} \rceil - 1$ | |
| Data Re-Tx | m | m | |

In Table 29, $K_{DL}$ has a value of M/N.

Table 30 shows an HARQ operation timing for a UL HARQ.

TABLE 30

| UL HARQ ($K_{UL}$ = U/D) | Subframe index | | Delay |
|---|---|---|---|
| | $D \geq U$ | $D < U$ | |
| Data Tx | m | m | $(M+N)x +$ |
| HARQ feedback (n) | $n \in \{\lceil \frac{m}{K_{UL}} \rceil, \lceil \frac{m}{K_{UL}} \rceil + 1,$ | $\lfloor \frac{m}{K_{UL}} \rfloor$ | $M - m + n$ |
| | | | $(M+N)y +$ |
| | | | $N - n + m$ |
| | $\ldots, \lceil \frac{m+1}{K_{UL}} \rceil - 1\}$ | | |
| Data Re-Tx | m | m | |

In Table 30, $K_{UL}$ has a value of N/M.

Hereinafter, an HARQ channel and an HARQ operation in consideration different processing times will be described based on HARQ interlace structures proposed by the exemplary embodiment of the present invention as shown in FIGS. 12 to 18.

Figure 12:
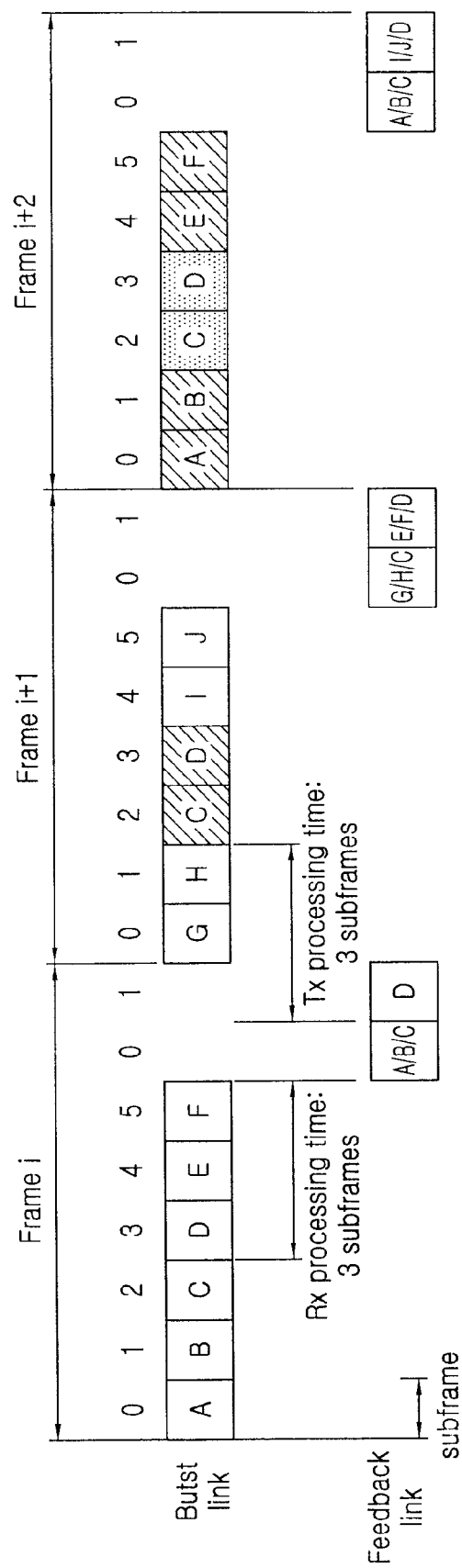
FIG. 12 illustrates an HARQ interlace structure in a 6:2 TDD communication system according to an exemplary embodiment of the present invention.

FIG. 12 illustrates an HARQ interlace structure in a 6:2 TDD communication system according to an exemplary embodiment of the present invention.

In FIG. 12, it is assumed that each of the transmission processing time and the reception processing time requires three sub-frames, and A to J indicate HARQ data bursts transmitted at sub-frames within a data burst link and corresponding feedback signals. Further, number 0, 1, and 2 sub-frames in each frame of the data burst link correspond to the number 0 sub-frame of the feedback link, and number 3, 4, and 5 sub-frames of the data burst link correspond to the number 1 sub-frame of the feedback link. Therefore, feedback in response to a data burst transmitted through the number 0, 1, or 2 sub-frame of the data burst link is transmitted through the number 0 sub-frame of the feedback link, and feedback in response to a data burst transmitted through the number 3, 4, or 5 sub-frame of the data burst link is transmitted through the number 1 sub-frame of the feedback link.

Meanwhile, unshaded sub-frames within the data burst link correspond to sub-frames transmitting new data bursts, which are HARQ channels that can be provided by the data burst link, and shaded sub-frames correspond to sub-frames at which previously transmitted data bursts are retransmitted. Further, the HARQ feedback within the link reflects the NACK, thereby showing an HARQ retransmission timing. For example, if data bursts A to F transmitted through number 0 to 5 sub-frames of frame i are initially transmitted data bursts, the transmission of the data bursts C and D through number 2 and 3 sub-frames of frame (i+1) corresponds to a first retransmission of the initially transmitted data bursts C and D of frame i. Further, the transmission of the data bursts A, B, E, and F in frame (i+2) corresponds to a first retransmission of the data bursts A, B, E, and F initially transmitted in frame i, and the transmission of the data bursts C and D in frame (i+2) corresponds to a second retransmission of the data bursts C and D transmitted in frame (i+1).

As noted from FIG. 12, when the reception processing time includes three sub-frames, NACKs in response to the HARQ data bursts A, B, C, and D transmitted in the data burst link of frame i are transmitted through the first and second sub-frames of the feedback link within the same frame. However, NACKs in response to the HARQ data bursts E and F are transmitted through the second sub-frame of a feedback link within the next frame or the frame (i+1) due to a shortage of reception processing time. Further, new data bursts I and J are transmitted through the number 4 and 5 sub-frames in the frame (i+1), which are sub-frames at which a data burst is not retransmitted due to the delayed HARQ feedback.

Meanwhile, when the transmission processing time includes three sub-frames, in view of retransmission of the HARQ data bursts A, B, C, and D in response to the HARQ feedback in frame i, the HARQ data bursts A and B may not secure the retransmission processing time and are retransmitted at the number 0 and 1 sub-frames of the frame (i+2). Further, new data bursts G and H are transmitted through the number 0 and 1 sub-frames in the frame (i+1), due to the delayed HARQ feedback.

As described above, by using three sub-frames for a Transmission/Reception (Tx/Rx) processing time in a 6:2 TDD communication system of FIG. 12, it is possible to generate ten HARQ channels, which correspond to sub-frames of an initially transmitted data burst. Specifically, the ten HARQ channels include six channels (number 0 to 5 sub-frames) of frame i and four channels (number 0, 1, 4, and 5 sub-frames) of frame (i+1).

Figure 13:
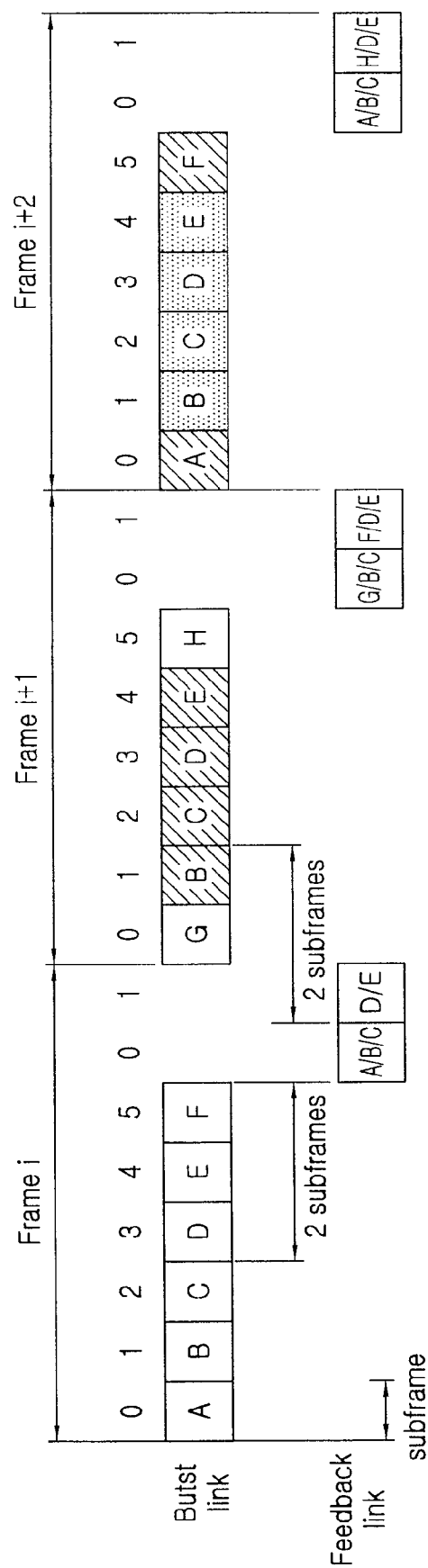
FIG. 13 illustrates an HARQ interlace structure in a 6:2 TDD communication system according to an exemplary embodiment of the present invention.

FIG. 13 illustrates an HARQ interlace structure in a 6:2 TDD communication system according to an exemplary embodiment of the present invention.

FIG. 13 is based on an assumption that each of the transmission processing time and the reception processing time includes two sub-frames. As in FIG. 12, number 0, 1, and 2 sub-frames in each frame of the data burst link correspond to the number 0 sub-frame of the feedback link, and number 3, 4, and 5 sub-frames of the data burst link correspond to the number 1 sub-frame of the feedback link. Therefore, feedback in response to a data burst transmitted through the number 0, 1, or 2 sub-frame of the data burst link is transmitted through the number 0 sub-frame of the feedback link, and feedback in response to a data burst transmitted through the number 3, 4, or 5 sub-frame of the data burst link is transmitted through the number 1 sub-frame of the feedback link.

As noted from FIG. 13, when the transmission or reception processing time includes two sub-frames, feedback in response to the HARQ data bursts A, B, C, D and E transmitted in the data burst link of frame i are transmitted through the number 0 and 1 sub-frames of the feedback link within the same frame. However, feedback in response to the HARQ data burst F is transmitted through the number 1 sub-frame of a feedback link within the next frame or the frame (i+1) due to a shortage of reception processing time. Further, a new data burst H is transmitted through the number 5 sub-frame in the frame (i+1), which is a sub-frame at which a data burst is not retransmitted due to the delayed HARQ feedback.

Meanwhile, when the transmission processing time includes two sub-frames, in view of retransmission of the HARQ data bursts A, B, C, D, and E in response to the HARQ feedback in frame i, the HARQ data burst A may not secure the retransmission processing time and is retransmitted at the number 0 sub-frame of the frame (i+2), while the other data bursts B, C, D, and E are retransmitted at corresponding sub-frames of the frame (i+1). Further, a new data burst G is transmitted through the number 0 sub-frame in the frame (i+1), due to the delayed HARQ feedback.

As described above, by using two sub-frames for a Tx/Rx processing time in a 6:2 TDD communication system of FIG. 13, it is possible to generate eight HARQ channels. Specifically, the eight HARQ channels include six channels (number 0 to 5 sub-frames) of frame i and two channels (number 0 and 5 sub-frames) of frame (i+1).

Figure 14:
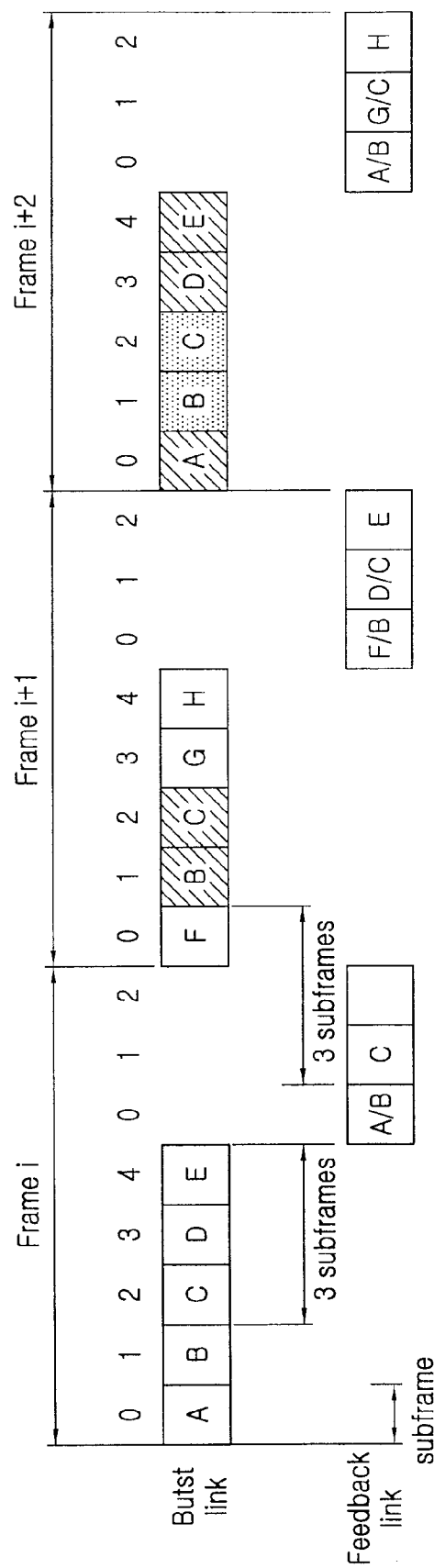
FIG. 14 illustrates an HARQ interlace structure in a 5:3 TDD communication system according to an exemplary embodiment of the present invention.

FIG. 14 illustrates an HARQ interlace structure in a 5:3 TDD communication system according to an exemplary embodiment of the present invention.

FIG. 14 is based on an assumption that each of the transmission processing time and the reception processing time includes three sub-frames. Further, the number 0 and 1 sub-frames in each frame of the data burst link correspond to the number 0 sub-frame of the feedback link, the number 2 and 3 sub-frames of the data burst link correspond to the number 1 sub-frame of the feedback link, and the number 4 sub-frame of the data burst link corresponds to the number 2 sub-frame of the feedback link. Therefore, feedback in response to a data burst transmitted through the number 0 or 1 sub-frame of the data burst link is transmitted through the number 0 sub-frame of the feedback link, feedback in response to a data burst transmitted through the number 2 and 3 sub-frame of the data burst link is transmitted through the number 1 sub-frame of the feedback link, and feedback in response to a data burst transmitted through the number 4 sub-frame of the data burst link is transmitted through the number 2 sub-frame of the feedback link.

As noted from FIG. 14, when the reception processing time includes three sub-frames, feedback in response to the HARQ data burst A and B transmitted in the data burst link of frame i is transmitted through the number 0 sub-frames of the feedback link within the same frame, and feedback in response to the HARQ data burst C is transmitted through the number 1 sub-frames of the feedback link within the same frame. However, NACKs in response to the HARQ data bursts D and E are transmitted through the number 1 and 2 sub-frame of a feedback link within the next frame or the frame (i+1) due to a shortage of reception processing time. Further, new data bursts G and H are transmitted through the number 3 and 4 sub-frames in the frame (i+1), which are sub-frames at which a data burst is not retransmitted due to the delayed HARQ feedback.

Meanwhile, when the transmission processing time includes three sub-frames, in view of retransmission of the HARQ data bursts A, B, and C in response to the HARQ feedback in frame i, the HARQ data burst A may not secure the retransmission processing time and is retransmitted at the number 0 sub-frame of the frame (i+2). Further, a new data burst F is transmitted through the number 0 sub-frame in the frame (i+1), due to the delayed HARQ feedback.

By using three sub-frames for a Tx/Rx processing time in a 5:3 TDD communication system of FIG. 14, it is possible to generate eight HARQ channels. Specifically, the eight HARQ channels include five channels (number 0 to 4 sub-frames) in frame i and three channels (number 0, 3, and 4 sub-frames) in frame (i+1).

Figure 15:
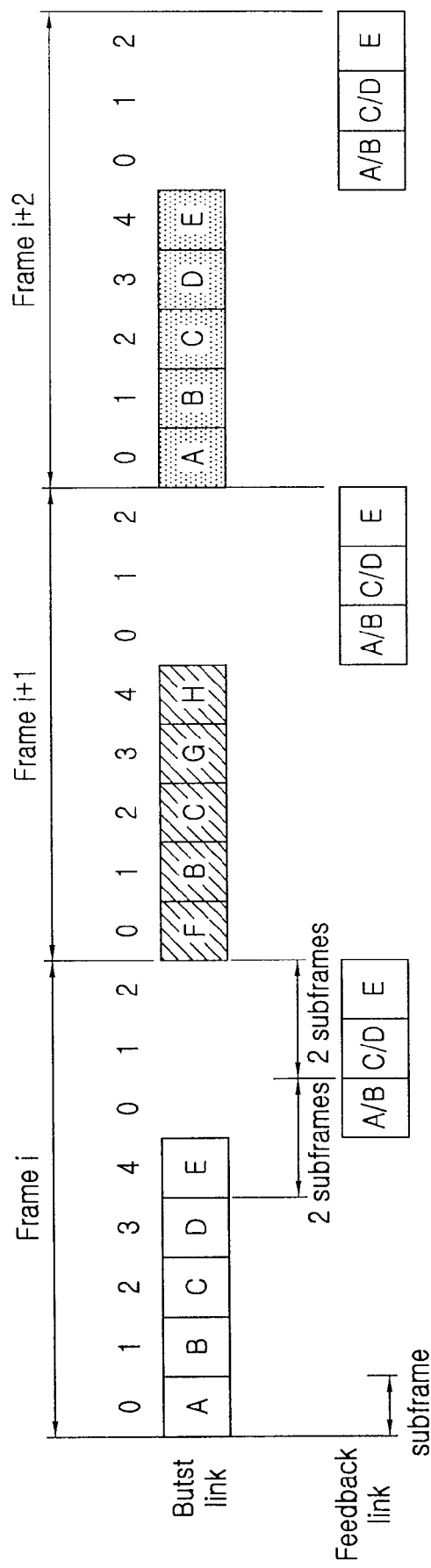
FIG. 15 illustrates an HARQ interlace structure in a 5:3 TDD communication system according to an exemplary embodiment of the present invention.

FIG. 15 illustrates an HARQ interlace structure in a 5:3 TDD communication system according to an exemplary embodiment of the present invention.

FIG. 15 is based on an assumption that each of the transmission processing time and the reception processing time includes two sub-frames. Further, as in FIG. 14, number 0 and 1 sub-frames in each frame of the data burst link correspond to the number 0 sub-frame of the feedback link, number 2 and 3 sub-frames of the data burst link correspond to the number 1 sub-frame of the feedback link, and the number 4 sub-frame of the data burst link corresponds to the number 2 sub-frame of the feedback link. Therefore, feedback in response to a data burst transmitted through the number 0 or 1 sub-frame of the data burst link is transmitted through the number 0 sub-frame of the feedback link, feedback in response to a data burst transmitted through the number 2 and 3 sub-frame of the data burst link is transmitted through the number 1 sub-frame of the feedback link, and feedback in response to a data burst transmitted through the number 4 sub-frame of the data burst link is transmitted through the number 2 sub-frame of the feedback link.

As noted from FIG. 15, when the reception processing time includes two sub-frames, feedback in response to the HARQ data bursts A and B transmitted in the data burst link of frame i are transmitted through the number 0 sub-frame of the feedback link within the same frame, feedback in response to the HARQ data bursts C and D are transmitted through the number 1 sub-frame of the feedback link within the same frame, and feedback in response to the HARQ data burst E transmitted in the data burst link of frame i is transmitted through the number 2 sub-frame of the feedback link within the same frame. As a result, since the transmission or reception processing time is not lacking, the data bursts A to E are retransmitted at corresponding sub-frames in frame (i+1).

By using two sub-frames for a Tx/Rx processing time in a 5:3 TDD communication system of FIG. 15, it is possible to generate five HARQ channels. Specifically, the five HARQ channels include five channels (number 0 to 4 sub-frames) in frame i.

FIG. 16 illustrates an HARQ interlace structure in a 3:5 TDD communication system according to an exemplary embodiment of the present invention.

FIG. 16 is based on an assumption that each of the transmission processing time and the reception processing time includes three sub-frames. Further, the number 0 sub-frame in each frame of the data burst link corresponds to the number 0 or 1 sub-frame of the feedback link, the number 1 sub-frame in each frame of the data burst link corresponds to the number 2 or 3 sub-frame of the feedback link, and the number 2 sub-frame in each frame of the data burst link corresponds to the number 4 sub-frame of the feedback link. Therefore, feedback in response to a data burst transmitted through the number 0 sub-frame of the data burst link is transmitted through the number 0 sub-frame of the feedback link, feedback in response to a data burst transmitted through the number 1 sub-frame of the data burst link is transmitted through the number 2 sub-frame of the feedback link, and feedback in response to a data burst transmitted through the number 2 sub-frame of the data burst link is transmitted through the number 4 sub-frame of the feedback link.

As noted from FIG. 16, when the reception processing time includes three sub-frames, feedback in response to the HARQ data bursts A, B, and C transmitted in the data burst link of frame i is transmitted through the number 1, 2, and 4 sub-frames of the feedback link within the same frame.

Meanwhile, when the transmission processing time includes three sub-frames, in view of retransmission of the HARQ data bursts A, B, and C in response to the HARQ feedback in frame i, the HARQ data burst C may not secure the retransmission processing time and is retransmitted at the number 0 sub-frame of the frame (i+2). Further, a new data burst D is transmitted through the number 2 sub-frame in the frame (i+1), due to the delayed HARQ feedback.

As described above, by using three sub-frames for a Tx/Rx processing time in a 3:5 TDD communication system of FIG. 16, it is possible to generate four HARQ channels. Specifically, the four HARQ channels include three channels (number 0 to 2 sub-frames) in frame i and one channel (number 2 sub-frame) in frame (i+1).

FIG. 17 illustrates an HARQ interlace structure in a 3:5 TDD communication system according to an exemplary embodiment of the present invention.

FIG. 17 is based on an assumption that each of the transmission processing time and the reception processing time includes two sub-frames. Further, the number 0 sub-frame in each frame of the data burst link corresponds to the number 0 sub-frame of the feedback link, the number 1 sub-frame in each frame of the data burst link corresponds to the number 2 sub-frame of the feedback link, and the number 2 sub-frame in each frame of the data burst link corresponds to the number 4 sub-frame of the feedback link. Therefore, feedback in response to a data burst transmitted through the number 0 sub-frame of the data burst link is transmitted through the number 0 sub-frame of the feedback link, feedback in response to a data burst transmitted through the number 1 sub-frame of the data burst link is transmitted through the number 2 sub-frame of the feedback link, and feedback in response to a data burst transmitted through the number 2 sub-frame of the data burst link is transmitted through the number 4 sub-frame of the feedback link.

As noted from FIG. 17, when the reception processing time includes two sub-frames, feedback in response to the HARQ data bursts A, B, and C transmitted in the data burst link of frame i is transmitted through the number 0, 2, and 4 sub-frames of the feedback link within the same frame.

Meanwhile, when the transmission processing time includes two sub-frames, in view of retransmission of the HARQ data bursts A, B, and C in response to the HARQ feedback in frame i, the HARQ data bursts A, B, and C are retransmitted at the number 0, 1, and 2 sub-frames of the data burst link of the frame (i+1), respectively.

As described above, by using two sub-frames for a Tx/Rx processing time in a 3:5 TDD communication system of FIG. 17, it is possible to generate three HARQ channels. Specifically, the three HARQ channels include three channels (number 0 to 2 sub-frames) in frame i.

Figure 18:
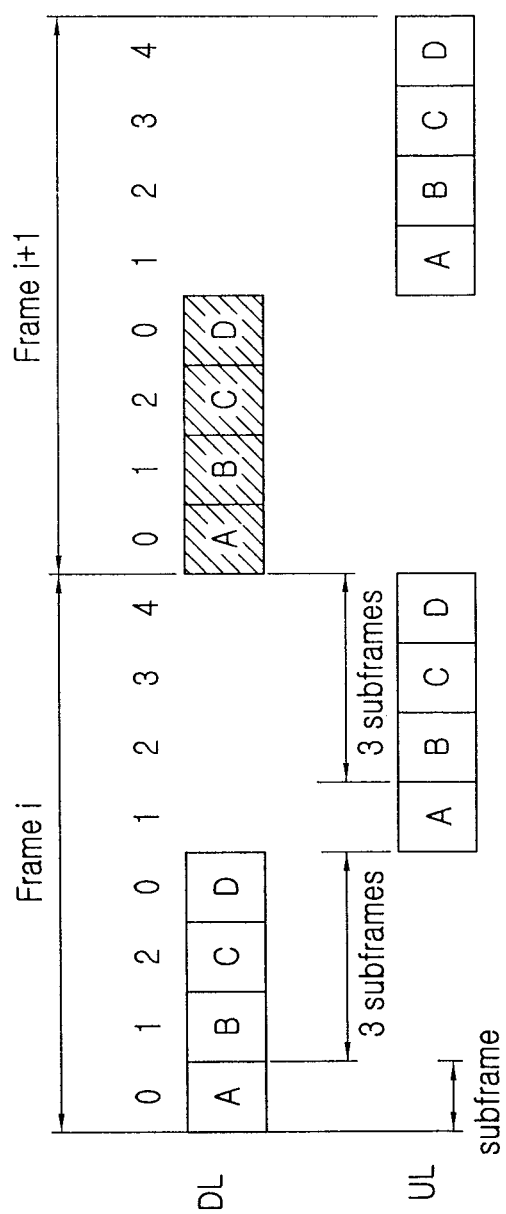
FIG. 18 illustrates an HARQ interlace structure in a 4:4 TDD communication system according to an exemplary embodiment of the present invention.

FIG. 18 illustrates an HARQ interlace structure in a 4:4 TDD communication system according to an exemplary embodiment of the present invention.

FIG. 18 is based on an assumption that each of the transmission processing time and the reception processing time includes two or three sub-frames. Further, the number 0 sub-frame in each frame of the data burst link corresponds to the number 0 sub-frame of the feedback link, the number 1 sub-frame in each frame of the data burst link corresponds to the number 1 sub-frame of the feedback link, the number 2 sub-frame in each frame of the data burst link corresponds to the number 2 sub-frame of the feedback link, and the number 3 sub-frame in each frame of the data burst link corresponds to the number 3 sub-frame of the feedback link.

As noted from FIG. 18, when the reception processing time includes two or three sub-frames, feedback in response to the HARQ data bursts A, B, C, and D transmitted in the data burst link of frame i is transmitted through the number 0, 1, 2, and 3 sub-frames of the feedback link within the same frame, respectively.

Meanwhile, when the transmission processing time includes two or three sub-frames, the HARQ data bursts A, B, C, and D in response to the HARQ feedback in frame i are retransmitted at the number 0, 1, 2, and 3 sub-frames of the data burst link of the frame (i+1), respectively.

As described above, by using two or three sub-frames for a Tx/Rx processing time in a 4:4 TDD communication system of FIG. 18, it is possible to generate four HARQ channels. Specifically, the four HARQ channels include four channels (number 0 to 3 sub-frames) in frame i. In FIGS. 12 to 18, the data burst link may be either an uplink or a downlink, and a feedback link corresponding to the data burst link may be either an uplink or a downlink.

Further, for an HARQ operation for one data burst transmitted over multiple sub-frames, especially a data burst occupying the entire link interval may correspond to a central sub-frame within the corresponding feedback link interval. The additional control information is provided through a downlink by unicast, multicast, or broadcast.

For reduction of power consumption through micro sleep or reduction of DownLink (DL) control channel overhead, a broadband wireless access system may employ DL control channels with a predefined sub-frame interval instead of employing the channels for all sub-frames within the downlink.

An exemplary embodiment of the present invention proposes a corresponding relation between an uplink and a downlink, which can maximize the symmetry for a balanced corresponding relation between control channels within each link when DL control channels are used with a predefined sub-frame interval in a communication system including multiple time slots (i.e. sub-frames).

First, a DL HARQ operation in a TDD system will be described.

Referring to Tables 3 and 4 described above, a DL control channel and a DL burst are transmitted for a DL HARQ operation in a DL frame. In the case of Tables 3 and 4, based on an assumption that a DL control channel is provided in each sub-frame, the number m sub-frame indicates a burst transmission starting at the number m sub-frame. However, when DL control channels are used with p sub-frame intervals, the control channels are transmitted in only a maximum of $\left\lceil \dfrac{M}{p} \right\rceil$ sub-frames. For example, when DL control channels are used with an interval of two sub-frames in a 5:3 TDD system, the DL control channels are provided in three DL sub-frames. If the first sub-frame providing a control channel in a downlink sub-frame is the number 0 sub-frame, the next control channel is provided in the number p sub-frame. Let us assume a sub-frame index is m'. Then, when DL control channels are transmitted with an interval of p sub-frames, a DL control channel of an m' sub-frame indicates data burst transmission starting at an m', m'+1, . . . , m'+p−1 sub-frame. That is, for downlink transmission, one sub-frame indicates data burst transmission in p sub-frames. Further, when there exist at least one sub-frame corresponding to the number m' sub-frame, a explicit signaling such as a MAP or broadcast message may be used to indicate the number m sub-frame for the actual transmission.

Table 31 below shows a transmission timing structure for a downlink HARQ operation when control channels are transmitted with a predefined sub-frame interval p in a TDD system downlink.

$\dfrac{M}{N}$ or $\left\lceil \dfrac{M}{N} \right\rceil$.

The sub-frame index is a countable number, which is obtained by floor( ) or ceiling( ). Therefore, the symmetry factor has the same value regardless of the two types of definitions.

In contrast, when UL control channels are transmitted with a predefined sub-frame interval, N' is considered instead of N, wherein N' indicates the number of sub-frames in each of which a control channel exists in the uplink. Further, the locations of corresponding UL sub-frames indicate the ordinal turns of the sub-frames at which the UL control channels are provided. That is, when the location has a value of 0, it indicates the first UL sub-frame at which the UL control channel is provided.

Hereinafter, a UL HARQ operation in a TDD system will be described. For a UL HARQ operation, control channels indicating burst allocation in the downlink and HARQ feedback are provided.

If DL control channels are provided for all sub-frames as described above, the location of HARQ feedback transmission or MAP information in response to a UL HARQ burst is determined by N sub-frames for transmission of data bursts

TABLE 31

|  | DL(M ≥ N) | | DL(M < N) | |
| --- | --- | --- | --- | --- |
|  | Subframe index | Frame index | Subframe index | Frame index |
| MAP | m' | i | m' | i |
| Burst | m ∈ {m', m' + 1, . . . , m' + p − 1} | i | m ∈ {m', m' + 1, . . . , m' + p − 1} | i |
| ACK/NACK | $\left\lfloor \dfrac{m}{K} \right\rfloor$ | i | $\left\lceil \dfrac{m}{K} \right\rceil, \left\lceil \dfrac{m}{K} \right\rceil + 1, \ldots, \left\lceil \dfrac{m+1}{K} \right\rceil - 1$ | i |
| ReTx.burst | m | i + 1 | m | i + 1 |

In Table 31, m' indicates an index of a sub-frame in which a control channel is transmitted, and $$m' \in \left\{ m0 + 0, m0 + p, m0 + 2p, m0 + p \times \left( \left\lceil \dfrac{M - m0}{p} \right\rceil - 1 \right) \right\},$$

wherein m0 indicates a location of the first sub-frame transmitting a control channel within one DL interval and usually has a value of 0. When m0 has a value other than 0, the number of sub-frames in which the DL control channels are provided is $$\left\lceil \dfrac{M - m0}{p} \right\rceil.$$

Further, m indicates an index of a sub-frame in which the data burst transmission starts and is m', m'+1, . . . , m+p−1.

When UpLink (UL) control channels are provided for all sub-frames as described above, the location of HARQ feedback transmission in response to a DL HARQ burst is determined by M sub-frames for transmission of data bursts and N sub-frames corresponding to the data bursts. Therefore, a symmetry factor K for calculation of the location is defined by and M sub-frames corresponding to the data bursts. Therefore, a symmetry factor K for calculation of the location is defined by $$\dfrac{M}{N} \text{ or } \left\lceil \dfrac{M}{N} \right\rceil.$$

The sub-frame index is a countable number, which is obtained by floor( ) or ceiling( ). Therefore, the symmetry factor has the same value regardless of the two types of definitions.

In contrast, when DL control channels are transmitted with a predefined sub-frame interval, M' is considered instead of M, wherein M' indicates the number of sub-frames in each of which a control channel exists in the downlink. Further, the locations of corresponding DL sub-frames indicate ordinal turns of the sub-frames at which the DL control channels are provided. That is, when the location has a value of 0, it indicates the first DL sub-frame at which the DL control channel is provided.

Table 32 below shows a transmission timing structure for an uplink HARQ operation in a TDD system when control channels are transmitted with a predefined sub-frame interval in a downlink. In Table 32, M' indicates the number of sub-frames in each of which a control channel is provided, and is defined by $$\left\lceil \frac{M-m0}{p} \right\rceil,$$

wherein m0 indicates an index of the first sub-frame in which a control channel is provided, and usually has a value of 0. Therefore, the number of sub-frames usable for transmission of uplink data bursts has a maximum of $$M' = \left\lceil \frac{M}{p} \right\rceil.$$

Further, when there exist at least one sub-frame corresponding to the number m' sub-frame, a explicit signaling such as a MAP or broadcast message may be used to indicate the number n sub-frame for the actual transmission.

TABLE 32

|  | UL (M' ≧ N) | | UL (M' < N) | |
| --- | --- | --- | --- | --- |
|  | Subframe index | Frame index | Subframe index | Frame index |
| MAP | m' | i | m' | i |
| Burst | $\left\lfloor \frac{m'/p}{K'} \right\rfloor$ | i | $n \in \left\{ \left\lceil \frac{m'/p}{K'} \right\rceil, \left\lceil \frac{m'/p}{K'} \right\rceil + 1, \ldots, \left\lceil \frac{m'/p+1}{K'} \right\rceil - 1 \right\}$ | i |
| ACK/NACK | m' | i | m' | i + 1 |
| ReTx.burst | $\left\lfloor \frac{m'/p}{K'} \right\rfloor$ | i + 1 | n | i + 1 |

In Table 32, m' indicates an index of a sub-frame in which a DL control channel is transmitted, and $$m' \in \left\{ m0 + 0, m0 + p, m0 + 2p, m0 + p \times \left( \left\lceil \frac{M - m0}{p} \right\rceil - 1 \right) \right\}.$$

Further, the symmetry factor K' is defined by M'/N or |M'/N|. The sub-frame index is a countable number, which is obtained by floor( ) or ceiling( ). Therefore, the symmetry factor has the same value regardless of the two types of definitions.

The corresponding relation for the UL downlink operation can be calculated by using the number of sub-frames in which control channels can be provided in the downlink and the number of sub-frames in which data burst transmission may start.

When M'≧N the number m' sub-frame indicates data burst transmission starting at the number $$\left\lfloor \frac{m'/p}{K} \right\rfloor$$

sub-frame of the uplink. Further, in response to the data burst transmission starting at the number $$\left\lfloor \frac{m'/p}{K} \right\rfloor$$

sub-frame of the uplink, an HARQ feedback is transmitted at the number m' sub-frame of a later frame. Further, in response to the HARQ feedback, a retransmission is performed at the number $$\left\lfloor \frac{m'/p}{K} \right\rfloor$$

sub-frame of the uplink of a later frame.

When M'<N, the number m' sub-frame indicates data burst transmission starting at the number n sub-frame of the uplink, wherein $$n \in \left\lceil \frac{m'/p}{K'} \right\rceil, \left\lceil \frac{m'/p}{K'} \right\rceil + 1, \text{ or, } \ldots, \left\lceil \frac{m'/p+1}{K'} \right\rceil - 1.$$

Further, in response to the data burst transmission at the uplink number n sub-frame of the number I frame or a later frame, an HARQ feedback is transmitted at the downlink number m' sub-frame of the number (i+1) frame or a later frame, which has the same index as the index of the sub-frame indicating the data burst transmission, in a later frame. Further, in response to the HARQ feedback, data burst retransmission is performed at the uplink number n sub-frame, which has the same index as the index of the sub-frame in which the data burst has been transmitted.

Table 33 below shows a transmission timing structure for downlink and uplink HARQ operations in a FDD system when control channels are transmitted with a predefined sub-frame interval in a downlink.

TABLE 33

| FDD | DL | | UL | |
| --- | --- | --- | --- | --- |
|  | Subframe index | Frame index | Subframe index | Frame index |
| MAP | m' | i | m' | i |
| Burst | m ∈ {m', m' + 1, ..., m' + p − 1} | i | n ∈ {mod(m' + F/2, F), mod(m' + 1 + F/2, F), ..., mod(m' + p − 1 + F/2, F)} | $i + \left\lfloor \frac{F}{n + 1 + F/2} \right\rfloor$ |
| ACK/NACK | m < F/2<br>m > F/2 | m + F/2<br>m − F/2 | i<br>i + 1 | m' | i + 1 |

TABLE 33-continued

| | DL | | UL | |
|---|---|---|---|---|
| FDD | Subframe index | Frame index | Subframe index | Frame index |
| ReTx.burst | m | i + 1 | n | $i + \left\lfloor \dfrac{F}{n+1+F/2} \right\rfloor + 1$ |

In an FDD system, one frame includes the same number of downlink sub-frames and uplink sub-frames. In comparison with the case where a control channel is transmitted at every sub-frame, as the transmission interval of the downlink control channels increases, the index of the sub-frame indicating the downlink data burst transmission changes, so that the index of the sub-frame at which the data burst transmission starts changes. Further, as the index of the sub-frame indicating the downlink data burst transmission changes, not only the index of the sub-frame at which the data burst transmission starts changes, but also the index of the frame or sub-frame at which the downlink HARQ feedback is transmitted changes.

For the downlink transmission, the number m' sub-frame indicates data burst transmission at the number m sub-frame, wherein m indicates m', m'+1, or, . . . , m'+p−1. As described above, multiple corresponding relations can be indicated in various ways according to the control channel design. For example, in the multiple corresponding relations, one corresponding relation may be indicated through a downlink control channel such as a MAP. An HARQ feedback in response to the data burst transmission at the number m sub-frame is transmitted at the number mod(m+F/2, F) sub-frame of the uplink after F/2 sub-frames. Further, retransmission in response to the HARQ feedback is performed at the number m sub-frame of a later frame.

For the uplink transmission, the number m' sub-frame indicates data burst transmission at the number n sub-frame, wherein n∈{mod(m'+F/2,F), mod(m'+1+F/2,F), or, . . . , mod(m'+p−1+F/2,F)}. As described above, multiple corresponding relations can be indicated in various ways according to the control channel configuration. For example, in the multiple corresponding relations, information on one corresponding relation may be indicated through a downlink control channel (e.g. unicast control channel, multicast/broadcast control channel). An HARQ feedback in response to the data burst transmission at the number n sub-frame is transmitted at the number m' sub-frame of the downlink after F/2 sub-frames. Further, retransmission in response to the HARQ feedback is performed at the number n sub-frame of the downlink of a later frame.

Figure 19:
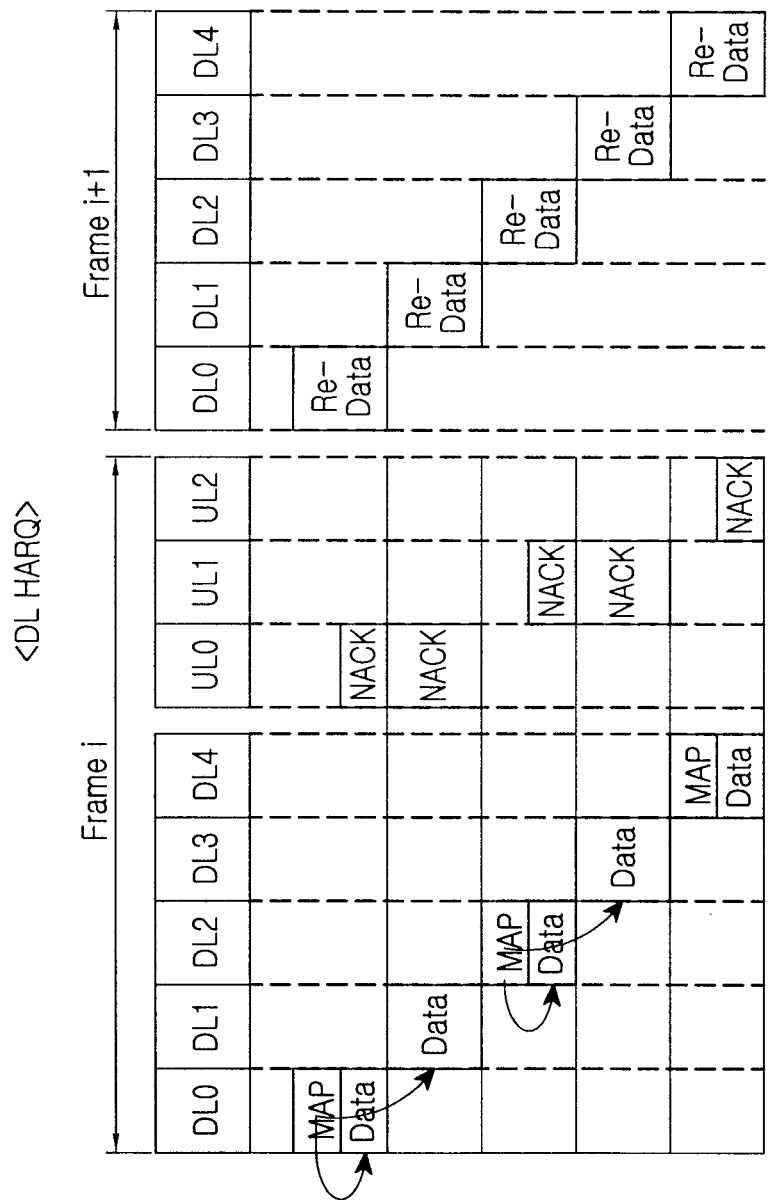
FIG. 19 illustrates an example of an HARQ operation for downlink data burst transmission when MAPs are transmitted with an interval of two sub-frames in a 5:3 TDD communication system, according to an exemplary embodiment of the present invention.

FIG. 19 illustrates an example of an HARQ operation for downlink data burst transmission when MAPs are transmitted with an interval of two sub-frames in a 5:3 TDD communication system, according to an exemplary embodiment of the present invention.

It is noted from FIG. 19 that downlink control channels referred to as a MAP are transmitted through sub-frames having indexes of 0, 2, and 4 with an interval of two sub-frames. For example, the MAP is a downlink control channel providing data burst allocation information indicated by a base station. It is noted that, since the interval is two sub-frames, the control channels at the number 0 and 2 sub-frames indicate allocation of data bursts starting at the number 0 and 1 sub-frames and at the number 2 and 3 sub-frames, respectively. Further, when a control channel or an uplink feedback is provided at each uplink sub-frame, an index of the uplink sub-frame in which the HARQ feedback in response to the data burst transmission is transmitted is determined by the relation defined by Table 34 below.

Figure 20:
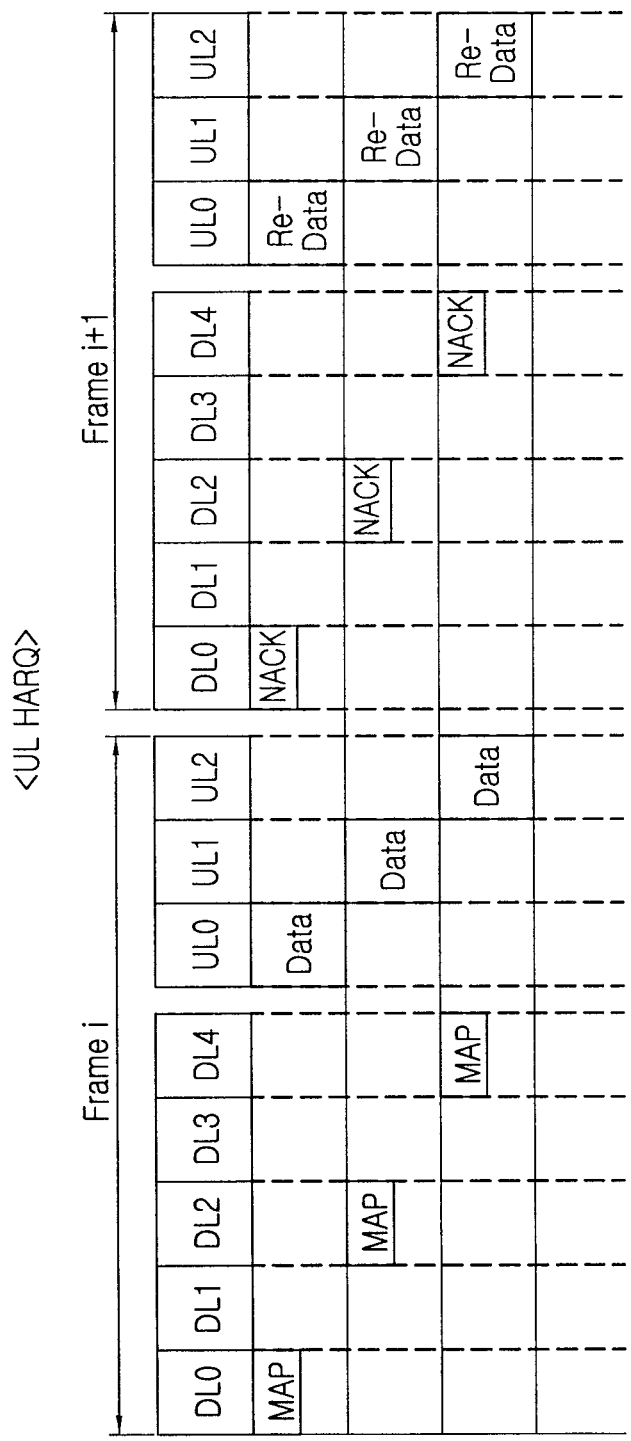
FIG. 20 illustrates an HARQ operation for an uplink data burst transmission when MAPs are transmitted with an interval of two sub-frames in a 5:3 TDD communication system, according to an exemplary embodiment of the present invention.

FIG. 20 illustrates an HARQ operation for an uplink data burst transmission when MAPs are transmitted with an interval of two sub-frames in a 5:3 TDD communication system, according to an exemplary embodiment of the present invention.

It is noted from FIG. 20 that control channels referred to as MAP are transmitted through sub-frames having indexes of 0, 2, and 4 with an interval of two sub-frames. For example, the MAP is a downlink control channel including a feedback channel with respect to an uplink data burst or providing data burst allocation information indicated by a base station. It is noted that, since control channels are transmitted at three sub-frames in the downlink and it is possible to start the data burst transmission at three sub-frames in the uplink, there is a 1:1 mapping relation between the downlink and uplink. In view of the corresponding relation between the uplink and the downlink for an HARQ operation in Table 34, the number 0 downlink sub-frame corresponds to the number 0 uplink sub-frame, the number 2 downlink sub-frame corresponds to the number 1 uplink sub-frame, and the number 4 downlink sub-frame corresponds to the number 2 uplink sub-frame. That is, the index m' of the downlink sub-frame in which the MAP is transmitted corresponds to an uplink sub-frame $$\left\lfloor \frac{m'}{2} \right\rfloor,$$

m' is one of 0, 2, and 4, K'=1, and p=2.

Meanwhile, an exemplary embodiment of the present invention can be applied to communication systems having various bandwidths. For example, change in the bandwidth may cause change in the symbol period and change in the number of symbols within one frame. Therefore, when one frame includes a predefined number of symbols, the change in the bandwidth may change the number of sub-frames configuring one frame. Therefore, one frame having bandwidths of 5 MHz, 10 MHz, and 20 MHz includes eight sub-frames (i.e. F=8, M+N=8). Further, one frame having a bandwidth of 8.75 MHz may includes seven sub-frames (i.e. F=7, M+N=7), and one frame having a bandwidth of 7 MHz includes six sub-frames (i.e. F=6, M+N=6). Alternatively, one frame having different BW includes eight sub-frames but, one subframe consists of different number of subframes according to BW.

Table 34 below shows a downlink HARQ interlace structure in an FDD communication system satisfying a signal transmission/reception processing time corresponding to three sub-frames.

TABLE 34

| FDD | m < F − X | | | m ≥ F − X | | |
|---|---|---|---|---|---|---|
| | Subframe index | Frame index | | Subframe index | Frame index | |
| MAP | m | i | | m | i | |
| Burst | m | i | | m | i | |
| ACK/NACK | m + X | i < 3 | i + 1 | m + X − F | i < 3 | i + 1 |
| | | i = 3 | 0 | | i = 3 | 0 |

In Table 34, X is defined by F/2 when X is an even number, and X is defined by ceiling(F/2) when X is an odd number. The second relation is described for TDD system.

Table 35 below shows a downlink HARQ interlace structure in a TDD communication system satisfying a signal transmission/reception processing time corresponding to three sub-frames as illustrated in FIGS. 21A to 21D.

TABLE 35

| TDD | M ≥ N | | | M < N | | |
|---|---|---|---|---|---|---|
| | Subframe index | Frame index | | Subframe index | Frame index | |
| MAP | m | i | | M | i | |
| Burst | m | i | | M | i | |
| ACK/NACK | n = f(m, K) | i | | 1∈A(m, K) | i | |
| ACK/NACK | n = f(m, K) | i < 3 | i + 1 | 1∈A(m, K) | i < 3 | i + 1 |
| | | i = 3 | 0 | | i = 3 | 0 |

In Table 34, f(m,K) is defined by formula (9) below, and A(m,K) is defined by equation (20) below.

$$f(m, K) = \begin{cases} \text{floor}(m/K), & \text{if } m \leq (M-1)/2, \\ \min(N-1, \text{ceil}(m/K)), & \text{else} \end{cases} \quad (9)$$

$$A(m, K) \equiv \{\text{ceil}(m, K), \text{ceil}(m, K)+1, \text{ceil}(m, K)+2, \ldots, \text{ceil}(m+1, K)-1\} \quad (10)$$

As above description, when one super-frame includes four frames, the frame index and the super-frame index can be obtained by formula (8). The superframe index will be increased when the frame index is computed to 0.

Second, the present invention proposes a corresponding relation between the uplink and the downlink for HARQ burst transmission in an M:N TDD system.

Similarly above description, another method is described below to achieve that a link having more time slots is divided into areas in accordance with a link having less time slots, so as to make time slots of the two links have a constant corresponding relation. Further, the sub-frames within each divided area correspond to one time slot within the link having the less time slots. Each divided area includes one or more sub-frames.

That is, M time slots are divided into N areas, and each sub-frame has a corresponding relation defined in Table 36 to 38. Where M indicates the number of subframe within a DL link, and N indicates the number of subframe within a UL link.

To divide area in Tables 36 to 38, S is defined by formula (11) or (12) below.

$$S \equiv \begin{cases} \text{floor}\left(\frac{M-N}{2}\right), & \text{if } M \geq N \\ -\text{floor}\left(\frac{N-M}{2}\right), & \text{else} \end{cases} \quad (11)$$

$$S \equiv \begin{cases} \text{ceiling}\left(\frac{M-N}{2}\right), & \text{if } M \geq N \\ -\text{ceiling}\left(\frac{N-M}{2}\right), & \text{else} \end{cases} \quad (12)$$

where M indicates the number of subframe in a DL interval and N indicates the number of subframe in a UL interval. S is negative when N is larger than N, but S is positive when N is smaller than M.

The value S is defined according to the system capability and is used for the entire HARQ operation.

Tables 36 to 38 below show HARQ interlace structures in a TDD communication system, which can secure processing intervals while maximizing the equality of the corresponding relation.

Table 36 below shows a downlink HARQ interlace structure in a TDD communication system.

TABLE 36

| DL HARQ | Subframe Index | | Frame Index |
|---|---|---|---|
| MAP | m | | i |
| Burst | m | | i |
| HARQ feedback | m < S | n = 0 | i |
| | S ≤ m < N + S | n = m − S | |
| | N + S ≤ m < M | n = N − 1 | |
| *Burst Re-Tx | m | | i + 1 |

In Table 36, burst Re-Tx shows the retransmission timing when a synchronous HARQ is considered as a downlink HARQ. Hereinafter, an HARQ interlace structure for downlink data burst transmission will be described with reference to Table 36. A base station transmits MAP information included in the number m sub-frame of the number i frame, which indicates transmission of a data burst starting at the number m sub-frame of the number i frame. Then, the data burst starts to be transmitted at the number m sub-frame of the number i frame. Then, an ACK or NACK with respect to the transmission of the data burst is transmitted at the number n sub-frame of the number i frame or a later frame by the receiving node. Thereafter, in response to the ACK or NACK, the transmitting node transmits or retransmits a data burst at the number m sub-frame of the number (i+1) frame or a later frame.

Tables 37 and 38 below show uplink HARQ interlace structures in a TDD communication system.

TABLE 37

| UL HARQ (M ≥ N) | Subframe Index | | Frame Index |
|---|---|---|---|
| MAP | m | | i |
| Burst Tx | m < S | n = 0 | i |
| | S ≤ m < N + S | n = m − S | |
| | N + S ≤ m < M | n = N − 1 | |
| HARQ feedback | m | | i + 1 |
| Burst ReTx | n | | i + 1 |

TABLE 38

| UL HARQ (M < N) | | Subframe Index | Frame Index |
|---|---|---|---|
| MAP | | m | i |
| Burst Tx | m = 0 | n ∈ {0, 1, ..., m − S} | i |
| | 0 < m < N − 1 | n = m − S | |
| | m = N − 1 | n ∈ {m − S, m − S + 1, ..., N − 1} | |
| HARQ feedback | | m | i + 1 |
| Burst ReTx | | n | i + 1 |

Hereinafter, an HARQ interlace structure for uplink data burst transmission will be described. The base station indicates transmission of a data burst starting at the number n uplink sub-frame of the number i frame or a later frame by transmitting MAP information included in the number m downlink sub-frame of the number i frame. The receiving node starts to transmit the data burst at the number n sub-frame of the number i frame or a later frame. Further, when there exists at least one value for n, a MAP should be used to indicate the number n sub-frame for the actual transmission. An ACK or NACK with respect to the transmission of the data burst is transmitted at the number m downlink sub-frame of the number (i+1) frame or a later frame. Thereafter, in response to the ACK or NACK, the transmitting node starts to transmit or retransmit a data burst at the number n sub-frame, which has the same index, of the number (i+1) frame or a later frame.

Parameters used in formulas (11) and (12) are defined by formula (13) below.

$$m \in \{0, 1, \ldots, M-1\}$$

$$n \in \{0, 1, \ldots, N-1\}$$

$$m' = p^*x, x = \{0, 1, \ldots, (\text{ceiling}(M/p)-1\}, \quad (13)$$

wherein p indicates a period of USCCH.

In formula (13), m indicates an index of a downlink sub-frame, n indicates an index of an uplink sub-frame, and m' indicates an index of a downlink sub-frame for transmission of a Unicast Service Control Channel (USCCH), wherein USCCH denotes a channel for transmission/reception of a control signal, such as MAP or UL HARQ feedback. As above description in Table 31 to 33, a transmission timing structure for a HARQ operation when DL control channels are transmitted with a predetermined sub-frame interval p.

Hereinafter, an HARQ interlace structure of a TDD communication system when p is 2 will be described.

Table 39 below shows an HARQ interlace structure of a TDD communication system when p=2.

TABLE 39

| DL HARQ | Subframe index | | Frame index |
|---|---|---|---|
| MAP | m' | | i |
| Burst | m ∈ {m', m' + 1} | | i |
| HARQ feedback | 0 ≦ m < S | n = 0 | i |
| | S ≦ m < N + S | n = m − S | |
| | N + S ≦ m < M | n = N − 1 | |

Tables 40 and 41 below show UL HARQ interlace structures in the downlink interval when p=2.

Table 40 shows a UL HARQ interlace structure when ceiling (M/2)>=N.

TABLE 40

| UL HARQ | Subframe index | | Frame index |
|---|---|---|---|
| MAP | m' | | i |
| Burst Tx | 0 ≦ m' < S | n = 0 | i |
| | S ≦ m' < N + S | n ∈ {m' − S} | |
| | N + S ≦ m' < M | n = N − 1 | |
| HARQ feedback | m' | | i + 1 |
| Burst Re Tx | n | | i + 1 |

Table 40 shows a UL HARQ interlace structure when ceiling (M/2)<N.

TABLE 41

| UL HARQ | Subframe index | | Frame index |
|---|---|---|---|
| MAP | m' | | i |
| Burst Tx | m' = 0 | n ∈ {0, 1, ..., m' − S, m' − S + 1} | i |
| | 0 < m' < M − 1 | n ∈ {m' − S, m' − S + 1} | |
| | m' = M − 1 | n ∈ {m' − S, m' − S + 1, ..., N − 1} | |
| HARQ feedback | m' | | i + 1 |
| Burst Re Tx | n | | i + 1 |

Tables 42 to 44 show downlink and uplink HARQ interlace structures when a period of the USCCH has been generalized to p. That is, the following tables satisfy an HARQ interlace structure for all cases in which p has a value of at least 1.

Table 42 below shows a downlink HARQ interlace structure.

TABLE 42

| DL HARQ | Subframe index | | Frame index |
|---|---|---|---|
| MAP | m' | | i |
| Burst | m ∈ {m', m' + 1, ..., m' + p − 1} | | i |
| HARQ feedback | 0 ≦ m < S | n = 0 | i |
| | S ≦ m < N + S | n = m − S | |
| | N + S ≦ m < M | n = N − 1 | |

Table 43 below shows an uplink HARQ interlace structure when N≦ceiling(M/p).

TABLE 43

| UL HARQ | Subframe index | | Frame index |
|---|---|---|---|
| MAP | m' | | i |
| Burst Tx | 0 ≦ m' < S | n = 0 | i |
| | S ≦ m' < N + S | n = m' − S | |
| | N + S ≦ m' < M | n = N − 1 | |
| HARQ feedback | m' | | i + 1 |
| Burst Re Tx | n | | i + 1 |

Table 43 below shows an uplink HARQ interlace structure when N>ceiling(M/p).

TABLE 44

| UL HARQ | Subframe index | | Frame index |
|---|---|---|---|
| MAP | m' | | i |
| Burst Tx | m' = 0 | n ∈ {0, 1, ..., m' − S, ..., m' + p − S − 1} | i |
| | 0 < m' < M − 1 | n ∈ {m' − S, m' − S + 1, ..., m' + p − S − 1} | |
| | m' = M − 1 | n ∈ {m' − S, ..., m' − S + 1, ..., N − 1} | |

TABLE 44-continued

| UL HARQ | Subframe index | Frame index |
|---|---|---|
| HARQ feedback | m' | i + 1 |
| Burst Re Tx | n | i + 1 |

The HARQ interlace structures defined by Tables 36 to 44 have different transmission/reception delays according to the ratio between the uplink and the downlink or the sub-frame index.

Similarly to the operation delay scheme defined in Tables 27 to 30, operation delays in the case of using the HARQ interlace structures defined by Tables 36 to 44 can be defined as follows.

Table 45 below shows HARQ operation delays and retransmission delays for DL HARQs and UL HARQs in a TDD system.

TABLE 45

| Operation | DL HARQ | UL HARQ |
|---|---|---|
| Rx delay (e.g. HARQ feedback delay) | $(M + N)x_{DL} + M - m + n$ | $(M + N)x_{UL} + N - n + m$ |
| Tx delay | $(M + N)y_{DL} + N - n + m$ | $(M + N)y_{UL} + M - m + n$ |
| HARQ Retransmission delay | $(M + N)(x_{DL} + y_{DL} + 1)$ | $(M + N)(x_{UL} + y_{UL} + 1)$ |

In Table 45, M indicates the number of sub-frames of the downlink, and N indicates the number of sub-frames of the uplink. According to the HARQ corresponding relation used for the DL HARQ, m indicates an index of a sub-frame in which a data burst is transmitted, and n indicates an index of a sub-frame in which an HARQ feedback is transmitted. According to the HARQ corresponding relation used for the UL HARQ, m indicates an index of a sub-frame in which burst allocation is indicated or an HARQ feedback is transmitted, and n indicates an index of a sub-frame in which a data burst is transmitted.

Table 46 below shows HARQ operation delays and retransmission delays for DL HARQs and UL HARQs in an FDD system.

TABLE 46

| Operation | DL HARQ | UL HARQ |
|---|---|---|
| Rx offset (e.g. HARQ feedback delay) | $F \cdot x_{DL} + \text{ceiling}(F/2)$ | $F \cdot x_{UL} + \text{ceiling}(F/2)$ |
| Tx offset | $F \cdot y_{DL} + \text{ceiling}(F/2)$ | $F \cdot y_{UL} + \text{ceiling}(F/2)$ |
| HARQ Retransmission delay | $F \cdot (x_{DL} + y_{DL} + 1)$ | $F \cdot (x_{UL} + y_{UL} + 1)$ |

The values of x and y in the uplink or the downlink change according to the capability of a transmitter or a receiver, a burst transmission interval, a sub-frame index, an uplink-downlink ratio, and an HARQ corresponding relation. The HARQ corresponding relation for a TDD system use the structures defined in Tables 3 and 4 or Tables 36 to 44. Further, the HARQ corresponding relation for an FDD system uses the structure defined in Table 5.

In addition, the value of x, which is a factor for determining an Rx delay up to transmission of an HARQ feedback after reception of data in each sub-frame, is determined in the same way as k1 according to the considered HARQ corresponding relation. The value of y, which is a factor for determining a Tx delay up to burst retransmission after reception of a NACK received as an HARQ feedback in each sub-frame as in Tables 21 and 23, is determined in the same way as k2 according to the considered HARQ corresponding relation. The retransmission interval is a sum of the two delays.

Further, as described above, sub-frame, frame, and superframe indexes by the offsets are calculated by using formulas (6) to (8).

In addition, as described above, Tables 36 to 44 are used for an HARQ interlace structure within an IEEE 802.16m area in a coexistence mode. Further, S is determined according to the system capability.

In the case of asynchronous HARQ, the Rx delay is constant, while the retransmission interval is determined by the scheduling time.

In the case of asynchronous HARQ, constant Tx and Rx delays are defined in advance, while the retransmission interval is constant due to the delays defined in advance.

Tables 46 to 48 show reception delay offsets for the DL HARQ, which are calculated using Table 45 according to the processing time that the system can support. In Tables 46 to 48, two sub-frames and three sub-frames are considered as the reception processing time, and only the Rx delay offset for the HARQ feedback timing is shown in consideration of the asynchronous DL HARQ.

Table 47 shows reception delay offsets up to the HARQ feedback transmission in each sub-frame for the DL HARQ when M+N=8.

TABLE 47

| M:N | Processing time [subframe] | DL Subframe index | | | | | |
|---|---|---|---|---|---|---|---|
| | | 0 | 1 | 2 | 3 | 4 | 5 |
| 6:2 | 2 | 6 | 5 | 4 | 4 | 3 | 10 (S) |
| | 3 | 6 | 5 | 4 | 4 | 11 (S) | 10 (S) |
| 5:3 | 2 | 5 | 4 | 4 | 4 | 3 | — |
| | 3 | 5 | 4 | 4 | 4 | 11 (S) | — |
| 4:4 | 2 | 4 | 4 | 4 | 4 | — | — |
| | 3 | 4 | 4 | 4 | 4 | — | — |
| 3:5 | 2 | 4 | 4 | 4 | — | — | — |
| | 3 | 4 | 4 | 4 | — | — | — |

Table 48 shows reception delay offsets up to the HARQ feedback transmission in each sub-frame for the DL HARQ when M+N=7.

TABLE 48

| M:N | Processing time [subframe] | DL Subframe index | | | | |
|---|---|---|---|---|---|---|
| | | 0 | 1 | 2 | 3 | 4 |
| 5:2 | 2 | 5 | 4 | 3 | 3 | 9 |
| | 3 | 5 | 4 | 11 | 11 | 9 |
| 4:3 | 2 | 4 | 3 | 3 | 3 | — |
| | 3 | 4 | 11 | 11 | 11 | — |
| 3:4 | 2 | 4 | 4 | 4 | — | — |
| | 3 | 4 | 4 | 4 | — | — |

Table 49 shows reception delay offsets up to the HARQ feedback transmission in each sub-frame for the DL HARQ when M+N=6.

TABLE 49

| M:N | Processing time [subframe] | DL Subframe index 0 | 1 | 2 | 3 |
|---|---|---|---|---|---|
| 4:2 | 2 | 4 | 3 | 3 | 10 |
|  | 3 | 4 | 11 | 11 | 10 |
| 3:3 | 2 | 3 | 3 | 3 | — |
|  | 3 | 11 | 11 | 11 | — |
| 2:4 | 2 | 3 | 3 | — | — |
|  | 3 | 11 | 11 | — | — |

The interval between the two operations has a value obtained by subtracting 1 from the delay offsets shown in Tables 46 to 48. Referring to the tables, a slow feedback is performed when Rx delay offset in each sub-frame is larger than (M+N), while a fast feedback is performed when Rx delay offset in each sub-frame is smaller than (M+N).

Further, the Tx delay, the Rx delay, and the retransmission interval are shown in consideration of the asynchronous UL HARQ.

Tables 50 to 52 below show transmission and reception delay offsets, and retransmission delay for the UL HARQ, which are calculated using Table 45 according to the processing time that the system can support. In Tables 50 to 52, two sub-frames and three sub-frames are considered as the reception processing time.

Table 50 shows reception delay offsets in each sub-frame for the UL HARQ when M+N=8.

TABLE 50

| M:N | Processing time [subframe] | Offset | DL Subframe index (MAP index) 0 | 1 | 2 | 3 | 4 | 5 |
|---|---|---|---|---|---|---|---|---|
| 6:2 | 2 | Tx | 6 | 5 | 4 | 4 | 3 | 10 |
|  |  | Rx | 10 | 3 | 4 | 4 | 5 | 6 |
|  |  | Retransmission | 16 (S) | 8 | 8 | 8 | 8 | 16 (S) |
|  | 3 | Tx | 6 | 5 | 4 | 4 | 11 | 10 |
|  |  | Rx | 10 | 11 | 4 | 4 | 5 | 6 |
|  |  | Retransmission | 16 (S) | 16 (S) | 8 | 8 | 16 (S) | 16 (S) |
| 5:3 | 2 | Tx | 5 | 4 | 4 | 4 | 3 | — |
|  |  | Rx | 3 | 4 | 4 | 4 | 5 | — |
|  |  | Retransmission | 8 | 8 | 8 | 8 | 8 | — |
|  | 3 | Tx | 5 | 4 | 4 | 4 | 11 | — |
|  |  | Rx | 11 | 4 | 4 | 4 | 5 | — |
|  |  | Retransmission | 16 (S) | 8 | 8 | 8 | 16 (S) | — |
| 4:4 | 2 | Tx | 4 | 4 | 4 | 4 |  |  |
|  |  | Rx | 4 | 4 | 4 | 4 |  |  |
|  |  | Retransmission | 8 | 8 | 8 | 8 |  |  |
|  | 3 | Tx | 4 | 4 | 4 | 4 |  |  |
|  |  | Rx | 4 | 4 | 4 | 4 |  |  |
|  |  | Retransmission | 8 | 8 | 8 | 8 |  |  |
| 3:5 | 2 | Tx | 3 | 4 | 4 | 4 | 5 |  |
|  |  | Rx | 5 | 4 | 4 | 4 | 3 |  |
|  |  | Retransmission | 8 | 8 | 8 | 8 | 8 |  |
|  | 3 | Tx | 11 | 4 | 4 | 4 | 5 |  |
|  |  | Rx | 5 | 4 | 4 | 4 | 11 |  |
|  |  | Retransmission | 16 | 8 | 8 | 8 | 16 |  |

Table 51 shows reception delay offsets in each sub-frame for the UL HARQ when M+N=7.

TABLE 51

| M:N | Processing time [subframe] | Offset | DL Subframe index (MAP index) 0 | 1 | 2 | 3 | 4 |
|---|---|---|---|---|---|---|---|
| 5:2 | 2 | Tx | 5 | 4 | 3 | 3 | 9 |
|  |  | Rx | 9 | 3 | 4 | 4 | 5 |
|  |  | Retransmission | 14 | 7 | 7 | 7 | 14 |

TABLE 51-continued

| M:N | Processing time [subframe] | Offset | DL Subframe index (MAP index) 0 | 1 | 2 | 3 | 4 |
|---|---|---|---|---|---|---|---|
|  | 3 | Tx | 5 | 4 | 10 | 10 | 9 |
|  |  | Rx | 9 | 10 | 4 | 4 | 5 |
|  |  | Retransmission | 14 (S) | 14 | 14 | 14 | 14 (S) |
| 4:3 | 2 | Tx | 4 | 3 | 3 | 3 |  |
|  |  | Rx | 3 | 4 | 4 | 4 |  |
|  |  | Retransmission | 7 | 7 | 7 | 7 |  |
|  | 3 | Tx | 4 | 10 | 10 | 10 |  |
|  |  | Rx | 10 | 4 | 4 | 4 |  |
|  |  | Retransmission | 14 | 14 | 14 | 14 |  |
| 3:4 | 2 | Tx | 3 | 4 | 4 | 4 |  |
|  |  | Rx | 4 | 3 | 3 | 3 |  |
|  |  | Retransmission | 7 | 7 | 7 | 7 |  |
|  | 3 | Tx | 10 | 4 | 4 | 4 |  |
|  |  | Rx | 4 | 10 | 10 | 10 |  |
|  |  | Retransmission | 14 | 14 | 14 | 14 |  |

Table 52 shows reception delay offsets in each sub-frame for the UL HARQ when M+N=6.

TABLE 52

| M:N | Processing time [subframe] | Offset | DL Subframe index (MAP index) 0 | 1 | 2 | 3 |
|---|---|---|---|---|---|---|
| 4:2 | 2 | Tx | 4 | 3 | 3 | 8 |
|  |  | Rx | 8 | 3 | 3 | 4 |
|  |  | Retransmission | 12 | 6 | 6 | 12 |

TABLE 52-continued

| Processing time M:N [subframe] | | Offset | DL Subframe index (MAP index) | | | |
|---|---|---|---|---|---|---|
| | | | 0 | 1 | 2 | 3 |
| 3:3 | 2 | Tx | 3 | 3 | 3 | — |
| | | Rx | 3 | 3 | 3 | — |
| | | Retransmission | 6 | 6 | 6 | — |
| 2:4 | 2 | Tx | 8 3 | 3 | 4 | — — |
| | | Rx | 4 3 | 3 | 8 | — — |
| | | Retransmission | 12 6 | 6 | 12 | — — |

FIGS. 21A-21D and 22A-22D illustrate fast feedback or fast interlaces and slow feedback or slow interlaces according to the processing capability of a system based on the delay values shown in Tables 46 and 49, according to exemplary embodiments of the present invention. FIGS. 21A to 21D illustrate fast or slow HARQ interlace structures according to sub-frame indexes according to various TDD ratios when the transmission or reception processing interval includes two sub-frames, according to exemplary embodiments of the present invention. Here, the fast feedback delay or slow feedback delay is shown in consideration of the asynchronous DL HARQ, and the fast feedback delay or slow feedback delay is shown in consideration of the synchronous UL HARQ. Referring to FIG. 21C, the number 0 and 1 downlink sub-frames correspond to the number 0 uplink sub-frame, the number 2 downlink sub-frame corresponds to the number 1 uplink sub-frame, and the number 3 and 4 downlink sub-frames correspond to the number 2 uplink sub-frame. For example, feedback in response to the downlink data burst transmitted at the number 3 downlink sub-frame is transmitted at the number 2 uplink sub-frame. Therefore, a processing time corresponding to three sub-frames are spent up to feedback transmission after uplink data burst transmission, which satisfies all the communication system requiring a signal transmission/reception processing time corresponding to two or three sub-frames. In comparison between FIG. 4A and FIG. 21C, they are different in that the number 2 and 3 downlink sub-frames correspond to the number 1 uplink sub-frame in FIG. 4A, while the number 2 downlink sub-frame corresponds to the number 1 uplink sub-frame and the number 3 downlink sub-frame corresponds to the number 2 uplink sub-frame in FIG. 21C.

FIGS. 22A to 22D illustrate fast or slow HARQ interlace structures according to sub-frame indexes according to various TDD ratios when the transmission or reception processing interval includes three sub-frames, according to exemplary embodiments of the present invention. The selection of fast or slow HARQ interlace structures according to the shown processing capability illustrated in FIGS. 21A to 22D may be performed through a negotiation between a mobile station and a base station, or the capability of each system may be determined by a profile. When an HARQ operation is selected through a negotiation, the base station may support different HARQ operations in each sub-frames according to mobile stations in order to support different capabilities of the mobile stations.

Exemplary embodiments of the present invention propose an HARQ interlace structure having an HARQ retransmission delay time in the unit of frame interval in a wireless mobile communication system. The proposed HARQ interlace structure has a constant HARQ retransmission delay time while maximizing the symmetry of the corresponding relation in a symmetric or asymmetric uplink/downlink system (for example, FDD, M:N TDD, M:N H-FDD). Further, according to the symmetry of the corresponding relation, the index of the DL sub-frame transmitting an HARQ feedback and a MAP indicating data burst allocation for an uplink HARQ operation is equal to an index of a DL sub-frame transmitting a data burst for a downlink HARQ operation, and the index of the UL sub-frame transmitting a data burst for an uplink HARQ operation is equal to an index of a UL sub-frame transmitting an HARQ feedback for a downlink HARQ operation. Therefore, it is possible to minimize the number of sub-frames that a system should monitor, thereby minimizing the waste of power consumption. Moreover, since each HARQ operation is periodically performed, the degree of freedom in communication between a mobile station and another system is improved.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of signal transmission and reception by a transmitter in a wireless mobile communication system using a super-frame, the method comprising:
   determining a signal transmission/reception corresponding relation between downlink sub-frames of a downlink and uplink sub-frames of an uplink, the super-frame comprising a plurality of frames, each frame comprising a plurality of downlink sub-frames and a plurality of uplink sub-frames, the signal transmission/reception corresponding relation enabling each sub-frame within a link comprising fewer sub-frames to correspond to at least one sub-frame within a link comprising more sub-frames, considering whether the downlink and the uplink comprise different numbers of sub-frames or not;
   transmitting and receiving signals to and from a receiver through the downlink sub-frames and the uplink sub-frames according to the signal transmission/reception corresponding relation;
   receiving feedback, in response to a transmitted data burst, through at least one uplink sub-frame of a first frame corresponding to a downlink sub-frames through which control information and the data burst have been transmitted according to the signal transmission/reception corresponding relation; and
   when the feedback is a Non-ACKnowledgement (NACK) response, retransmitting the data burst, through at least one downlink sub-frame of a second frame corresponding to said at least one uplink sub-frame of the first frame according to the signal transmission/reception corresponding relation,
   wherein a time slot index within the link comprising fewer time slots corresponds to a time slot index within the link comprising more time slots based on the signal transmission/reception corresponding relation.

2. The method of claim 1, wherein the signal transmission/reception corresponding relation is determined by $$u = \mathrm{floor}\left(\frac{d}{M/N}\right),$$

wherein d indicates a time slot index within the link having the more time slots, u indicates a time slot index within the link having the fewer time slots, M indicates the number of time slots within the link having the more time slots, N indicates the number of time slots within the link having the fewer time slots, and the floor function has a value obtained by rounding down decimals of the value obtained from a calculation within the parenthesis.

3. The method of claim 2, wherein, when M is 6 and N is 2, a first sub-frame, a second sub-frame, and a third sub-frame within a link comprising six sub-frames correspond to a first sub-frame within a link comprising two sub-frames, and a fourth sub-frame, a fifth sub-frame, and a sixth sub-frame within the link comprising the six sub-frames correspond to a second sub-frame within the link comprising the two sub-frames.

4. The method of claim 3, wherein a first signal corresponding to at least one of control information or a data burst is transmitted through the first sub-frame, the second sub-frame, and the third sub-frame within the link comprising six sub-frames, a response signal to the transmitted first signal is received through the corresponding first sub-frame of the link comprising the two sub-frames, a second signal corresponding to at least one of control information or a data burst is transmitted through the fourth sub-frame, the fifth sub-frame, and the sixth sub-frame within the link comprising the six sub-frames, and a response signal to the transmitted second signal is received through the corresponding second sub-frame of the link comprising the two sub-frames.

5. The method of claim 2, wherein, when M is 5 and N is 3, a first sub-frame and a second sub-frame within a link comprising six sub-frames correspond to a first sub-frame within a link comprising three sub-frames, a third sub-frame and a fourth sub-frame within the link comprising the six sub-frames correspond to a second sub-frame within the link comprising the three sub-frames, and a fifth sub-frame within the link comprising the six sub-frames corresponds to a third sub-frame within the link comprising the three sub-frames.

6. The method of claim 3, wherein a first signal corresponding to at least one of control information or a data burst is transmitted through the first sub-frame and the second sub-frame within the link comprising five sub-frames, a response signal to the transmitted first signal is received through the corresponding first sub-frame of the link comprising the three sub-frames, a second signal corresponding to at least one of control information or a data burst is transmitted through the third sub-frame and the fourth sub-frame within the link comprising five sub-frames, a response signal to the transmitted second signal is received through the corresponding second sub-frame of the link comprising the three sub-frames, a third signal corresponding to at least one of control information or a data burst is transmitted through the fifth sub-frame within the link comprising five sub-frames, and a response signal to the transmitted third signal is received through the corresponding third sub-frame of the link comprising the three sub-frames.

7. The method of claim 1, wherein the transmitting and receiving of the signals to and from the receiver is performed through a sub-frame determined by

| $M \geq N$ | DL Subframe index | Frame index | UL Subframe index | Frame index |
|---|---|---|---|---|
| MAP | M | i | m | i |
| Burst | M | i | n = Floor(m/K) | i |
| ACK/NACK | n = Floor(m/K) | i | m | i + 1 |
| ReTx.burst | M | i + 1 | n = Floor(m/K) | i + 1 | wherein m (m=0, ..., M−1) indicates a sub-frame index in the downlink, n (n=0, ..., N−1) indicates a sub-frame index in the uplink, K is defined as M/N or ceiling (M/N), DL denotes DownLink, UL denotes UpLink, ACK denotes ACKnowledgment, NACK denotes Non-ACKnowledgment, and ReTx denotes ReTransmission.

8. The method of claim 1, wherein the transmitting and receiving of the signals to and from the receiver is performed through a sub-frame determined by

| $M < N$ | DL Mini frame index | Frame index | UL Mini frame index | Frame index |
|---|---|---|---|---|
| MAP | m | i | m | i |
| Burst | m | i | n where Floor(n/K) = m, $n \in \{\lceil \frac{m}{K} \rceil, \lceil \frac{m}{K} \rceil + 1, ..., \lceil \frac{m+1}{K} \rceil - 1\}$ | i |
| ACK/NACK | n where Floor(n/K) = m, $n \in \{\lceil \frac{m}{K} \rceil, \lceil \frac{m}{K} \rceil + 1, ..., \lceil \frac{m+1}{K} \rceil - 1\}$ | i | m | i + 1 |
| ReTx.burst | m | i + 1 | n | i + 1 | wherein m (m=0, ..., M−1) indicates a sub-frame index in the downlink, n (n=0, ..., N−1) indicates a sub-frame index in the uplink, K is defined as M/N or ceiling(M/N), DL denotes DownLink, UL denotes UpLink, ACK denotes ACKnowledgment, NACK denotes Non-ACKnowledgment, and ReTx denotes ReTransmission.

9. The method of claim 1, wherein the transmitting and receiving of the signals to and from the receiver is performed through a sub-frame determined by

| FDD | DL subframe index | | Frame index | UL subframe index | | Frame index |
|---|---|---|---|---|---|---|
| MAP | m | | i | M | | i |
| Burst | m | | i | m ≤ F/2 | m + F/2 | i |
| | | | | m > F/2 | m − F/2 | i + 1 |
| ACK/NACK | m ≤ F/2 | m + F/2 | i | M | | i + 1 |
| | m > F/2 | m − F/2 | i + 1 | | | |

-continued

| FDD | DL | | UL | | |
|---|---|---|---|---|---|
| | subframe index | Frame index | subframe index | | Frame index |
| ReTx.burst | m | i + 1 | m ≤ F/2<br>m > F/2 | m + F/2<br>m − F/2 | i + 1<br>i + 2 | wherein m (m=0, ..., F−1) indicates a sub-frame index in the downlink, n (n=0, ..., F−1) indicates a sub-frame index in the uplink, F indicates the number of sub-frames within each of the downlink and the uplink, FDD denotes Frequency Division Duplex, DL denotes DownLink, UL denotes UpLink, ACK denotes ACKnowledgment, NACK denotes Non-ACKnowledgment, and ReTx denotes ReTransmission.

10. The method of claim 1, wherein the transmitting and receiving of the signals to and from the receiver is performed through a sub-frame determined by

| | subframe Index | | Frame |
|---|---|---|---|
| M:N | M ≥ N | M < N | Index |
| MAP | M | m | i |
| Data Burst | m* | m* | i |
| ACK | n = M + floor(m/K) | $n \in \{\lceil \frac{m}{K} \rceil + M, \lceil \frac{m}{K} \rceil + 1 + M, \ldots, \lceil \frac{m+1}{K} \rceil - 1 + M\}$ | i |
| ReTx | m* | m* | i + 1 | wherein each of m and m* (m, m*=0, ..., M−1) indicates a sub-frame index in the downlink, n (n=M, ..., M+N−1) indicates a sub-frame index in the uplink, i indicates a frame index, ACK denotes ACKnowledgment, and ReTx denotes ReTransmission.

11. The method of claim 1, wherein the transmitting and receiving of the signals to and from the receiver is performed through a sub-frame determined by

| | subframe Index | | |
|---|---|---|---|
| M:N | M ≥ N | M < N | Frame |
| MAP | M | m | i |
| Data Burst | n* = M + floor(m/K) | $n \in \{\lceil \frac{m}{K} \rceil + M, \lceil \frac{m}{K} \rceil + 1 + M, \ldots, \lceil \frac{m+1}{K} \rceil - 1 +$ | i |
| ACK | M | m | i + 1 |
| ReTx | m* = M + floor(m/K) | n | i + 1 | wherein m (m=0, ..., M−1) indicates a sub-frame index in the downlink, each of n, n*, and m* (n, n*, m*=M, ..., M+N−1) indicates a sub-frame index in the uplink, i indicates a frame index, ACK denotes ACKnowledgment, and ReTx denotes ReTransmission.

12. The method of claim 1, wherein the transmitting and receiving of the signals to and from the receiver is performed through a sub-frame determined by

| | subframe Index | | |
|---|---|---|---|
| M:N | M ≥ N | M < N | Frame Index |
| MAP<br>Data | m = N + m'<br>m* | m = N + m'<br>m* | i<br>i |
| ACK | n = floor(m'/K) | $n \in \{\lceil \frac{m}{K} \rceil, \lceil \frac{m}{K} \rceil + 1, \ldots, \lceil \frac{m+1}{K} \rceil - 1\}$ | i + 1 |
| ReTx | m* | m* | i + 1 | wherein each of m and m* (m, m*=N, ..., N+M−1) indicates a sub-frame index in the downlink, n (n=0, ..., N−1) indicates a sub-frame index in the uplink, m' indicates an order of a sub-frame in the downlink, i indicates a frame index, ACK denotes ACKnowledgment, and ReTx denotes ReTransmission.

13. The method of claim 1, wherein the transmitting and receiving of the signals to and from the receiver is performed through a sub-frame determined by

| | subframe Index | | |
|---|---|---|---|
| M:N | M ≥ N | M < N | Frame Index |
| MAP | m = m' + M | m = m' + M | i |
| Data Burst | n* = floor(m/K) | $n^* \in \{\lceil \frac{m}{K} \rceil, \lceil \frac{m}{K} \rceil + 1, \ldots, \lceil \frac{m+1}{K} \rceil - 1\}$ | i + 1 |
| ACK | m | m | i + 1 |
| ReTx | N | n | i + 2 | wherein m (m=N, ..., N+M−1) indicates a sub-frame index in the downlink, each of n and n* (n, n*=0, ..., N−1) indicates a sub-frame index in the uplink, m' indicates an order of the sub-frames in the downlink, and i indicates a frame index, ACK denotes ACKnowledgment, and ReTx denotes ReTransmission.

14. The method of claim 1, wherein the transmitting and receiving of the signals to and from the receiver is performed through a sub-frame determined by

| Operation | Sub-frame Index | Delay | Note |
|---|---|---|---|
| Data Tx | m | Fx + F/2 | x is a delay factor |
| ACK | (m + F/2) mod F | | and depends on processing time and TTI | wherein m (m=N, ..., N+M−1) indicates a sub-frame index in the downlink, F indicates the number of sub-frames within one frame, ACK denotes ACKnowledgment, Tx denotes Transmission and TTI denotes Transmission Time Interval.

15. The method of claim 1, wherein the transmitting and receiving of the signals to and from the receiver is performed through a sub-frame determined by

| Operation | Sub-frame Index | Delay | Note |
|---|---|---|---|
| Data Tx | m | $(M+N)x + M - m + n$ | $K = M/N$ |
| HARQ feedback $M \geq N$ | $n = \lfloor \frac{m}{K} \rfloor$ | | |
| $M < N$ | $n \in \{\lceil \frac{m}{K} \rceil, \lceil \frac{m}{K} \rceil + 1, \ldots, \lceil \frac{m+1}{K} \rceil - 1\}$ | $(M+N)y + N - n + m$ | |
| Data (Re)Tx | m | | | wherein m (m=N, . . . , N+M−1) indicates a sub-frame index in the downlink, n (n=0, . . . , N−1) indicates a sub-frame index in the uplink, x and y are predetermined delay factors, M indicates the number of sub-frames within a data burst link, N indicates the number of sub-frames within a feedback link, Tx denotes transmission, and HARQ denotes Hybrid Automatic Repeat reQuest.

16. The method of claim 1, wherein, when control information is provided at an interval of predefined number of sub-frames within the downlink, the control information indicates data burst transmission before a sub-frame providing a next downlink control channel.

17. The method of claim 1, wherein the transmitting and receiving of the signals to and from the receiver is performed through a sub-frame determined by

| | DL (M ≥ N) | | DL (M < N) | |
|---|---|---|---|---|
| | Subframe index | Frame index | Subframe index | Frame index |
| MAP | m' | i | m' | i |
| Burst | $m \in \{m', m'+1, \ldots, m'+p-1\}$ | i | $m \in \{m', m'+1, \ldots, m'+p-1\}$ | i |
| ACK/NACK | $\lfloor \frac{m}{K} \rfloor$ | i | $\lceil \frac{m}{K} \rceil, \lceil \frac{m}{K} \rceil + 1, \ldots, \lceil \frac{m+1}{K} \rceil - 1$ | i |
| ReTx.burst | m | i + 1 | m | i + 1 | wherein p indicates an interval between sub-frames for transmission of control information, m' indicates a sub-frame index in which a control channel is transmitted, $$m' = m0 + 0, m0 + p, m0 + 2p, m0 + p \times \left(\left\lceil \frac{M - m0}{p} \right\rceil - 1\right),$$

m0 indicates a location of a first sub-frame transmitting the control channel within one frame, the number of sub-frames in which the control channel are provided is $$\left\lceil \frac{M - m0}{p} \right\rceil$$

when m0 has a value other than 0, m indicates a sub-frame index in which a data burst transmission starts and is m', m'+1, . . . , m+p−1, K is defined by $$\frac{M}{N} \text{ or } \left\lceil \frac{M}{N} \right\rceil,$$

M indicates the number of sub-frames within the link comprising the more sub-frames, N indicates the number of sub-frames within the link comprising the fewer sub-frames, DL denotes DownLink, ACK denotes ACKnowledgment, NACK denotes Non-ACKnowledgment, and ReTx denotes ReTransmission.

18. The method of claim 1, wherein the transmitting and receiving of the signals to and from the receiver is performed through a sub-frame determined by

| | UL (M' ≥ N) | | UL (M' < N) | |
|---|---|---|---|---|
| | Subframe index | Frame index | Subframe index | Frame index |
| MAP | m' | i | m' | i |
| Burst | $\lfloor \frac{m'/p}{K'} \rfloor$ | i | $n \in \{\lceil \frac{m'/p}{K'} \rceil, \lceil \frac{m'/p}{K'} \rceil + 1, \ldots, \lceil \frac{m'/p + 1}{K'} \rceil - 1\}$ | i |
| ACK/NACK | m' | i | m' | i + 1 |
| ReTx.burst | $\lfloor \frac{m'/p}{K'} \rfloor$ | i + 1 | n | i + 1 | wherein p indicates an interval between sub-frames for transmission of control information, m' indicates a sub-frame index in which a control channel is transmitted, $$m' = m0 + 0, m0 + p, m0 + 2p, m0 + p \times \left(\left\lceil \frac{M - m0}{p} \right\rceil - 1\right),$$

M' indicates the number of sub-frames in each of which the control information is provided and is defined by $$\left\lceil \frac{M - m0}{p} \right\rceil,$$

the number of sub-frames for uplink data burst transmission has a maximum of $$M' = \left\lceil \frac{M}{p} \right\rceil,$$

K' is defined by M'/N or ⌈M'/N⌉, M indicates the number of sub-frames within the link comprising the more sub-frames, N indicates the number of sub-frames within the link comprising the fewer sub-frames, UL denotes UpLink, ACK denotes ACKnowledgment, NACK denotes Non-ACKnowledgment, and ReTx denotes ReTransmission.

19. The method of claim 1, wherein the transmitting and receiving of the signals to and from the receiver is performed through a sub-frame determined by

| FDD | DL Subframe index | | Frame index | UL Subframe index | Frame index |
|---|---|---|---|---|---|
| MAP | m' | | i | m' | i |
| Burst | m ∈ {m', m' + 1, ..., m' + p − 1} | | i | n ∈ {mod(m' + F/2, F), mod(m' + 1 + F/2, F), ..., mod(m' + p − 1 + F/2, F)} | $i + \left\lfloor \dfrac{F}{n+1+F/2} \right\rfloor$ |
| ACK/NACK | m < F/2<br>m > F/2 | m + F/2<br>m − F/2 | i<br>i + 1 | m' | i + 1 |
| ReTx.burst | M | | i + 1 | n | $i + \left\lfloor \dfrac{F}{n+1+F/2} \right\rfloor + 1$ | wherein each of m and m' indicates a sub-frame index in the downlink, n indicates a sub-frame index in the uplink, p indicates an interval between sub-frames for transmission of control information, F indicates the number of sub-frames included in one frame, FDD denotes Frequency Division Duplex, DL denotes DownLink, UL denotes UpLink, ACK denotes ACKnowledgment, NACK denotes Non-ACKnowledgment, and ReTx denotes ReTransmission.

20. A method of signal transmission and reception by a transmitter in a wireless mobile communication system using a super-frame, the method comprising:
determining a signal transmission/reception corresponding relation between downlink sub-frames of a downlink and uplink sub-frames of an uplink, the super-frame comprising a plurality of frames, each frame comprising a plurality of downlink sub-frames and a plurality of uplink sub-frames, the signal transmission/reception corresponding relation enabling each sub-frame within a link comprising fewer sub-frames to correspond to at least one sub-frame within a link comprising more sub-frames, considering whether the downlink and the uplink comprise different numbers of sub-frames or not;
transmitting control information indicating data burst allocation in each downlink sub-frame at a predefined period from among downlink sub-frames included in a first frame;
transmitting a data burst through a downlink sub-frame indicated by the control information;
receiving feedback, in response to the transmitted data burst, through at least one uplink sub-frame of the first frame corresponding to the downlink sub-frames through which the control information and the data burst have been transmitted according to the signal transmission/reception corresponding relation; and
when the feedback is a Non-ACKnowledgement (NACK) response, retransmitting the data burst, through at least one downlink sub-frame of a second frame corresponding to said at least one uplink sub-frame of the first frame according to the signal transmission/reception corresponding relation
wherein a time slot index within the link comprising fewer time slots corresponds to a time slot index within the link comprising more time slots based on the signal transmission/reception corresponding relation.

21. The method of claim 20, further comprising, when the feedback is an ACKnowledgement (ACK) response, transmitting a data burst different from the data burst transmitted through the first frame.

22. The method of claim 20, wherein the uplink sub-frame and the downlink sub-frame occupy different time intervals.

23. The method of claim 20, wherein the transmitting and receiving of the signals to and from the receiver is performed through a sub-frame determined by

| | DL (M ≥ N) Subframe index | Frame index | DL (M < N) Subframe index | Frame index |
|---|---|---|---|---|
| MAP | m' | i | m' | i |
| Burst | m ∈ {m', m' + 1, ..., m' + p − 1} | i | m ∈ {m', m' + 1, ..., m' + p − 1} | i |
| ACK/NACK | $\left\lfloor \dfrac{m}{K} \right\rfloor$ | i | $\left\lceil \dfrac{m}{K} \right\rceil, \left\lceil \dfrac{m}{K} \right\rceil + 1, ..., \left\lceil \dfrac{m+1}{K} \right\rceil - 1$ | i + 1 |
| ReTx.burst | m | i + 1 | m | i + 1 | wherein p indicates an interval between sub-frames for transmission of the control information, m' indicates a sub-frame index in which the control information of a control channel is transmitted, $$m' = m0 + 0, m0 + p, m0 + 2p, m0 + p \times \left(\left\lceil \dfrac{M - m0}{p} \right\rceil - 1\right),$$

m0 indicates a location of the first sub-frame transmitting the control information within one frame, the number of sub-frames in which control channels are provided is $$\left\lceil \dfrac{M - m0}{p} \right\rceil$$

when m0 has a value other than 0, m indicates a sub-frame index in which a transmission of the data burst starts and is m', m'+1, . . . , m+p−1, K is defined by $$\frac{M}{N} \text{ or } \left\lceil \frac{M}{N} \right\rceil,$$

M indicates the number of sub-frames within the link comprising the more sub-frames, N indicates the number of sub-frames within the link comprising the fewer sub-frames, DL denotes DownLink, ACK denotes ACKnowledgment, and ReTx denotes ReTransmission.

24. A method of signal transmission and reception by a receiver in a wireless mobile communication system using a super-frame, the method comprising:

determining a signal transmission/reception corresponding relation between downlink sub-frames of a downlink and uplink sub-frames of an uplink, the super-frame comprising a plurality of frames, each frame comprising a plurality of downlink sub-frames and a plurality of uplink sub-frames, the signal transmission/reception corresponding relation enabling each sub-frame within a link comprising fewer sub-frames to correspond to at least one sub-frame within a link comprising more sub-frames, considering whether the downlink and the uplink comprise different numbers of sub-frames or not;

receiving control information indicating data burst allocation in each downlink sub-frame at a predefined period from among downlink sub-frames included in a first frame;

transmitting a data burst through an uplink sub-frame of the first frame indicated by the control information;

receiving feedback, in response to the transmitted data burst, through at least one downlink sub-frame of a second frame corresponding to the uplink sub-frame through which the data burst has been transmitted according to the signal transmission/reception corresponding relation; and when the feedback is a Non-ACKnowledgement (NACK) response, retransmitting the data burst, through at least one uplink sub-frame of the second frame corresponding to said at least one downlink sub-frame of the second frame according to the signal transmission/reception corresponding relation, wherein a time slot index within the link comprising fewer time slots corresponds to a time slot index within the link comprising more time slots based on the signal transmission/reception corresponding relation.

25. The method of claim 24, further comprising, when the feedback is an ACKnowledgement (ACK) response, transmitting a data burst, which is different from the data burst transmitted through the first frame, through at least one uplink sub-frame of the second frame.

26. The method of claim 24, wherein the uplink sub-frame and the downlink sub-frame occupy different time intervals.

27. The method of claim 24, wherein the transmitting and receiving of the signals to and from the receiver is performed through a sub-frame determined by

|  | UL (M' ≧ N) | | UL (M' < N) | |
| --- | --- | --- | --- | --- |
|  | Subframe index | Frame index | Subframe index | Frame index |
| MAP | m' | i | m' | i |
| Burst | $\left\lfloor \frac{m'/p}{K'} \right\rfloor$ | i | $n \in \left\{ \left\lceil \frac{m'/p}{K'} \right\rceil, \left\lceil \frac{m'/p}{K'} \right\rceil + 1, \ldots, \left\lceil \frac{m'/p+1}{K'} \right\rceil - 1 \right\}$ | i |
| ACK/NACK | m' | i | m' | i + 1 |
| ReTx.burst | $\left\lfloor \frac{m'/p}{K'} \right\rfloor$ | i + 1 | n | i + 1 | wherein p indicates an interval between sub-frames for transmission of the control information, m' indicates a sub-frame index in which the control information of a control channel is transmitted, $$m' = m0 + 0, m0 + p, m0 + 2p, m0 + p \times \left( \left\lceil \frac{M - m0}{p} \right\rceil - 1 \right),$$

M' indicates the number of sub-frames in each of which the control information is provided and is defined by $$\left\lceil \frac{M - m0}{p} \right\rceil,$$

the number of sub-frames for uplink data burst transmission has a maximum of $$M' = \left\lceil \frac{M}{p} \right\rceil,$$

K' is defined by M'/N or |M'/N|, M indicates the number of sub-frames within the link comprising the more sub-frames, N indicates the number of sub-frames within the link comprising the fewer sub-frames, UL denotes UpLink, ACK denotes ACKnowledgment, and ReTx denotes ReTransmission.

28. The method of claim 24, wherein the transmitting and receiving of the signals to and from the receiver is performed through a sub-frame determined by

| FDD | DL Subframe index | Frame index | UL Subframe index | Frame index |
|---|---|---|---|---|
| MAP | m' | I | m' | i |
| Burst | $m \in \{m', m'+1, \ldots, m'+p-1\}$ | I | $n \in \{\mod(m'+F/2, F), \mod(m'+1+F/2, F), \ldots, \mod(m'+p-1+F/2, F)\}$ | $i + \left\lfloor \dfrac{F}{n+1+F/2} \right\rfloor$ |
| ACK/NACK | m < F/2<br>m > F/2 | m + F/2<br>m − F/2 | I<br>i + 1 | m' | i + 1 |
| ReTx.burst | M | i + 1 | n | $i + \left\lfloor \dfrac{F}{n+1+F/2} \right\rfloor + 1$ | wherein each of m and m' indicates a sub-frame index in the downlink, p indicates an interval between sub-frames for transmission of the control information, F indicates the number of sub-frames included in one frame, FDD denotes Frequency Division Duplex, DL denotes DownLink, UL denotes UpLink, ACK denotes ACKnowledgment, and ReTx denotes ReTransmission.

29. The method of claim 24, wherein the transmitting and receiving of the signals to and from the receiver is performed through a sub-frame determined by

| DL HARQ | Subframe index | Frame index |
|---|---|---|
| MAP | m' | i |
| Burst | $m \in \{m', m'+1\}$ | i |
| HARQ feedback | $0 \leq m < S$ | n = 0 | i |
| | $S \leq m < N + S$ | n = m − S | |
| | $N + S \leq m < M$ | n = N − 1 | | wherein m (m=0, ..., M−1) indicates a sub-frame index in the downlink, n (n=0, ..., N−1) indicates a sub-frame index in the uplink, M indicates the number of downlink sub-frames within one frame, N indicates the number of uplink sub-frames within one frame, p indicates an interval between sub-frames for transmission of the control information, DL denotes DownLink, HARQ denotes Hybrid Automatic Repeat reQuest, m'=p*x, x={0, 1, ..., (ceiling(M/p)−1}, and S is defined by $$S \equiv \begin{cases} \text{floor}\left(\dfrac{M-N}{2}\right), & \text{if } M \geq N \\ -\text{floor}\left(\dfrac{N-M}{2}\right), & \text{else} \end{cases}$$

or $$S \equiv \begin{cases} \text{ceiling}\left(\dfrac{M-N}{2}\right), & \text{if } M \geq N \\ -\text{ceiling}\left(\dfrac{N-M}{2}\right), & \text{else.} \end{cases}$$

30. The method of claim 24, wherein the transmitting and receiving of the signals to and from the receiver is performed through a sub-frame determined by

| UL HARQ | Subframe index | | Frame index |
|---|---|---|---|
| MAP | | m' | i |
| Burst Tx | $0 \leq m' < S$ | n = 0 | i |
| | $S \leq m' < N + S$ | $n \in \{m' - S\}$ | |
| | $N + S \leq m' < M$ | n = N − 1 | |
| HARQ feedback | | m' | i + 1 |
| Burst Re Tx | | n | i + 1 | wherein m (m=0, ..., M−1) indicates a sub-frame index in the downlink, n (n=0, ..., N−1) indicates a sub-frame index in the uplink, M indicates the number of downlink sub-frames within one frame, N indicates the number of uplink sub-frames within one frame, UL denotes UpLink, HARQ denotes Hybrid Automatic Repeat reQuest, Tx denotes Transmission, N ceiling(M/p), m'=p*x, x={0, 1, ..., (ceiling(M/p)−1}, p indicates an interval between sub-frames for transmission of the control information, and S is defined by $$S \equiv \begin{cases} \text{floor}\left(\dfrac{M-N}{2}\right), & \text{if } M \geq N \\ -\text{floor}\left(\dfrac{N-M}{2}\right), & \text{else} \end{cases}$$

or $$S \equiv \begin{cases} \text{ceiling}\left(\dfrac{M-N}{2}\right), & \text{if } M \geq N \\ -\text{ceiling}\left(\dfrac{N-M}{2}\right), & \text{else.} \end{cases}$$

31. The method of claim 24, wherein the transmitting and receiving of the signals to and from the receiver is performed through a sub-frame determined by

| UL HARQ | Subframe index | | Frame index |
|---|---|---|---|
| MAP | | m' | i |
| Burst Tx | m' = 0 | $n \in \{0, 1, \ldots, m' - S, m' - S + 1\}$ | i |
| | 0 < m' < M − 1 | $n \in \{m' - S, m' - S + 1\}$ | |
| | m' = M − 1 | $n \in \{m' - S, m' - S + 1, \ldots, N − 1\}$ | |
| HARQ feedback | | m' | i + 1 |
| Burst Re Tx | | n | i + 1 | wherein m (m=0, ..., M−1) indicates a sub-frame index in the downlink, n (n=0, ..., N−1) indicates a sub-frame index in the uplink, M indicates the number of downlink sub-frames within one frame, N indicates the number of uplink sub-frames within one frame, UL denotes UpLink, HARQ denotes Hybrid Automatic Repeat reQuest, Tx denotes Transmission, N ceiling(M/p), m'=p*x, x={0, 1, ..., (ceiling(M/p)−1}, p indicates an interval between sub-frames for transmission of the control information, and S is defined by $$S \equiv \begin{cases} \text{floor}\left(\frac{M-N}{2}\right), & \text{if } M \geq N \\ -\text{floor}\left(\frac{N-M}{2}\right), & \text{else} \end{cases}$$

or $$S \equiv \begin{cases} \text{ceiling}\left(\frac{M-N}{2}\right), & \text{if } M \geq N \\ -\text{ceiling}\left(\frac{N-M}{2}\right), & \text{else}. \end{cases}$$

32. The method of claim 24, wherein the transmitting and receiving of the signals to and from the receiver is performed through a sub-frame determined by

| Operation | DL HARQ | UL HARQ |
|---|---|---|
| Rx delay | $(M+N)x_{DL} + M - m + n$ | $(M+N)x_{UL} + N - n + m$ |
| Tx delay | $(M+N)y_{DL} + N - n + m$ | $(M+N)y_{UL} + M - m + n$ |
| HARQ Retransmission delay | $(M+N)(x_{DL} + y_{DL} + 1)$ | $(M+N)(x_{UL} + y_{UL} + 1)$ | wherein M indicates the number of downlink sub-frames of the downlink, and N indicates the number of uplink sub-frames of the uplink, m for DL HARQ indicates a sub-frame index in which the data burst is transmitted, n for DL HARQ indicates a sub-frame index in which an HARQ feedback is transmitted, m for UL HARQ indicates a sub-frame index in which burst allocation is indicated or an HARQ feedback is transmitted, n for UL HARQ indicates a sub-frame index in which a data burst is transmitted, $x_{DL}$ and $x_{UL}$ refer to reception delays up to HARQ feedback transmission after data burst reception in the downlink and uplink sub-frames, respectively, and $y_{DL}$ and $y_{UL}$ refer to transmission delays up to data burst retransmission after NACK reception in the downlink and uplink sub-frames, respectively, DL denotes DownLink, UL denotes UpLink, HARQ denotes Hybrid Automatic Repeat reQuest, Rx denotes Reception, Tx denotes Transmission.

33. The method of claim 24, wherein the transmitting and receiving of the signals to and from the receiver is performed through a sub-frame determined by

| Operation | DL HARQ | UL HARQ |
|---|---|---|
| Rx offset | $F \cdot x_{DL} + \text{ceiling}(F/2)$ | $F \cdot x_{UL} + \text{ceiling}(F/2)$ |
| Tx offset | $F \cdot y_{DL} + \text{ceiling}(F/2)$ | $F \cdot y_{UL} + \text{ceiling}(F/2)$ |
| HARQ Retransmission delay | $F \cdot (x_{DL} + y_{DL} + 1)$ | $F \cdot (x_{UL} + y_{UL} + 1)$ | wherein F indicates the number of sub-frames included in one frame, $x_{DL}$ and $x_{UL}$ refer to reception delays up to HARQ feedback transmission after data burst reception in the downlink and uplink sub-frames, respectively, and $y_{DL}$ and $y_{UL}$ refer to transmission delays up to data burst retransmission after NACK reception in the downlink and uplink sub-frames, respectively, DL denotes DownLink, UL denotes UpLink, HARQ denotes Hybrid Automatic Repeat reQuest, Rx denotes Reception, Tx denotes Transmission.

* * * * *